(12) United States Patent
Freedman

(10) Patent No.: US 8,787,627 B1
(45) Date of Patent: Jul. 22, 2014

(54) SYSTEM FOR NON-REPUDIABLE REGISTRATION OF AN ONLINE IDENTITY

(71) Applicant: Steven Jay Freedman, San Francisco, CA (US)

(72) Inventor: Steven Jay Freedman, San Francisco, CA (US)

(*) Notice: Subject to any disclaimer, the term of this patent is extended or adjusted under 35 U.S.C. 154(b) by 0 days.

(21) Appl. No.: 13/947,008

(22) Filed: Jul. 19, 2013

Related U.S. Application Data

(63) Continuation of application No. 12/837,434, filed on Jul. 15, 2010, now Pat. No. 8,532,343.

(60) Provisional application No. 61/397,693, filed on Apr. 16, 2010.

(51) Int. Cl.
*G06K 9/00* (2006.01)

(52) U.S. Cl.
CPC .................... *G06K 9/00335* (2013.01)
USPC ........................... 382/115; 382/118

(58) Field of Classification Search
USPC .................................. 382/115–118
See application file for complete search history.

(56) References Cited

U.S. PATENT DOCUMENTS

| | | | | |
|---|---|---|---|---|
| 5,680,481 A * | 10/1997 | Prasad et al. | | 382/190 |
| 5,764,769 A | 6/1998 | Bennett et al. | | |
| 5,887,140 A * | 3/1999 | Itsumi et al. | | 709/225 |
| 6,028,960 A * | 2/2000 | Graf et al. | | 382/203 |
| 6,526,158 B1 * | 2/2003 | Goldberg | | 382/115 |
| 7,120,278 B2 * | 10/2006 | Sukegawa et al. | | 382/118 |
| 7,643,684 B2 * | 1/2010 | Lee et al. | | 382/190 |
| 7,697,729 B2 * | 4/2010 | Howell et al. | | 382/115 |
| 8,184,866 B2 * | 5/2012 | Takaku et al. | | 382/115 |
| 8,532,343 B1 * | 9/2013 | Freedman | | 382/115 |
| 2001/0036297 A1 * | 11/2001 | Ikegami et al. | | 382/115 |
| 2003/0039380 A1 * | 2/2003 | Sukegawa et al. | | 382/118 |
| 2005/0169503 A1 * | 8/2005 | Howell et al. | | 382/115 |
| 2006/0161791 A1 | 7/2006 | Bennett | | |
| 2007/0076922 A1 * | 4/2007 | Living et al. | | 382/118 |
| 2007/0098223 A1 * | 5/2007 | Kamata et al. | | 382/115 |
| 2008/0226136 A1 * | 9/2008 | Takaku et al. | | 382/115 |
| 2009/0060288 A1 * | 3/2009 | Myers et al. | | 382/118 |
| 2009/0190804 A1 * | 7/2009 | Yokoi | | 382/118 |
| 2009/0232364 A1 * | 9/2009 | Hosoi | | 382/118 |
| 2009/0324023 A1 * | 12/2009 | Tian et al. | | 382/118 |
| 2011/0153362 A1 * | 6/2011 | Valin et al. | | 705/3 |
| 2012/0123786 A1 * | 5/2012 | Valin et al. | | 704/273 |

OTHER PUBLICATIONS

U.S. Appl. No. 12/837,434, filed Aug. 13, 2013, Freedman, Steven Jay.
Bennett, Charles H., "Ideas on Privacy vs. Authentication, Authentication by Online Challenges," IBM Research Yorktown, Jan. 2002, 12 pages.

(Continued)

*Primary Examiner* — Alex Liew
(74) *Attorney, Agent, or Firm* — Adeli LLP

(57) ABSTRACT

A method of generating irrefutable evidence of registration that cannot be repudiated by the registrant for a network-based application is described. The method initiates an image capture session to capture a plurality of images of an individual user. The method, during the image capture session, provides a sequence of tasks to be performed by the individual user in order to validate the image capture session in capturing an image of a person participating in a real-time event.

20 Claims, 26 Drawing Sheets

(56) References Cited

OTHER PUBLICATIONS

Chellapilla, Kumar, et al., "Using Machine Learning to Break Visual Human Interaction Proofs (HIPs)," Advances in Neural Information Processing Systems 17, Neural Information Processing Systems (NIPS'2004), Month Unknown, 2005, 8 pages, MIT Press, Cambridge, MA.

Haber, Stuart, et al., "How To Time-Stamp a Digital Document," Journal of Cryptology, May 18, 1991, 13 pages, International Association for Cryptologic Research, CRYPT0'90, vol. 537, New Jersey, USA.

Maurer, Ueli, "Intrinsic Limitations of Digital Signatures and How to Cope With Them," Proceedings of $6^{th}$ Int. Conf. on Information Security (ISG '03), Dec. 10, 2003, 13 pages, Springer-Verlag, Berlin.

Maurer, Ueli, "New Approaches to Digital Evidence," Proceedings of the IEEE, Jun. 2004, pp. 933-947, vol. 92 No. 6, IEEE.

Mori, Greg, et al., "Breaking a Visual CAPTCHA," Month Unknown, 2003, 4 pages, available at http://www.cs.sfu.ca/~mori/research/gimpy/.

Nali, D., et al., "VideoTicket: Detecting Identity Fraud Attempts via Audiovisual Certificates and Signatures," Proceedings of the 2007 New Security Paradigms Workshop (NSPW '07), Sep. 18-21, 2007, pp. 89-101, ACM, New York, New York, USA.

Tam, Jennifer, et al., "Breaking Audio CAPTCHAs," Advances in Neural Information Processing Systems (NIPS), Month Unknown, 2008, pp. 1-8, available at http://www.captcha.net/Breaking_Audio_CAPTCHAs.pdf.

Von Ahn, Luis, et al., "CAPTCHA: Using Hard AI Problems for Security," In Proceedings of Eurocrypt, Month Unknown, 2003, 18 pages, available at http://www.captcha.net/captcha_crypt.pdf.

Von Ahn, Luis, et al., "reCAPTCHA: Human-Based Character Recognition via Web Security Measures," Sep. 12, 2008, pp. 1465-1468, vol. 321, available at http://www.cs.cmu.edu/~biglou/reCAPTCHA_Science.pdf.

Von Ahn, Luis, et al., "Telling Humans and Computers Apart Automatically," Communications of the ACM, Feb. 2004, pp. 57-60, vol. 47 No. 2, ACM, New York, New York, USA, available at http://www.captcha.net/captcha_cacm.pdf.

* cited by examiner

Figure 16

| Counterparty Evaluation | |
|---|---|
| Registration Interviews 1610 | Endorse Counterparty |
| On: Evidence of Registration: 1612<br>06/12/09<br>13:23 PST  1616<br>09/30/08<br>17:45 PST  1616<br>1614 | ☐ I vouch that this is John Doe<br>☐ I vouch that this is not John Doe<br>☐ I have known John Doe for ☐ years<br>☐ I have met John Doe face-to-face<br><br>[Submit]  1630 |
| Identity 1620 | Identity Endorsed by: 1640 |
| Name: John Doe<br>DOB: 07/21/82<br>Sex: Male<br>Occupation: Engineer | • Bill Johnson  Trust level: 89<br>  Fred Jones<br>• Tim Smith<br><br>Important notes:<br>• Counter-endorsed by John Doe |

SYSTEM FOR NON-REPUDIABLE REGISTRATION OF AN ONLINE IDENTITY

CLAIM OF BENEFIT TO PRIOR APPLICATIONS

This application is a continuation application of U.S. patent application Ser. No. 12/837,434, filed Jul. 15, 2010, now issued as U.S. Pat. No. 8,532,343. U.S. patent application Ser. No. 12/837,434 claims the benefit of U.S. Provisional Application 61/397,693, entitled "System for Non-Refutable Registration of an Online Identity," filed Apr. 16, 2010. U.S. Provisional Application 61/397,693 was originally filed as a Non-Provisional U.S. Application and was assigned application Ser. No. 12/762,299. On Jun. 30, 2010, a petition was filed to convert U.S. application Ser. No. 12/762,299 to a Provisional Application. The contents of U.S. Provisional Application 61/397,693 and U.S. patent application Ser. No. 12/837,434, now issued as U.S. Pat. No. 8,532,434 are hereby incorporated by reference.

BACKGROUND OF THE INVENTION

Online networks are available to individual users who can choose to communicate, to perform transactions, and/or otherwise interact with one another. In such networks, each user may be represented by a user account that identifies him to other members of the network (e.g., through the use of a user profile). Typically, identifying information such as the user's name, gender, and date of birth is requested of the user during a registration process to establish the user's account.

When such identifying information is self-reported without independent verification of real-world credentials, the accuracy of the information associated with an account cannot be fully trusted by other participants in the network. A malicious user might register an account that represents the user as another actual or concocted individual, or register multiple accounts through an automated process. A non-user of the network might also credibly contend that an impostor fraudulently registered in his or her place.

In practice, users often believe that they are effectively anonymous. Such self-perceived anonymity or fraudulent identification may encourage impolite, socially disruptive, or even criminal behavior among users.

Therefore, there is a need for a registration system and associated procedures that increase the ability of users to detect impostors and limit a user's potential anonymity.

SUMMARY OF THE INVENTION

To allow a person to access an online resource, some embodiments of the invention require the person to participate in a real-time image-capture event. During the event, some embodiments capture video (or a series of still images) of the person performing certain tasks. The tasks are presented, and the video captured, in such a way as to make it irrefutable that it was a human being participating in the real-time event. In addition to capturing video, some embodiments (1) collect identity information and/or other information regarding the person and/or event; and then (2) associate the collected information with the captured video. The captured event is made available to other users of the online resource, such that the other users may review the captured event to (1) realize that a real person has participated in the event; (2) look at the person's face and make a sub-conscious decision of whether to trust the person; and (3) associate the person's represented identity with the face in the captured event.

In some embodiments, access to the online resource is granted to the person for a certain duration of time. In other words, after the person participates in the capture event, the person will not be required to participate in a capture event again when subsequently accessing the online resource. Some embodiments perform periodic re-captures of the person participating in a real-time event. Some of these embodiments perform a re-capture based on interactions with and/or feedback provided by other users. Other embodiments perform re-capture based on various other criteria (e.g., at regular intervals, randomly, etc.).

Some embodiments provide a validation system for executing the real-time image-capture event. Such a validation system may be used when registering a user account with an application that provides services over a network connection (e.g., through the Internet). Such network services may be accessed through a variety of user devices (e.g., a personal computer, a mobile telecommunication device, etc.). Some embodiments require a registering user (also referred to as a "new user" or "registrant") to submit evidence of registration that may be used by the system to validate the registrant's identity. In addition to a linked set of images (e.g., a video clip, a series of still photos, etc.) such evidence of registration may include audio data (e.g., an audio recording associated with the video clip) of a real-time event in which the registrant participates. In addition, the evidence of registration may include other data associated with the user registration (e.g., digital timestamps, GPS location of the user device, IP address, type of user device, etc.).

The evidence of registration may be generated by having the registrant respond, during a live interview, to a set of tasks that are selected such that the tasks cannot be anticipated before the interview or reproduced after the interview. The live interview may be captured using audio and/or video capture devices (e.g., a mic and/or webcam connected to a PC, a cellular phone camera and microphone, etc.) provided by the user device.

The set of interview tasks may include a combination of tasks that are presented to every registrant and tasks that are randomly selected or generated for each registrant. In some embodiments, the set of tasks may include various audio or visual cues or prompts that ask a user to respond with information (e.g., "What is your name?", "What is your age?", etc.), perform physical tasks (e.g., "touch your nose", "raise your right hand", etc.), and/or otherwise respond (e.g., "read the following sequence of numbers", "type the highlighted text", etc.). The set of tasks may be presented to a registrant in various ways. For instance, some embodiments will provide audiovisual cues to the registrant (e.g., through the display and/or audio output of the user device). In some of these embodiments, a user may be presented with an audio cue that has been generated from a current news source (e.g., "repeat the following headline: Michael Jackson has died today at age 50"). Such an audio cue is often difficult for a machine to recognize and reproduce accurately.

The tasks may be selected from a database of tasks, generated by sampling various available material (e.g., text corpuses available locally and/or over a network connection, news reports, etc.), or otherwise generated (e.g., by retrieving a random string of text and/or numbers). The task content may be stored with the evidence of registration such that the evidence of registration may be evaluated in light of the tasks provided to the registrant during the interview. Such tasks may be selected and/or generated such that the evidence of registration may be validated (either automatically or manually) by some embodiments as having been submitted by a real person who is not attempting to obscure her identity (e.g., by wearing a mask, covering her face with her hand, etc.). In this manner, a registrant cannot later repudiate her participation in the registration interview. In addition, the validation ensures that the interview responses are not computer-generated.

Some embodiments validate the evidence of registration by evaluating the evidence of registration to determine whether a real person has participated in the interview (this type of validation is referred to as "participant validation"). Such a determination may be made automatically (e.g., using facial recognition and/or voice recognition software) or manually (e.g., by having one or more persons review the evidence of registration). In addition, some embodiments perform pre-filtering (and/or other real-time validation or other evaluation) of the evidence of registration by providing feedback to the registrant as the interview is conducted (e.g., by displaying text that indicates "good" when the registrant's face is centered and not obscured, or displaying text that indicates "try again" when the registrant's face is obscured, not centered in the frame, etc.). In addition, some embodiments may compare the registrant's captured image to database photos (if available) and provide feedback indicating whether the registrant's captured image matches any database images or not (e.g., by displaying a text that indicates "matching registrant" or "non-matching data" as required).

In some embodiments, the evidence of registration is further validated by evaluating the registrant's compliance to the various tasks presented during the interview (this type of validation is referred to as "response validation"). For instance, if the registrant was asked to repeat a string of random numbers, the evidence of registration may be validated by determining whether the registrant's response matches the supplied string of numbers. Such response validation may be done manually or automatically (e.g., by using voice recognition to determine the recited string and comparing the recited string to the supplied string, by using facial recognition to determine that the registrant's facial movements match the recorded speech, by using a recognition algorithm to determine whether the registrant performed a requested physical task, etc.). Alternatively, some embodiments do not perform response validation (and/or participant validation) at all, but rather make the evidence of registration available to potential counterparties (i.e., other users of the network services) such that the potential counterparties may validate the evidence if desired.

Some embodiments perform verification of the registrant's identity through evaluation of the registrant's profile information in conjunction with the evidence of registration. For instance, some embodiments allow a counterparty to endorse (or disapprove) a registrant. Different embodiments allow different types of counterparties to endorse a registrant. Some embodiments allow a counterparty to endorse a registrant when the counterparty has met the registrant face-to-face and is thus able to verify the registrant's identity using the evidence of registration. Some embodiments allow a counterparty to endorse a registrant based on previous network interaction between the two users. Some embodiments allow a "live" endorsement whereby a registrant may generate the evidence of registration at a monitored location (e.g., a bank, an office, etc.) where the user physically produces some verifying identification (e.g., a driver's license, a passport, etc.).

Alternatively or conjunctively to allow counterparty endorsement of a registrant, some embodiments collect and analyze crowd-sourced evaluation information. For instance, some network-based applications allow users to "tag" other users in media such as photos, video, etc. Some embodiments then collect and analyze these tags and associated media to attempt to match identifying data to various registrants. In this manner, some embodiments are able to search various existing databases of biometric data (e.g., tagged photos) in order to compare the data to the evidence of registration. This scheme allows the use of crowd-sourced evaluation without requiring the "crowd" to participate in the evaluation (i.e., the crowd-sourced data is generated independently of the evaluation and is provided by self-selected evaluators).

For instance, some embodiments may search such tags to find matches for the name used by a registrant. The associated media (e.g., a digital photo) may then be analyzed against the registrant's evidence of registration to determine if the face in the tagged photo matches the face in the evidence of registration, thus indicating that the identity provided by the registrant is her true identity. The tagged media may be of various formats, as such the analysis may differ depending on the format (e.g., voice data may be evaluated with respect to an audio portion of the evidence of registration, while picture data may be evaluated with respect to a video portion of the evidence of registration).

In addition to allowing validation and/or verification of a registrant's identity, some embodiments also collect trust data regarding the registrant. For instance, some embodiments may allow counterparties to rate or otherwise evaluate a registrant's perceived trustworthiness based on their interactions. This information may also be collected from previous interactions of the registrant with various network applications (e.g., online auction sites, dating services, etc.). Some embodiments provide a trustworthiness value or score. Such a score may be based on a variety of available information including one or more of participant validation information, response validation information, verification information, interaction information, etc.

Different embodiments present different information regarding the registrant to different counterparties or potential counterparties. For instance, to protect a registrant's privacy, some embodiments provide only a summary of endorsement information (e.g., 3 positive endorsements, live endorsement, 7 matching photos, etc.). As another example, some embodiments may provide a summary endorsement value or score to indicate the relative level of endorsement the registrant has received (e.g., 0 indicating no endorsement information, 100 indicating all positive endorsements, −100 indicating all negative endorsements, etc.) with various types of endorsers weighted in different ways (e.g., a live endorsement generated at a bank may be weighted more heavily than an online endorsement).

Some embodiments provide all endorsement information to a counterparty, including information regarding the endorser (e.g., a link to the endorser's user profile, if available). In this way, a potential counterparty may evaluate the credibility and source of the endorsements in addition to the endorsement information itself. Some embodiments may provide different levels of information to different types of counterparties. The information provided to counterparties may be partly or completely controlled by the registrant, by the registrar, and/or based on some appropriate criteria.

When a registrant accesses the network services after the initial registration, some embodiments collect data regarding the registrant's subsequent interactions. For instance, in some embodiments, a registrant may access the network services using a mobile telecommunication device. In such cases, the GPS location of the user may be retrieved and stored. Various other data may be collected based on the user's system access (e.g., the time of day a user accesses the system, specific services used, etc.). As an example, some embodiments capture, store, and analyze media generated by a registrant when using the network-based application (e.g., the registrant may perform a voice search using the application, the registrant may capture an image using a webcam, etc.). Such data may be analyzed by the validation system of some embodiments.

In some embodiments, such analysis may initiate a re-challenge when the registrant accesses the network services (e.g., when the registrant accesses the network from widely-ranging locations in a short period of time, when the registrant access the network using a different user device than previously used, etc.). A re-challenge may include a full interview as described above, or a limited interview (e.g., an interview that includes audio capture and/or analysis only). Some embodiments may first perform a re-challenge using a limited interview and only perform a full interview if the registrant fails the initial re-challenge.

In some embodiments, such a re-challenge may be automatically analyzed either alone or in conjunction with previous registrant data (e.g., by comparing the voice characteristics exhibited during the re-challenge with the voice characteristics exhibited during the initial interview). Such analysis may be performed in a similar manner to the analysis of the evidence of registration. The re-challenge response is stored by some embodiments such that a potential counter-party of the registrant may evaluate the re-challenge either in addition to or in place of an automatic analysis. Some embodiments manually analyze a re-challenge by having one or more agents review the re-challenge in light of other registrant data. The re-challenge results may be used by some embodiments to limit or otherwise control access to the user's account with the registrar.

In addition to the explicit validation, verification, trustworthiness, and/or other information collected and provided by some embodiments, a registrant is also implicitly discouraged from providing false information due to the nature of the evidence of registration. In other words, when a potential registrant knows that his own face, voice, and/or other identifying features will be made available to numerous potential counterparties, the registrant is less likely to employ a false identity or otherwise behave in a manner that will adversely affect his reputation.

Although many examples above and below describe evidence of registration that includes video and audio data, one of ordinary skill in the art will recognize that the registration process may capture video data only (e.g., when a user accesses a network-based application using a user device that does not include a microphone), or it may capture audio data only (e.g., when a user accesses a network-based application using a user device that does not include a video camera), and/or other types of data.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 16 illustrates a conceptual user interface (UI) used by some embodiments to present information related to a registered user and/or to receive counterparty verification regarding the user.

DETAILED DESCRIPTION OF THE INVENTION

Figure 1:
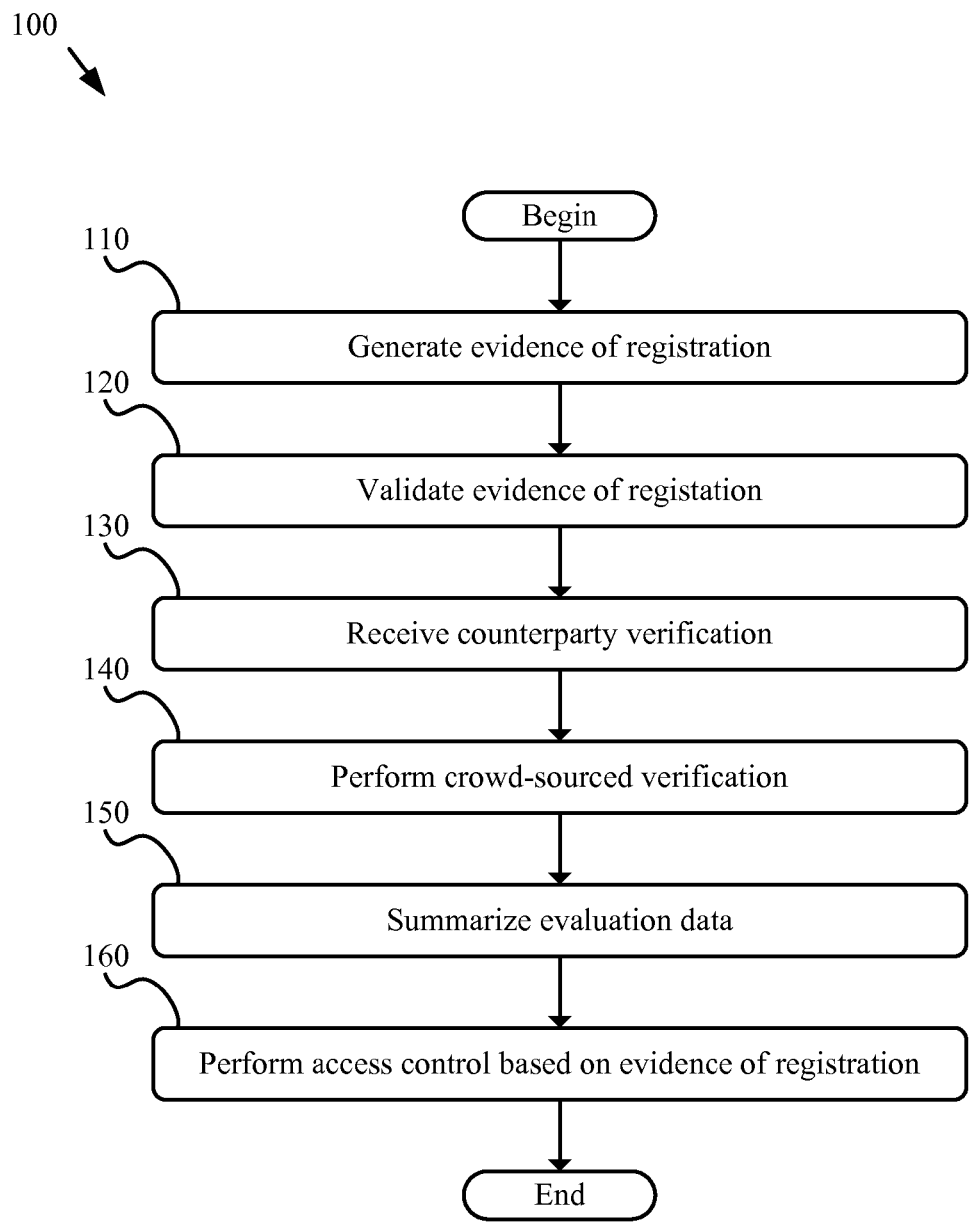
FIG. 1 conceptually illustrates an example of a process that some embodiments use to perform validation and verification of user profile information.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

To allow a person to access an online resource, some embodiments of the invention require the person to participate in a real-time image-capture event. During the event, some embodiments capture video (or series of still images) of the person performing certain tasks. The tasks are presented, and the video captured, in such a way as to make it irrefutable that a person participated in the real-time event and was willing to associate his face with the identity that he was providing. In addition to capturing video, some embodiments (1) collect identity information and/or other information regarding the person and/or event; and then (2) associate the collected information with the captured video. The captured event is made available to other users of the online resource, such that the other users may review the captured event to (1) realize that a real person has participated in the event; (2) look at the person's face and make a sub-conscious decision of whether to trust the person; and (3) associate the person's represented identity with the face in the captured event.

In some embodiments, access to the online resource is granted to the person for a certain duration of time. In other words, after the person participates in the capture event, the person will not be required to participate in a capture event when subsequently accessing the online resource. Some embodiments perform periodic re-captures of the person participating in a real-time event. Some of these embodiments perform a re-capture based on interactions with and/or feedback provided by other users. Other embodiments perform re-capture based on various other criteria (e.g., at regular intervals, randomly, etc.).

Some embodiments provide a validation system for executing the real-time event. Such a validation system may be used when registering a user account with an application that provides services over a network connection (e.g., through the Internet). Such network services may be accessed through a variety of user devices (e.g., a personal computer, a mobile telecommunication device, etc.). Some embodiments require a registering user (also referred to as a "new user" or "registrant") to submit evidence of registration that may be used by the system to validate the registrant's identity. Such evidence of registration may include a linked set of images (e.g., a video clip, a series of still photos, etc.) and/or audio data (e.g., an audio recording associated with the video clip) of a real-time event in which the registrant participates. In addition, the evidence of registration may include other data associated with the user registration (e.g., digital timestamps, GPS location of the user device, IP address, type of user device, etc.).

FIG. 1 conceptually illustrates an example of a process 100 that some embodiments use to perform validation and verification of user profile information. Process 100 will be described by reference to FIG. 2 which illustrates a conceptual system used by some embodiments to perform process 100.

Figure 2:
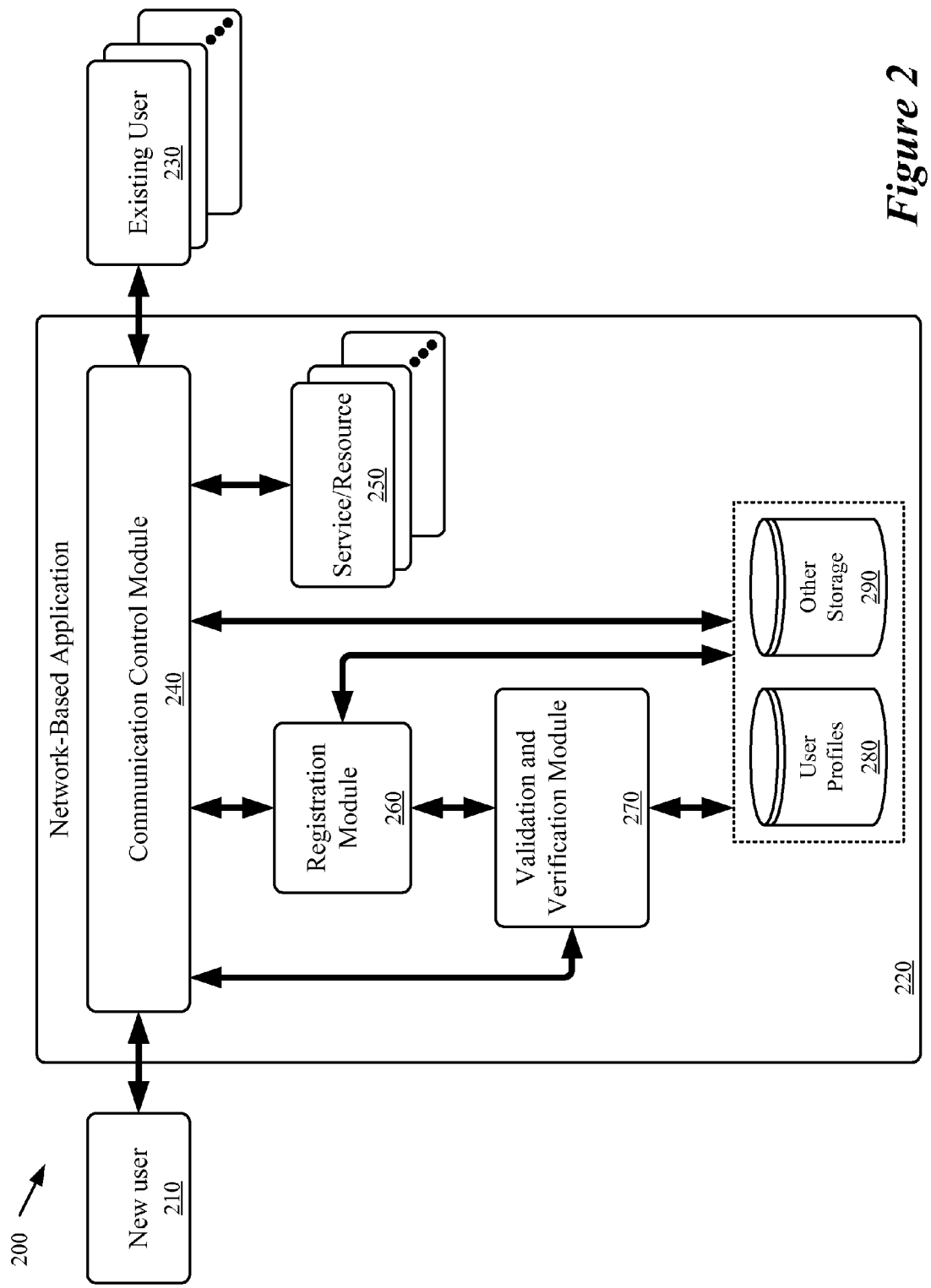
FIG. 2 illustrates a conceptual system used by some embodiments to perform validation, verification, and/or other operations.

FIG. 2 illustrates a conceptual system 200 used by some embodiments to perform validation, verification, and/or other operations. The system 200 includes a new user 210 (alternatively referred to as a "registrant"), a network-based application 220, and several existing users 230 (alternatively referred to as "counterparties"). The network-based application includes a communication control module 240, several services 250 provided by the network-based application, a registration module 260, a validation and verification module 270, a user profile storage 280, and other storage 290.

The new user 210 represents a previously-unregistered user or potential user of the network-based application 220. The registrant may access such a network-based application through a network connection (e.g., an Internet connection) using a variety of user devices (not shown). Such user devices may include, for example, a personal computer, a mobile telecommunication device, etc.

Each existing user 230 represents a current (or potential) user of the network-based application other than the new user 210. In addition, in some embodiments an automated agent or system may be treated as an existing user. The existing users may access the network-based application 220 using a variety of user devices and/or network connections.

The network-based application 220 conceptually represents the modules, services, resources, etc. accessed by the new user 210. In this example, the network-based application provides access to various services 250 or other resources that may be accessed by various users 210 or 230. Such services and resources may include various network-based functionality to be provided to a community of users (e.g., chat or other messaging, data storage, etc.). The communication control module 240 is for controlling user access to the various services 250 provided by the network-based application 220. The registration module 260 is for managing the registration of a new user. The registration module works in conjunction with the validation and verification module 270 in some embodiments. The validation and verification module conceptually represents the system components (and/or sets of instructions executed by those components) used to validate, and/or verify user profile information. User profile storage 280 is for storing user profile information, while other storage 290 is for providing temporary and/or permanent storage for various data generated and/or accessed by the components of the network-based application 220. The operation of the various system components of system 200 will be described below in reference to process 100.

Process 100 begins in some embodiments when a registrant creates a new user account with a network-based application (e.g., application 220). Next, the process generates (at 110) evidence of registration for the user. The evidence of registration may be generated by having the registrant respond, during a live interview, to a set of tasks that are selected, such that the tasks cannot be anticipated before the interview or reproduced after the interview. The live interview may be captured using audio and video capture devices (e.g., a mic and a webcam connected to a PC, a cellular phone camera and microphone, etc.) provided by the user device. The presentation of tasks and capture of the live interview may be performed using one or more components of validation and verification module 270. In some embodiments the validation and verification module generates the evidence of registration in conjunction with other system components (e.g., by using components of the user device associated with new user 210, by sending data back and forth to the registration module 260, etc.). The generated evidence of registration may be stored in a location such as user profile storage 280. The generation of the evidence of registration will be described in more detail in reference to FIGS. 3-5 below.

The set of interview tasks may include a combination of tasks that are presented to every registrant and tasks that are randomly selected or generated for each registrant. In some embodiments, the set of tasks may include various audio or visual cues or prompts that ask a user to respond with information (e.g., "What is your name?", "What is your age?", etc.), perform physical tasks (e.g., "touch your nose", "raise your right hand", etc.), and/or otherwise respond (e.g., "read the following sequence of numbers", "type the highlighted text", etc.). The set of tasks may be presented to a registrant in various ways. For instance, some embodiments will provide audiovisual cues to the registrant (e.g., through the display and/or audio output of the user device). In some of these embodiments, a user may be presented with an audio cue that has been generated from a current news source (e.g., "repeat the following headline: Michael Jackson has died today at age 50"). Such an audio cue is often difficult for a machine to recognize and reproduce accurately.

The tasks may be selected from a database of tasks, generated by sampling various available material (e.g., text corpuses available locally and/or over a network connection, news reports, etc.), or otherwise generated (e.g., by retrieving a random string of text and/or numbers). The tasks may be stored with the evidence of registration such that the evidence of registration may be evaluated in light of the tasks provided to the registrant during the interview. Some embodiments use components of the validation and verification module 270 to select and/or generate the registration tasks. Some of these embodiments may retrieve some or all of the tasks from a storage (e.g., other storage 290).

Such tasks may be selected and/or generated such that the evidence of registration may be validated (either automatically or manually) by some embodiments as having been submitted by a real person who is not attempting to obscure her identity (e.g., by wearing a mask, covering her face with her hand, etc.). In this manner, a registrant cannot later repudiate her participation in the registration interview. In addition, the validation ensures that the interview responses are not computer-generated. Generation of the registration tasks will be described in more detail in reference to FIGS. 8-9 below.

Returning to FIG. 1, after generating (at 110) the evidence of registration, process 100 validates (at 120) the evidence. Such validation may be performed by one or more components of system 200 (e.g., validation and verification module 270 may perform validation in conjunction with the registration module 260).

Some embodiments validate the evidence of registration by evaluating the evidence of registration to determine whether a real person has participated in the interview. Such a determination may be made automatically (e.g., using facial recognition and/or voice recognition software) or manually (e.g., by having one or more persons review the evidence of registration). Validation will be described in more detail in reference to FIGS. 11-12 below.

In addition to validating the generated evidence of registration, some embodiments perform pre-filtering (and/or other real-time validation or other evaluation) of the evidence of registration by providing feedback to the registrant as the interview is conducted (e.g., by displaying text that indicates "good" when the registrant's face is centered and not obscured, or displaying text that indicates "try again" when the registrant's face is obscured, not centered in the frame, etc.). In addition, some embodiments may compare the registrant's captured image to database photos (if available) and provide feedback indicating whether the registrant's captured image matches any database images or not (e.g., by displaying text that indicates "matching registrant" or "non-matching data" as required). Pre-filtering is described in more detail in reference to FIGS. 6-7 below.

In some embodiments, the evidence of registration is further validated by evaluating the registrant's compliance to the various tasks presented during the interview. For instance, if the registrant was asked to repeat a string of random numbers, the evidence of registration may be validated by determining whether the registrant's response matches the supplied string of numbers. Such validation may be done manually or automatically (e.g., by using voice recognition to determine the recited string and comparing the recited string to the supplied string, by using facial recognition to determine that the registrant's facial movements match the recorded speech, by using a recognition algorithm to determine whether the registrant performed a requested physical task, etc.). Response validation will be described in more detail in reference to FIG. 14 below.

Alternatively, some embodiments do not perform response validation (and/or participant validation) at all, but rather make the evidence of registration available to potential counterparties (i.e., other users of the network services) such that the potential counterparties may validate the evidence if desired.

Returning to FIG. 1, after validating (at 120) the evidence of registration in some embodiments, process 100 receives (at 130) counterparty verification. Such verification may be performed by one or more components of the system 200.

Some embodiments perform verification of the registrant's identity through evaluation of the registrant's profile information in conjunction with the evidence of registration. For instance, some embodiments allow a counterparty (e.g., existing user 230) to endorse (or disapprove) a registrant. Different embodiments allow different types of counterparties to endorse a registrant. Some embodiments allow a counterparty to endorse a registrant when the counterparty has met the registrant face-to-face and is thus able to verify the registrant's identity using the evidence of registration. Some embodiments allow a counterparty to endorse a registrant based on previous network interactions between the two users. Some embodiments allow a "live" endorsement whereby a registrant may generate the evidence of registration at a monitored location (e.g., a bank, an office, etc.) where the user physically produces some verifying identification (e.g., a driver's license, a passport, etc.). Counterparty verification will be described in more detail in reference to FIGS. 15-16 below.

Next, process 100 performs (at 140) crowd-sourced verification. Such crowd-sourced evaluation may be performed by one or more components of system 200. In addition, the crowd-sourced evaluation may utilize various other systems or storages that are available over a network.

Alternatively or conjunctively to allowing counterparty endorsement of a registrant, some embodiments collect and analyze crowd-sourced evaluation information. For instance, some network-based applications allow users to "tag" other users in media such as photos, video, etc. Some embodiments then collect and analyze these tags and associated media to attempt to match identifying data to various registrants. In this manner, some embodiments are able to search various existing databases of biometric data (e.g., tagged photos) in order to compare the data to the evidence of registration. This scheme allows the use of crowd-sourced evaluation without requiring the "crowd" to participate in the evaluation (i.e., the crowd-sourced data is generated independently of the evaluation and is provided by self-selected evaluators).

For instance, some embodiments may search such tags to find matches for the name used by a registrant. The associated media (e.g., a digital photo) may then be analyzed against the registrant's evidence of registration to determine if the face in the tagged photo matches the face in the evidence of registration, thus indicating that the identity provided by the registrant is her true identity. The tagged media may be of various formats, as such the analysis may differ depending on the format (e.g., voice data may be evaluated with respect to an audio portion of the evidence of registration, while picture data may be evaluated with respect to a video portion of the evidence of registration).

Process 100 then summarizes (at 150) the collected evaluation data (e.g., the data resulting from the validation, and/or verification of the evidence of registration). Such summarization may be performed by one or more components of system 200. For example, the validation and verification module 270 may summarize the collected evaluation data after retrieving the data from storage 280 or storage 290.

In addition to allowing validation and/or verification of a registrant's identity, some embodiments also collect trust data regarding the registrant. For instance, some embodiments may allow counterparties to rate or otherwise evaluate a registrant's perceived trustworthiness based on their interactions. This information may also be collected from previous interactions of the registrant with various network applications (e.g., online auction sites, dating services, etc.). Some embodiments may provide a trustworthiness value or score. Such a score may be based on a variety of available information including one or more of participant validation information, response validation information, verification information, interaction information, etc. In addition, the trustworthiness score may be at least partially based on the variety of crowd-sourced information that is collected for the registrant (e.g., matches found in many locations over a long period of time indicate that the information submitted by the registrant is likely to be reliable).

Different embodiments present different information regarding the registrant to different counterparties or potential counterparties. For instance, to protect a registrant's privacy, some embodiments provide only a summary of endorsement information (e.g., 3 positive endorsements, live endorsement, etc.). As another example, some embodiments may provide a summary endorsement value or score to indicate the relative level of endorsement the registrant has received (e.g., 0 indicating no endorsement information, 100 indicating all positive endorsements, −100 indicating all negative endorsements, etc.) with various types of endorsers weighted in different ways (e.g., a live endorsement generated at a bank may be weighted more heavily than an online endorsement).

Some embodiments provide all endorsement information to a counterparty, including information regarding the endorser (e.g., a link to the endorser's user profile, if available). In this way, a potential counterparty may evaluate the credibility and source of the endorsements in addition to the endorsement information itself. Some embodiments may provide different levels of information to different types of counterparties. The information provided to counterparties may be partly or completely controlled by the registrant, by the registrar, and/or based on some appropriate criteria.

Process 100 then performs (at 160) access control based on the evidence of registration. Such access control (and/or monitoring of access) may be performed by one or more components of system 200. For example, the communication control module 240 may perform access control in conjunction with the registration module 260 and/or the validation and verification module 270.

When a registrant accesses the network services after the initial registration, some embodiments collect data regarding the registrant's subsequent interactions. For instance, in some embodiments, a registrant may access the network services using a mobile telecommunication device. In such cases, the GPS location of the user may be retrieved and stored. Various other data may be collected based on the user's system access (e.g., the time of day the user accesses the system, specific services used, etc.). As an example, some embodiments capture, store, and analyze media generated by a registrant when using the network-based application (e.g., the registrant may perform a voice search using the application, the registrant may capture an image using a webcam, etc.). Such data may be analyzed by the validation system of some embodiments.

In some embodiments, such analysis may initiate a re-challenge when the registrant accesses the network services (e.g., when the registrant accesses the network from widely-ranging locations in a short period of time, when the registrant access the network using a different user device than previously used, when the voice of the registrant is no longer detected in regular use, etc.). A re-challenge may include a full interview as described above, or a limited interview (e.g., an interview that includes audio capture and/or analysis only). Some embodiments may first perform a re-challenge using a limited interview and only perform a full interview if the registrant fails the initial re-challenge.

In some embodiments, such a re-challenge may be automatically analyzed either alone or in conjunction with previous registrant data (e.g., by comparing the voice characteristics exhibited during the re-challenge with the voice characteristics exhibited during the initial interview). Such analysis may be performed in a similar manner to the analysis of the evidence of registration. The re-challenge response is stored by some embodiments such that a potential counterparty of the registrant may evaluate the re-challenge either in addition to or in place of an automatic analysis. Some embodiments manually analyze a re-challenge by having one or more agents review the re-challenge in light of other registrant data.

The re-challenge results may be used by some embodiments to limit or otherwise control access to the user's account with the registrar. The collection of data regarding a user's access after registration and the performance of access control based on the collected data will be described in more detail in reference to FIG. 21 below.

In addition to the explicit validation, verification, trustworthiness, and/or other information collected and provided by some embodiments, a registrant is also implicitly discouraged from providing false information due to the nature of the evidence of registration. In other words, when a potential registrant knows that his own face, voice, and/or other identifying features will be made available to numerous potential counterparties, the registrant is less likely to employ a false identity or otherwise behave in a manner that will adversely affect his reputation.

One of ordinary skill in the art will recognize that the operations of process 100 are conceptual and may not necessarily be performed in the order shown. For instance, some embodiments perform crowd-sourced verification before receiving counterparty verification. As another example, some embodiments perform various operations simultaneously (e.g., counterparty verification and crowd-sourced verification may be performed simultaneously). Furthermore, different specific operations may be performed in different embodiments. For instance, some embodiments do not generate the evidence of registration but do perform validation, and/or verification of evidence generated by a different system. As another example, some embodiments may store, update, or otherwise manipulate user profile data during or after various operations of process 100. Also, the process may not be performed as one continuous series of operations. In addition, the process could be implemented using several sub-processes, or as part of a larger macro-process.

In addition, one of ordinary skill in the art will recognize that system 200 is a conceptual example and actual implementations may have different individual components, communication pathways, and/or otherwise differ from the example system shown in FIG. 2. For instance, in some embodiments the validation and verification module 270 may be included as a sub-component in the registration module 260. As another example, in some embodiments the validation and verification module 270 may be implemented as two separate components. As yet another example, in some embodiments various elements of the validation and verification module 270 may be implemented using components of the new user's 210 user device (e.g., the validation and verification module may configure a user device such that camera included in the user device captures data that is then made available to the validation and verification module, which, for example, may reside on the user device).

Although the example above describes various elements and processes used to control access to resources provided by a network-based application, one of ordinary skill in the art will recognize that some embodiments may not be used to control (or otherwise effect) access to those resources. For instance, some embodiments may generate and store evidence of registration such that the information may be made available to other users, but without affecting the registrant's access to the resources.

Several more detailed embodiments are described below. In these embodiments, the registration process captures both video and audio data from the registrant. However, as mentioned above, some embodiments only capture audio data from the registrant during the registration process. As further mentioned above, other embodiments only capture video data from the registrant during the registration process. Instead of capturing video, still other embodiments, as mentioned above, capture only a set of images from the registrant during the registration with or without audio data from the registrant.

Although various specific examples of system components and/or operations performed using those and/or other components may be provided, one of ordinary skill in the art will recognize that these examples are for descriptive purposes only and different embodiments may implement the components and/or operations in different ways without departing from the spirit of the invention. For instance, although several examples may refer to analysis being performed by a human agent, one of ordinary skill in the art will recognize that such analysis may be performed using automated methods (e.g., analysis of video media using facial recognition software) in some embodiments. As another example, although many examples below may refer to video media, one of ordinary skill in the art will recognize that similar operations may be performed using audio or other data.

The following terminology is used through this document.

A "network" includes a set of hardware and/or software resources that permit a collection of users to interact with one another either directly or through one or more third-party systems and/or applications.

A "user" is an entity permitted to access, communicate with, and/or use computing system's resources and may be an organization, individual person, computing process, or any other entity that accesses the network-based system or application. A user that has successfully completed registration is referred to as a "registered user."

"Registration" includes the processes and systems by which a user establishes an ongoing relationship with a network-based system or application.

A "registrar" includes the systems, components, devices, and/or procedures used to manage a user's account (e.g., through registration, access control, profile information, etc.) with a network-based system or application.

An "existing user" or "counterparty" is an entity choosing to interact with a user (e.g., by communicating information, buying or selling goods and services, etc.).

"Evidence of registration" is the information collected, processed and stored by a network-based application to prove that a specific entity is a registered user of the services provided by the network-based application.

Several more detailed embodiments of the invention are described in the sections below. Section I provides a conceptual description of the processes and systems used to perform registration. In addition, Section I describes the generation and/or selection of registration tasks to form a registration interview. Section II then describes the processes and systems used to perform validation. Next, Section III describes the processes and systems used to perform verification. Section IV then describes management of user access after registration and several example usage scenarios. Next, Section V describes the software modules and data structures used to implement the validation system of some embodiments. Section VI then describes the process used to define the validation and verification application of some embodiments. Lastly, Section VII describes a computer system which implements some of the embodiments of the invention.

I. Registration

As mentioned above, some embodiments perform registration of users to access services provided over a network. Sub-section I.A describes a conceptual process and example system that may be used to perform the registration. In addition, sub-section I.A describes real-time pre-filtering that may be performed in some embodiments to ensure that potentially valid evidence of registration is produced. Sub-section I.B then describes the generation of registration tasks performed by some embodiments. Next, sub-section I.C describes an example evidence of registration generated by some embodiments.

A. Process and System for Performing Registration

Figure 3:
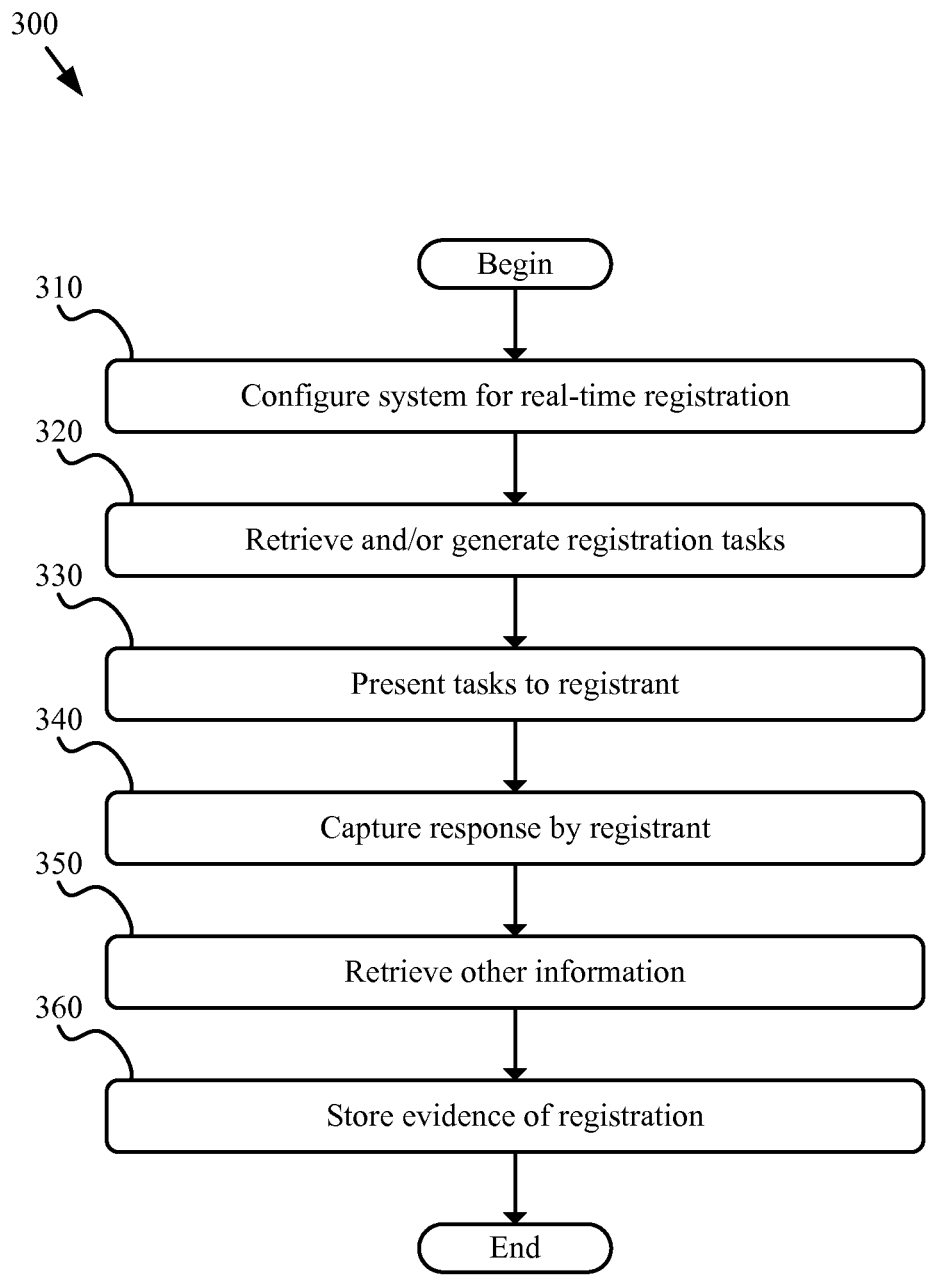
FIG. 3 conceptually illustrates an example of a process that some embodiments use to perform registration.

As described above, some embodiments manage the registration of a new user to a network system or application. FIG. 3 conceptually illustrates an example of a process 300 that some embodiments use to perform registration. Process 300 will be described by reference to FIGS. 4-5 which illustrate various system resources that may be used during registration.

Figure 4:
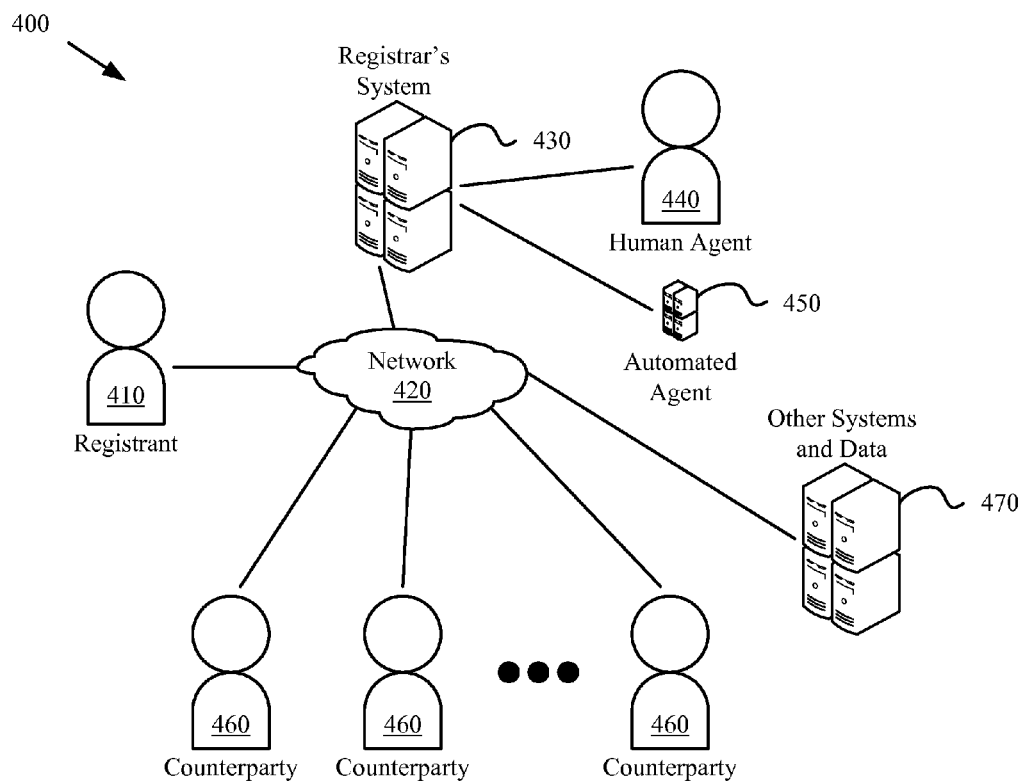
FIG. 4 illustrates a system used by some embodiments to perform registration.

FIG. 4 illustrates a system 400 used by some embodiments to perform registration. In some embodiments, such a system may be used to perform various other operations, as described below. The system includes a registrant 410, a network 420, a registrar 430 that may have one or more human and/or automated agents 440-450, various counterparties 460, and other systems and data 470. The registrant 410 may be any entity that wishes to access resources provided over the network 420, typically through a user device, several examples of which are described below in reference to FIG. 5. The network is for providing communication among various entities that provide, use, distribute, or otherwise process and/or pass information over the network. Typically, the registrant 410 (and/or other system users) will connect to the network 420 using a secure connection (i.e., a connection that uses data encryption such that data transferred over the network may not be intercepted by other users). The network 420 is a conceptual representation and may include one or more public and/or private communication networks (e.g., a cellular network, a plain old telephone system network, a wireless network, the Internet, etc.).

The registrar's system 430 provides and/or manages services using the network. The human and/or automated agents 440-450 provide and/or process information for the registrar 430 either directly or over a network connection. Counterparties 460 are any entities that may potentially interact with the registrant over the network (through the registrar's system 430 and/or some other system or resource), typically through a user device, as described below in reference to FIG. 5. Other systems and data 470 provide various computational, storage, communication, and/or other services and/or resources to one or more network entities.

Figure 5:
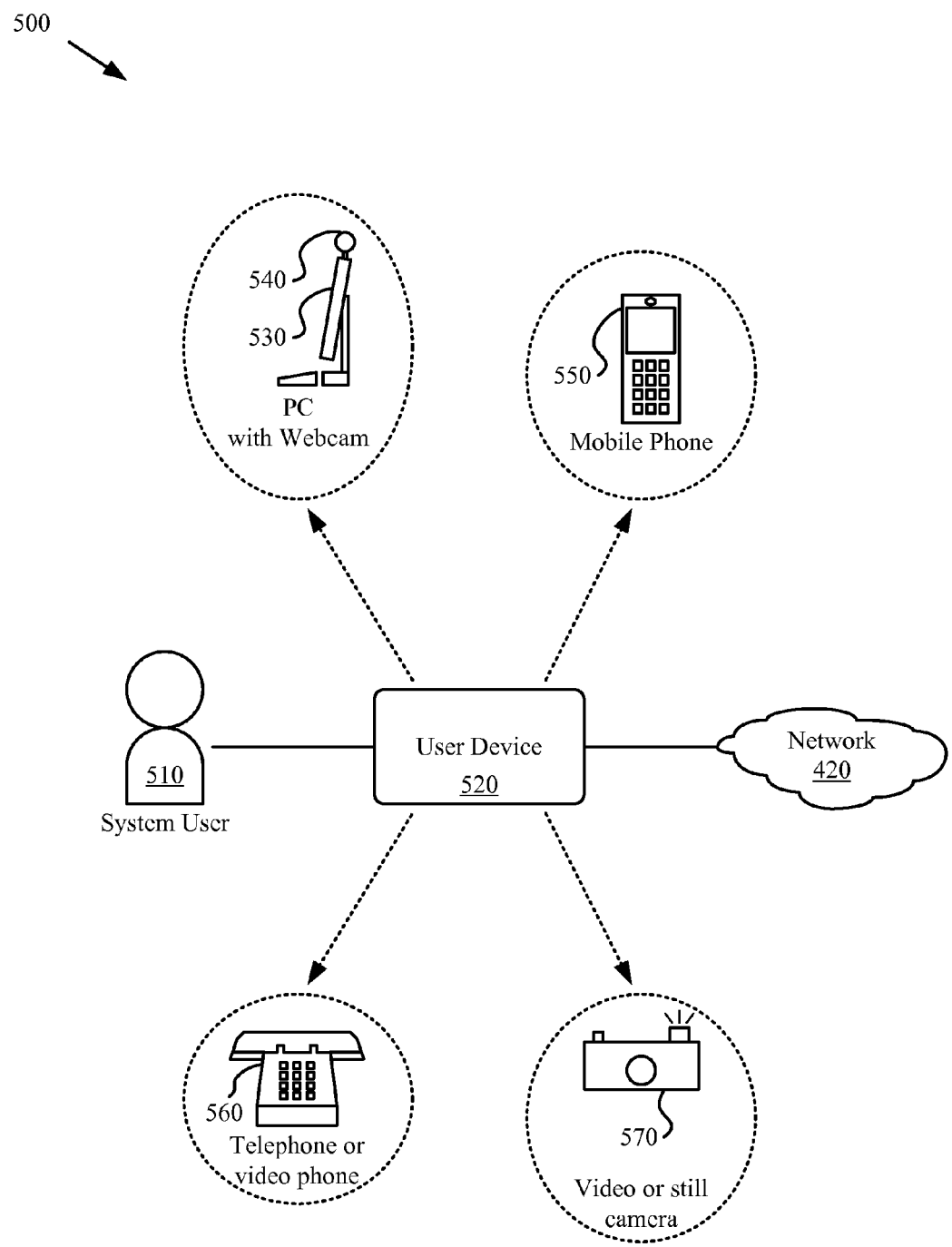
FIG. 5 conceptually illustrates a connection path for a user.

FIG. 5 illustrates a typical connection path 500 for a user. In this example, a user 510 (e.g., registrant 410 or counterparty 460 of FIG. 4), connects to a network 420 using a user device 520. Such a user device typically includes hardware and/or software capabilities that allow the device to perform a user registration in conjunction with some embodiments of the invention. For instance, the user device may be a PC 530 with a webcam 540, a mobile phone 550, a telephone or video phone 560, or a network-connected video or still camera 570. Some embodiments may use one or more other devices, either in conjunction with the user device 520 or in place of the user device, to connect to the network 420 (e.g., a terminal adaptor, a modem, a wireless connection device, etc.). In addition to the devices shown in FIG. 5, one of ordinary skill in the art will recognize that various other devices may be used to access network 420 (e.g., a Smartphone, PDA, handheld device, netbook, etc.).

To execute a registration interview, the system requires the ability to capture a video and audio interview in which a person (and/or automated agent) viewing or playing back the captured interview could detect tampering. Thus, any user device that is used during the generation of the interview must be capable of supporting a real-time capture of the interview with a quality sufficient to ensure that the test can be properly conducted and evaluated (e.g., a human reviewer, an automated agent, etc.).

Returning to FIG. 3, process 300 begins when a user registration is initiated. The user registration may be initiated in various ways. For instance, registrant 410 of FIG. 4 may attempt to create or access an account on the registrar's system 430 through a network connection 420. Such a registrant may connect to the network using various user devices (e.g., any of the user devices 530-570 of FIG. 5). In addition, some embodiments may connect to the network through a variety of available browsers that may allow a user to access various network applications and/or information.

Next, the process configures (at 310) the system for the real-time registration. Such configuration may depend on the user device and/or connection properties. For instance, when the user is registering using a PC with webcam (e.g., the PC and webcam 530-540 of FIG. 5), the configuration may include specifying various settings for the webcam (e.g., video size, capture rate, etc.) and/or the PC's sound settings (e.g., speaker settings, microphone settings, etc.). Other devices may include only audio capabilities (e.g., the telephone 560 of FIG. 5) and thus may only configure audio settings. In addition to configuring the audio and video capabilities of the system, some embodiments configure various other elements and/or data accessible over the network. For instance, when the user device is a mobile phone (e.g., mobile phone 550 of FIG. 5), the configuration may include configuring elements of the mobile phone such that information relevant to the registration may be retrieved and/or stored (e.g., GPS location, time of day, etc.). The configuration may be performed by a system such as the registrar system 430 of FIG. 4 in conjunction with the network 420 and user device such as the device 520 of FIG. 5.

The process 300 then retrieves and/or generates (at 320) the registration tasks that will be presented to the user during registration. Such registration tasks may include various questions (e.g., "What is your name?"), verbal prompts (e.g., "Repeat the following sequence: 'BCDA'"), and/or physical or other prompts (e.g., "Raise your right hand."). The retrieval and/or generation of registration tasks will be described in more detail in reference to FIGS. 8-9 below.

Next, the process presents (at 330) the registration tasks to the registrant. The tasks may be presented in various ways and/or using different media formats depending on various settings, capabilities (e.g., rendering capabilities of the user device), and/or options (e.g., based on the preference of the registrar, the registrant, and/or the capabilities of the user device). For instance, some embodiments provide an audio cue as a user task. Other embodiments may provide a visual cue as a task (e.g., by displaying text to recite, by displaying a photo or graphical representation of an object, etc.). Still other embodiments provide a combination of audio and visual cues. Such cues may be presented by a human or automated agent (e.g., agents 440-450 of FIG. 4).

As one example, in some embodiments the registration tasks are presented using an Internet-connected PC equipped with a webcam (e.g., PC and webcam 530-540 of FIG. 5). Typically such a PC and/or webcam will include a video device (e.g., a monitor) and an audio device (e.g., headphones, speakers, etc.) that allow the system to present tasks to the registrant.

Next, the process captures (at 340) the responses by the registrant to the registration tasks. The capture may depend on various factors, such as the type of user device and its capabilities, network type and its capabilities, preference of the registrant or registrar, etc. For example, the capture device (e.g., any one of the user devices 530-570 of FIG. 5) may continuously capture video and audio based on the configuration settings provided in operation 310. In some embodiments, the registrar (e.g., registrar 430 of FIG. 4) directs the operations of the user device during capture. The various software modules and data elements that might be used to implement such operations will be described in more detail in Section VI below.

The process 300 then retrieves (at 350) various other information. For instance, the process may retrieve GPS information from the user device and associate this information with the captured video and audio data. In addition, the process may retrieve various information that identifies the user device (e.g., IP address, phone number, etc.). Furthermore, some embodiments retrieve (or generate) a digital timestamp that indicates when the registration interview took place. Some embodiments perform operations 330-350 iteratively (e.g., by presenting a task, capturing the response, and retrieving other information before repeating the operations for another task) until a set of registration tasks has been completed. Process 300 stores (at 360) the evidence of registration. Such storage may include placing a secure copy of the evidence of registration at a location that has access controlled by a particular registrant. For instance, some embodiments store the evidence of registration on the registrar's system 430 of FIG. 4 after passing the evidence of registration over network 420.

One of ordinary skill in the art will recognize that the operations of process 300 are conceptual and may not necessarily be performed in the order shown. Of course, the order of tasks presented and responses captured during a particular real-time interview cannot be changed. For instance, in some embodiments, the process may retrieve other information (if available) before presenting a registration task. Furthermore, different specific operations may be performed in different embodiments. For instance, some embodiments may not store the evidence of registration, but instead pass the information to another application or resource for storage. Also, the process may not be performed as one continuous series of operations. In addition, the process could be implemented using several sub-processes, or as part of a larger macro-process.

Although various specific examples of system components and communication pathways have been given, one of ordinary skill in the art will recognize that different embodiments may use different components and/or pathways without departing from the spirit of the invention. For instance, in some embodiments a user may connect to a registrar's system through one or more third-party applications or devices in addition or in place of a user device.

Figure 6:
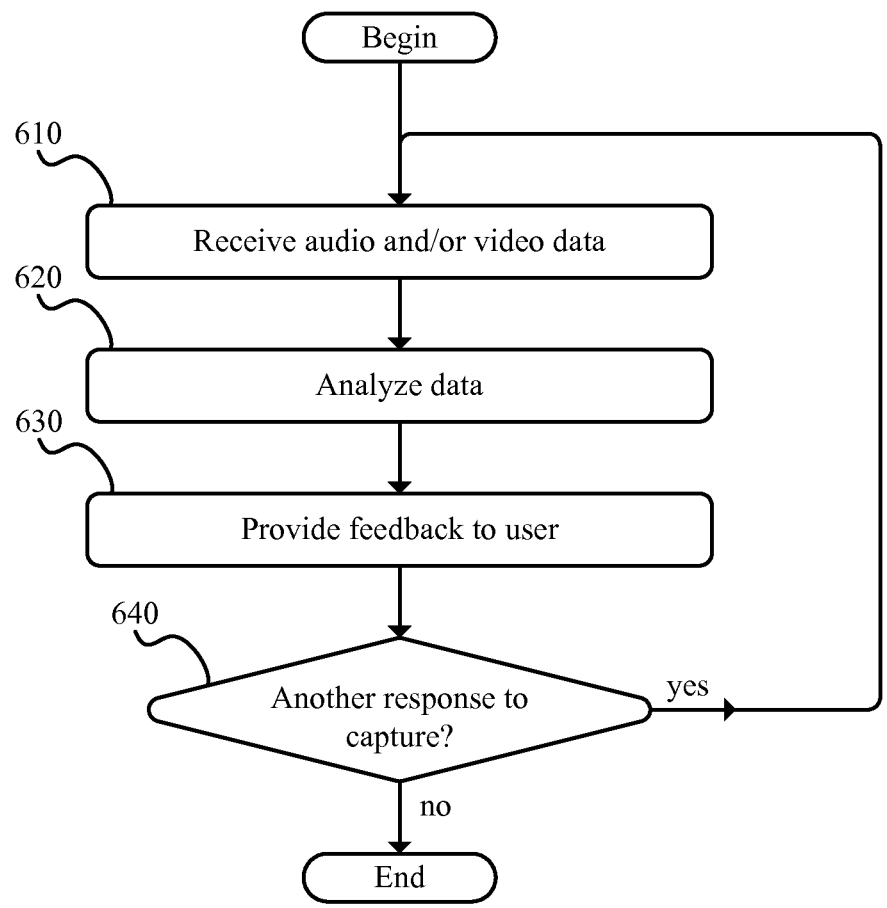
FIG. 6 conceptually illustrates an example of a process that some embodiments use to perform pre-filtering and provide user feedback during registration.

In addition to capturing a registrant's responses to the various registration tasks, some embodiments provide real-time pre-filtering such that a registrant receives feedback indicating whether the evidence of registration may be acceptable. In some embodiments, the real-time pre-filtering may be performed using software executed on the user device that interactively evaluates some attributes of the user's input and provides real-time feedback to the user to allow the user to correct any invalid input. One example of such pre-filtering and feedback will be described in more detail in reference to FIGS. 6-7 below. FIG. 6 conceptually illustrates an example of a process 600 that some embodiments use to perform pre-filtering and provide user feedback during registration. Process 600 will be described by reference to FIG. 7 which illustrates an example user interaction and system response.

Process 600 begins in some embodiments when a registrant's response to a registration task is captured. For instance, some embodiments may perform process 600 during operation 340 of process 300 described above. Different embodiments may begin process 600 based on various different criteria. Next, process 600 receives video, audio, and/or other data. Such data may be received during a capture operation such as that described above in reference to operation 340 of process 300.

Process 600 then analyzes (at 620) the data using various algorithms. Such analysis may depend on the type of data received (at 610). For instance, in some embodiments, when the data is video data, facial recognition analysis is performed in order to determine whether the registrant's face is centered in the frame and/or is unobscured from view. As another example, some embodiments may perform voice recognition (or other audio analysis) to determine whether a registrant's responses will be captured clearly and/or evaluated properly. In this way, the evidence of registration generated during the registration is more likely to accurately reflect the registrant's identity.

The process then provides (at 630) feedback to the registrant. The type of feedback may depend on the type of data analyzed and/or the results of the analysis. For instance, in some embodiments, the feedback may include comments (provided through text, audio, etc.) that direct a registrant to speak more loudly, speak directly into the microphone, etc. As another example, some embodiments may provide visual feedback to a registrant. One example of such feedback is described below in reference to FIG. 7. As an alternative to providing feedback to a registrant, some embodiments may automatically adjust various configuration settings based on the analysis of the captured data. For instance, some embodiments may automatically adjust input sound level in audio data or contrast level in video data based on some appropriate criteria.

Figure 7:
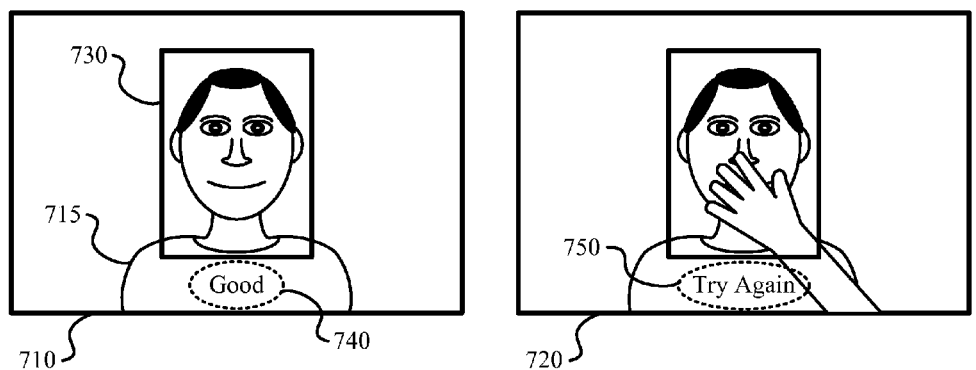
FIG. 7 illustrates an example user interaction during registration and feedback provided during pre-filtering.

FIG. 7 illustrates two example images and example feedback provided based on analysis of the images. Specifically, the figure shows one image 710 where a registrant's 715 face is properly centered and unobscured and another image 720 where the registrant's face is partially obscured. Such images are representative of individual frames sampled from a video stream. In the example image 710, the registrant's face is centered, as indicated by the bounding box 730. Such a bounding box may be displayed by some embodiments to provide feedback to a registrant such that the registrant may properly center her face in the frame. In addition, the registrant's face is unobscured. Based on analysis of factors such as these, in this example the user is provided with visual feedback 740 that indicates that the captured video is likely to be acceptable when used to identify the registrant.

FIG. 7 also illustrates a second image 720 in which the registrant's face is partially obscured by the registrant's hand. In this example, analysis of the video frame reveals that the registrant's face is obscured, thus the visual feedback 750 indicates that the captured video is likely to be unacceptable when used to attempt to identify the registrant. Although the example of FIG. 7 shows evaluation and feedback based on a clear and centered facial view, one of ordinary skill in the art will recognize that various other pre-filtering operations may be performed. For instance, some embodiments may evaluate contrast, color saturation, ambient light levels, brightness, etc. in order to determine whether the captured video will be acceptable for identifying the registrant. Likewise, captured audio may be analyzed in various appropriate ways.

Returning to FIG. 6, process 600 then determines (at 640) whether there is another response to capture (i.e., whether there are additional registration tasks). When there is another response to capture, the process repeats operations 610-640 until the process determines (at 640) that there are no other responses to capture, at which point the process ends.

One of ordinary skill in the art will recognize that the operations of process 600 are conceptual and may not necessarily be performed in the order shown. Furthermore, different specific operations may be performed in different embodiments. For instance, some embodiments may receive other data than video or audio. Also, the process may not be performed as one continuous series of operations. In addition, the process could be implemented using several sub-processes, or as part of a larger macro-process.

B. Generation of Registration Tasks

Figure 8:
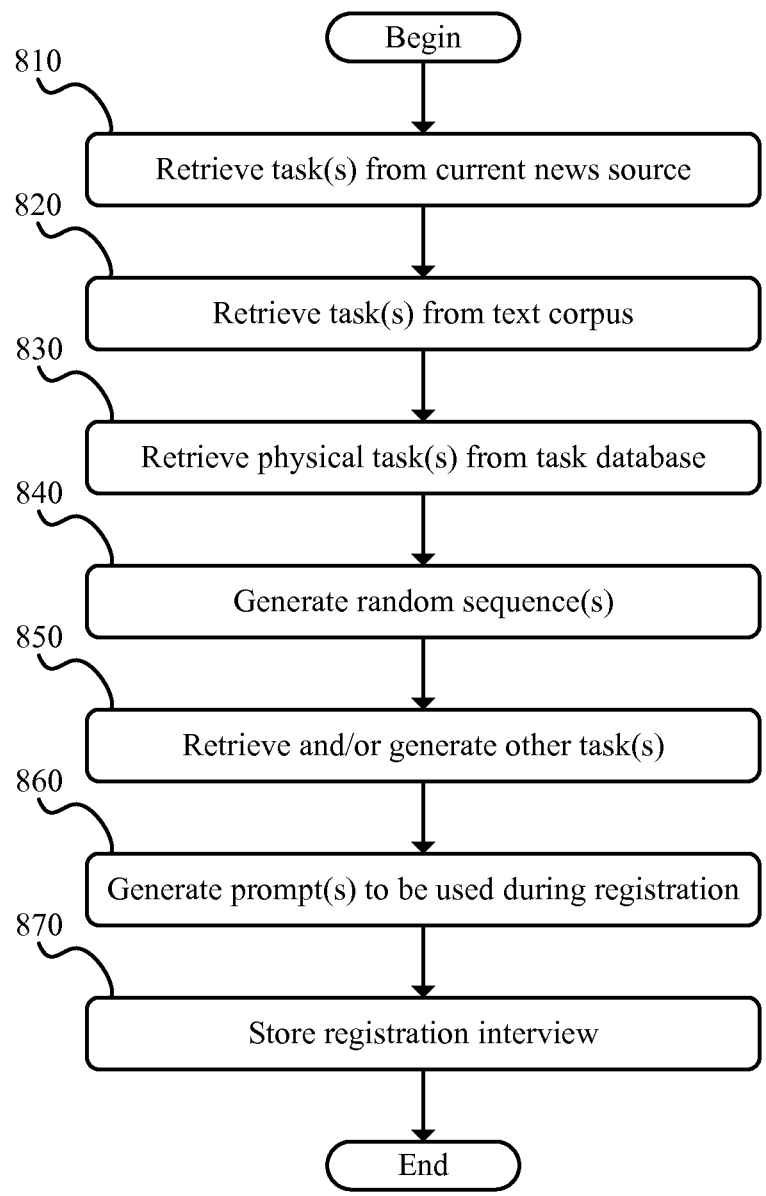
FIG. 8 conceptually illustrates an example of a process that some embodiments use to generate a registration interview.

As described above in reference to operation 320 of FIG. 3, some embodiments retrieve and/or generate various registration tasks that make up a registration interview. Some embodiments select the registration tasks such that the tasks may not be anticipated. In this manner, an imposter (or accomplice) is prevented from falsifying the registration tasks by performing the tasks in advance. FIG. 8 conceptually illustrates an example of a process 800 that some embodiments use to generate a registration interview (i.e., the set of tasks presented to a user during registration). Process 800 will be described by reference to FIG. 9 which illustrates various system resources that may be used to generate a registration interview.

Figure 9:
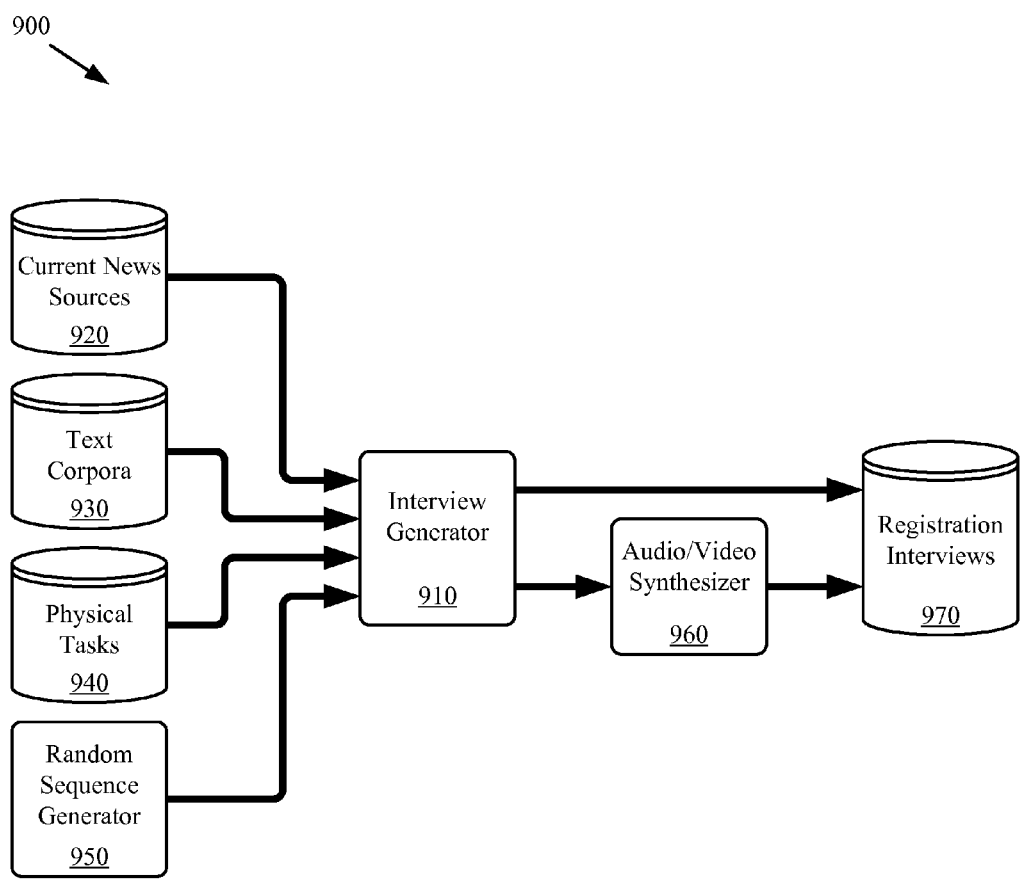
FIG. 9 illustrates a conceptual system used by some embodiments to generate registration interviews.

FIG. 9 illustrates a conceptual system 900 used by some embodiments to generate registration interviews. The elements of system 900 may be included as sub-components in a network-based application such as network-based application 220 described above in reference to FIG. 2. In addition, the elements of system 900 may be implemented using various resources described above in reference to FIGS. 4-5. The system 900 includes an interview generator 910 for retrieving and organizing registration tasks and organizing the tasks into registration interviews, a current news sources storage 920 for storing current news from various sources, a text corpus storage 930 for storing written passages received from various sources, a physical task storage 940 for storing a set of physical registration tasks, a random sequence generator 950 for generating random alphanumeric sequences, an audio/video synthesizer 960 for generating audio and/or or video prompts based on various types of source data, and a registration interview storage 970 for storing registration interviews. The operation of these various components will be described below in reference to process 800.

Returning to FIG. 8, process 800 begins when a request to perform a registration interview is made. Such a request could be initiated by a resource such as the registrar's system 430 described above in reference to FIG. 4. The request could be received by a module such as the interview generator 910 of FIG. 9. Process 800 then retrieves (at 810) one or more registration tasks from current news sources. Such registration tasks may include randomly-selected headlines from recent newspaper articles, sections of current news stories, sports results, and/or any other source of information where the source includes information that became available after a particular time (e.g., information that becomes available as of a publication date). The registration tasks may be retrieved (at 810) at the time of the registration interview by a component such as the interview generator 910 from one or more current news source storages 920.

Different embodiments may retrieve different types of content to serve as registration tasks. For instance, some embodiments retrieve only text-based content. Some of these embodiments may subsequently synthesize audio and/or video content from the text-based content. As another example, some embodiments retrieve audio content and/or video content (e.g., a user may be asked to repeat a phrase that is spoken by a reporter during a video news segment).

In some embodiments, such tasks are compiled and stored at various regular intervals (e.g., daily, hourly, etc.), such that a pool of tasks is available when a registration interview is generated. In some of these embodiments, tasks may be selected from the pool of tasks using a randomized selection method such that a nefarious user may not accurately predict the selected tasks. Some embodiments may collect the tasks from various sources that are available over a network (e.g., the Internet) by searching various news distribution sites for appropriate content. Other embodiments may receive sets of tasks from one or more distribution sites (or other content providers), or a third party may store various tasks in a location that is accessible to a module such as interview generator 910 of FIG. 9.

Process 800 then retrieves (at 820) one or more registration tasks from various available text corpora. Such registration tasks may include various phrases and/or passages included in the text corpora. The text corpora may include various obscure books, reference materials, etc. The registration tasks may be retrieved (at 820) by a component such as the interview generator 910 from one or more text corpora storages 930. As above, in some embodiments, such tasks are compiled and stored at various regular intervals, such that a pool of tasks is available when a registration interview is generated. In addition, as above, some embodiments randomize the selection of the tasks. Some embodiments may collect the tasks from various sources that are available over a network (e.g., the Internet) by searching various news distribution sites for appropriate content. Other embodiments may receive sets of tasks from one or more distribution sites (or other content providers), or a third party may store various tasks in a location that is accessible to a module such as interview generator 910 of FIG. 9.

Next, process 800 retrieves (at 830) one more physical registration tasks from a task database. Such tasks may include various physical actions to be performed by a registrant during a registration interview (e.g., raise your right hand, touch your nose, hold up three fingers, etc.). The registration tasks may be retrieved (at 830) by a component such as the interview generator 910 from one or more task storages 940. Such physical tasks are typically pre-compiled and placed in a storage such that the tasks are available for retrieval when the registration interview is generated. As discussed above, some embodiments randomize the selection of the tasks.

Process 800 then generates (at 840) random sequences of alphanumeric characters. Such a random sequence may be generated by a component such as random sequence generator 950 and retrieved by a component such as the interview generator 910. The random sequence is generated such that a registrant may not fraudulently compile a set of registration responses before the registration interview. Alternatively or conjunctively to generating a random sequence, some embodiments generate a string of alphanumeric numbers calculated based on a value that is determined at the time of registration (e.g., by calculating a hash value of a frame-grab of the face of the registrant from video captured during registration).

The process then retrieves and/or generates (at 850) other tasks. In some embodiments, the registration tasks include a combination of static tasks that are asked of every registrant (e.g., questions regarding personal information such as name, date of birth, place of birth, etc.), tasks that are randomly selected from a set of previously-determined tasks, and tasks that are generated at the time of registration. The tasks retrieved and/or generated (at 850) may include a combination of static tasks, randomly-selected tasks, and/or randomly-generated tasks.

Next, process 800 generates (at 860) prompts to be used during registration. Different embodiments may generate prompts in different ways and using various different formats depending on the format of the registration tasks and the capabilities of the user device or system. For instance, in some embodiments the tasks may all initially be represented using text. Some of these embodiments may generate audio prompts from the text using an audio synthesizer. Other embodiments may format the text such that it may be conveniently displayed on a user device. Still other embodiments may generate various other visual prompts (e.g., an animated example of a physical task) that may be provided to a user. In some embodiments, the interview generator 910 generates these prompts in conjunction with various audio/video synthesizers 960 and/or other appropriate components.

Process 800 then stores (at 870) the registration interview. The stored interview may include various audio/visual prompts, text data, user data, etc. The interview may be stored using various formats (e.g., alphanumeric text, video clips, audio clips, etc.). In some embodiments, a component such as the interview generator 910 stores the registration interview in a location such as registration interview storage 970. In some embodiments, the audio/video synthesizer 960 also sends data to the interview storage 970 (e.g., audio and/or video clips to be used as interview prompts). Such a storage may be accessible to the registrar's system such that the registration interview may be retrieved during the registration process.

One of ordinary skill in the art will recognize that the operations of process 800 are conceptual and may not necessarily be performed in the order shown. Furthermore, different specific operations may be performed in different embodiments. For instance, some embodiments may not store the registration interview but may generate and use the interview prompts in real-time. As another example, some embodiments may retrieve previously-generated random sequences rather than generating random sequences. As yet another example, some embodiments may generate a registration interview using only a sub-set of the resources described above (e.g., the interview may be generated entirely from random sequences). As still another example, some embodiments may retrieve tasks from other sources than those described above (e.g., from encyclopedias, dictionaries, etc.). Also, the process may not be performed as one continuous series of operations. In addition, the process could be implemented using several sub-processes, or as part of a larger macro-process.

In addition, although the system 900 of FIG. 9 has been described with reference to certain features and details, one of ordinary skill in the art will recognize that such a system may be implemented in various different ways without departing from the spirit of the invention. For instance, in some embodiments, the interview generator may access one or more of the other components (e.g., storages 920-950, random sequence generator 950, etc.) using a network connection. As another example, the functionality of a component such as interview generator 910 (and/or other components of system 900) may be provided by other systems, be provided by sub-components of a larger system, or otherwise be implemented differently than the example of FIG. 9.

C. Evidence of Registration

As described above, some embodiments store evidence of registration that is generated based on a registration interview. The evidence of registration may be generated using a process such as process 300 described above in reference to FIG. 3, where the registration may be performed using a system such as system 400 described in FIG. 4. In some embodiments, the evidence of registration is made available to users other than the registrant. For instance, in some embodiments a potential counterparty can view some or all of the evidence of registration of a registered user before choosing to interact with the registered user. For example, the evidence of registration may be exposed as part of the user profile of a registered user in a social networking application.

Figure 10:
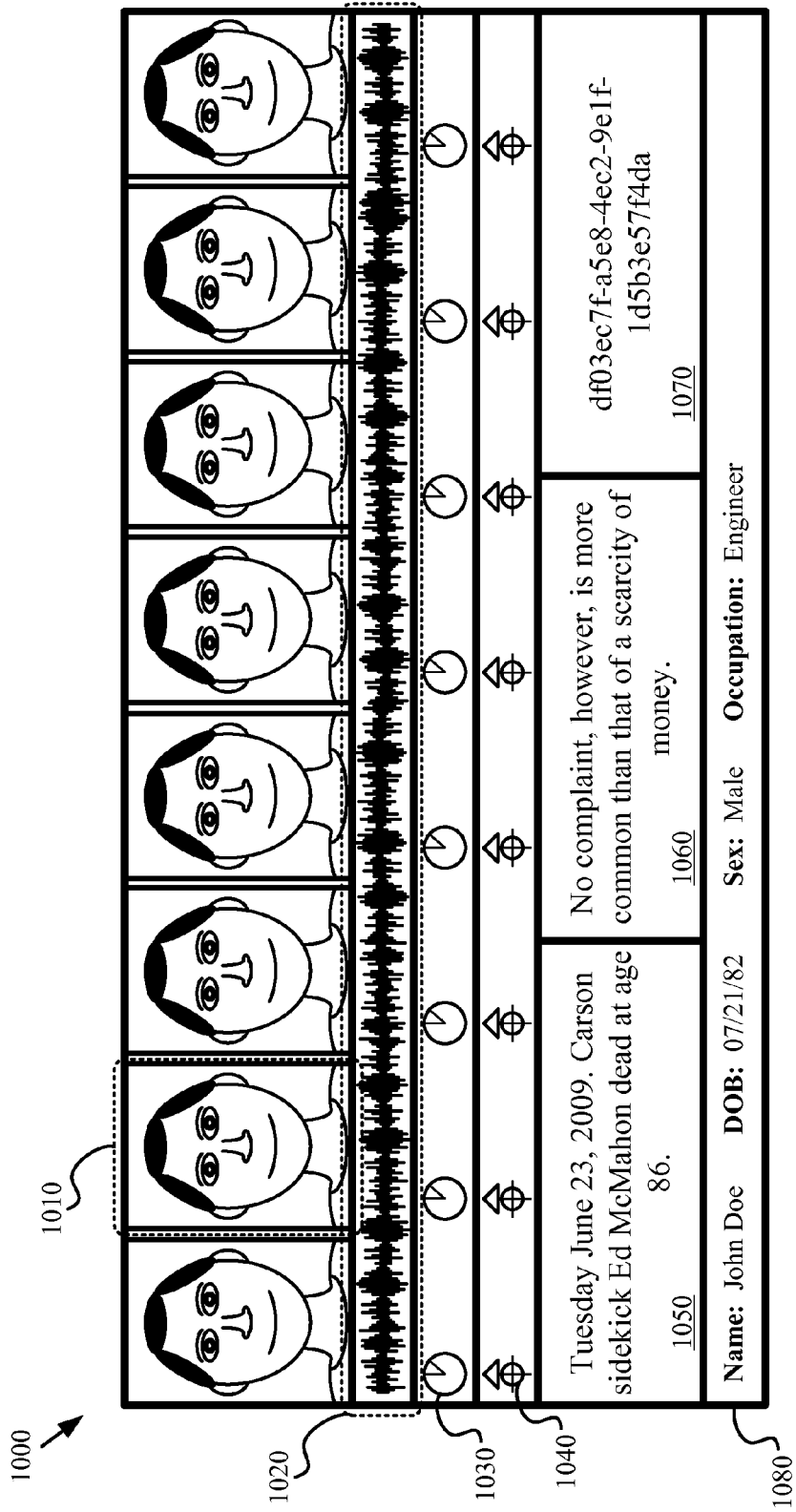
FIG. 10 illustrates a conceptual example of the evidence of registration generated by some embodiments.

FIG. 10 illustrates one conceptual example of such evidence of registration 1000. Specifically, this figure shows various elements that may be included in the evidence of registration. Several example data structures used to implement such evidence of registration are described below in reference to FIG. 22. An example user interface that may be provided to various counterparties is described below in reference to FIG. 16.

As shown, in this example the evidence of registration includes captured video data 1010, captured audio data 1020, a series of digital timestamps 1030, location information 1040, various registration tasks 1050-1070, and registrant profile information 1080. In addition to or instead of these elements, some embodiments store other data collected during the registration interview (e.g., type of user device).

The series of thumbnail images 1010 represent frames of captured video. Some embodiments store the captured video as a video clip, while other embodiments store a set of frames from the captured video (e.g., every tenth frame of video may be stored). Likewise, the audio data 1020 may be stored as an audio clip, thus allowing others to review the audio portion of the evidence of registration (if any) to discern whether the audio was captured continuously and/or whether the audio matches the facial movements of the registrant. Each digital timestamp 1030 represents a specific point in time when the interview (or portion of the interview) took place. For instance, in the example of FIG. 10, each digital timestamp 1030 specifies the time the thumbnail 1010 displayed above each timestamp was captured during the registration interview. The other information 1040 may include various other information (e.g., GPS location, IP address, etc.) associated with the registration interview.

The registration tasks 1050-1070 indicate some or all of the tasks presented to the registrant during the registration interview. In addition, some embodiments may store the tasks as a list or some other way that indicates the order in which the tasks were presented. In this way, the presented tasks may be compared to the registrant's responses. Some embodiments may include indications that various tasks have been verified as performed correctly (or not performed correctly). In addition, some embodiments may store various other information regarding the evidence of registration (e.g., information regarding the network-based application that generated the evidence of registration, feedback from other counterparties, etc.).

The registrant profile information 1080 includes identifying information provided by the registrant (and/or identifying information collected in other ways). Different embodiments may collect different profile information depending on various factors (e.g., the type of services provided by the network-based application used to generate the evidence of registration, registrant preference, etc.).

One of ordinary skill in the art will recognize that while the example evidence of registration 1000 shown in FIG. 10 has been described with reference to various specific details and features, different embodiments may implement the evidence of registration in different ways without departing from the spirit of the invention. For instance, some embodiments may include various other data (e.g., a listing of other evidences of registration the registrant has generated, a summary of the registrant's access history, etc.).

II. Validation of Evidence of Registration

As mentioned above, after generating the evidence of registration, some embodiments perform participant validation and/or response validation of the evidence in order to determine whether the registrant is identifiable and/or has complied with the supplied registration tasks. Sub-section II.A describes a conceptual process and example system that may be used to perform participant validation. Sub-section II.B then describes a conceptual process and example system that may be used to perform response validation.

A. Process and System for Participant Validation

Figure 11:
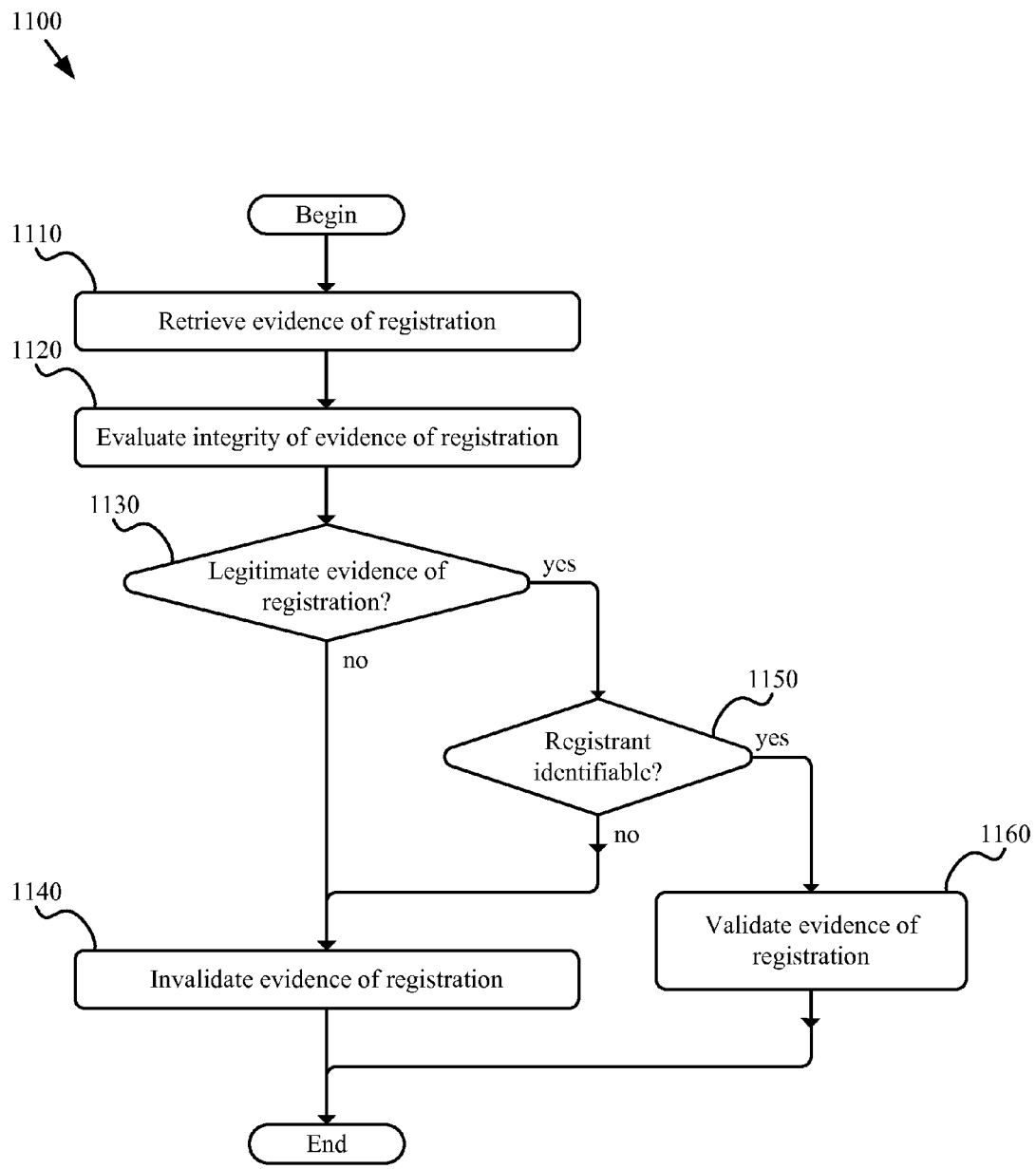
FIG. 11 conceptually illustrates an example of a process that some embodiments use to perform participant validation.

As described above in reference to operation 120 of FIG. 1, after generating evidence of registration, some embodiments perform participant validation of the evidence. FIG. 11 conceptually illustrates an example of a process 1100 that some embodiments use to perform participant validation of the evidence of registration. Process 1100 will be described by reference to FIG. 12 which illustrates various system resources that may be used to perform some or all of process 1100.

Figure 12:
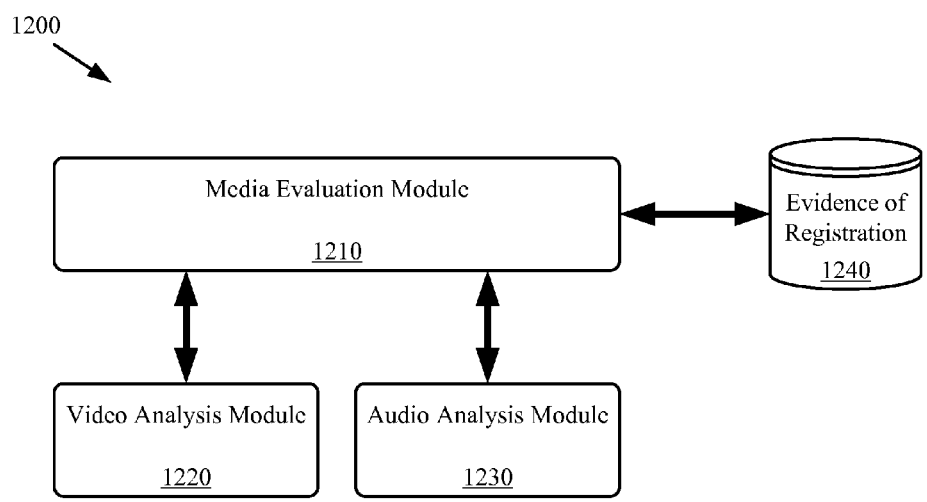
FIG. 12 illustrates a conceptual system used by some embodiments to validate evidence of registration.

FIG. 12 illustrates a conceptual system 1200 used by some embodiments to validate the evidence of registration. The elements of system 1200 may be included as sub-elements in a larger system such as the network-based application 220 described above in reference to FIG. 2. In addition, the elements of system 1200 may be implemented using various resources described above in reference to FIGS. 4-5. The system 1200 includes a media evaluation module 1210 for evaluating evidence of registration and communicating with various analysis modules, a video analysis module 1220 for analyzing video media, and an audio analysis module 1230 for analyzing audio media. In addition, the media evaluation module 1210 accesses an evidence of registration storage 1240 that is for storing evidences of registration. The operation of these various components will be described below in reference to process 1100.

Returning to FIG. 11, process 1100 begins in some embodiments when an evidence of registration is generated. Alternatively, the process may begin when a potential counterparty selects a registered user as a candidate for interaction. The process then retrieves (at 1110) a particular evidence of registration. In some embodiments, a module such as the media evaluation module 1210 may retrieve the evidence of registration from a location such as the evidence of registration storage 1240.

Process 1100 then evaluates (at 1120) the integrity of the evidence of registration. Such evaluation may include analysis of audio and/or video data included in the evidence of registration. For instance, some embodiments may determine whether the audio and/or video data was produced in one continuous real-time stream by analyzing properties of the data (e.g., by comparing the content in adjacent video frames, by comparing sections of audio data to determine whether the data came from a single source, by comparing video and audio data to determine whether the data is synchronized, etc.). As another example, some embodiments may evaluate digital timestamp information included in the evidence of registration to determine if the timestamp information was taken at regular intervals or is otherwise consistent with a real-time capture of data. As yet another example, some embodiments evaluate GPS location information included in the evidence of registration to determine whether the location information is consistent with a real-time capture of data (e.g., by determining whether the GPS location changes abruptly).

The analysis may be performed by the media evaluation module 1210 in some embodiments. In some embodiments, the analysis is performed in conjunction with modules such as the video analysis module 1220, the audio analysis module 1230, and/or other appropriate analysis modules (e.g., a module for analyzing digital timestamp information, a module for analyzing encryption information, etc.).

After evaluating (at 1120) the evidence of registration, the process determines (at 1130), based on the evaluation, whether the evidence is legitimate. This determination may be made by considering the various analyses done when evaluating the evidence. For instance, some embodiments may weight analysis of certain data (e.g., GPS position, digital timestamp information, etc.) more heavily than analysis of other data (e.g., video content, audio content, etc.). In addition, some individual analysis may be dispositive in determining whether the evidence is legitimate (e.g., analysis that indicates that a file storing the evidence of registration has been tampered with). The determination of whether the evidence is legitimate may be made by a module such as media evaluation module 1210.

When process 1100 determines (at 1130) that the evidence of registration is legitimate, the process continues to operation 1150, which is described below. When the process determines that the evidence is not legitimate, the process invalidates (at 1140) the evidence of registration. The invalidation may include setting a flag or otherwise updating the evidence to indicate that the evidence has been evaluated and determined to be illegitimate. Some embodiments may include the reason for the determination (e.g., timestamps inconsistent, audio/video mismatch, etc.). The evidence may be updated by a module such as media evaluation module 1210 and the updated evidence then stored in a location such as evidence of registration storage 1240. After invalidating (at 1140) the evidence, the process ends.

In some embodiments (e.g., when validation is performed at the time of registration), the invalidation may affect the registrant's access to the network application and/or the registrant's user status. For instance, some embodiments may not fully activate a user's account until the evidence of registration is validated. As another example, some embodiments may restrict access to certain features provided by the network application until the evidence of registration is validated. As still another example, some embodiments may deactivate a user's account when the evidence of registration used to create the account is determined to be invalid.

When the process 1100 determines (at 1130) that the evidence of registration is legitimate, the process determines (at 1150) whether the registrant is identifiable (i.e., whether or not an individual who knows the registrant could identify the registrant by reviewing the evidence of registration). In some embodiments, when video data is available, this determination is made using automated facial recognition. Alternatively and/or conjunctively, some embodiments evaluate the various attributes of available video data to determine whether it is likely that the registrant is identifiable (e.g., by evaluating contrast, brightness, ambient light conditions, etc.). The determination may be made by a module such as media evaluation module 1210. When the process determines (at 1130) that the registrant is not identifiable, the process proceeds to operation 1140 as described above and ends.

When the process determines (at 1130) that the registrant is identifiable, the process validates (at 1160) the evidence of registration and ends. The validation may include setting a flag or otherwise updating the evidence to indicate that the evidence has been evaluated and found to be legitimate. The evidence may be updated by a module such as media evaluation module 1210 and the updated evidence then stored in a location such as evidence of registration storage 1240.

One of ordinary skill in the art will recognize that the operations of process 1100 are conceptual and may not necessarily be performed in the order shown. Furthermore, different specific operations may be performed in different embodiments. For instance, some embodiments may update a metric that provides a relative indication of a user's identifiability rather than flagging the evidence of registration as valid or invalid. Also, the process may not be performed as one continuous series of operations. In addition, the process could be implemented using several sub-processes, or as part of a larger macro-process. For instance, in some embodiments when the evidence is found to be invalid (or when the determination of validity is questionable), a further analysis is performed to verify the finding. Such further analysis may include more thorough automated analysis and/or review of the evidence by a human agent.

In addition, some embodiments may perform validation using various entities. For instance, in some embodiments validation is completely automated and performed by a system such as system 1200. In some embodiments, analysis by a set of one or more centralized and/or distributed human evaluators may be performed. In addition, the review may be at least partly performed by counterparties of the registrant in some embodiments.

In addition, although the system 1200 of FIG. 12 has been described with reference to certain features and details, one of ordinary skill in the art will recognize that system 1200 is a conceptual representation only, and may be implemented in various different ways without departing from the spirit of the invention. For instance, different embodiments may include different specific modules (e.g., a facial recognition module, a combined video and audio analysis module, etc.) and/or communication pathways than those shown in FIG. 12 (e.g., the audio and/or video analysis modules 1220 and 1230 may access the evidence of registration storage 1240 directly).

Figure 13:
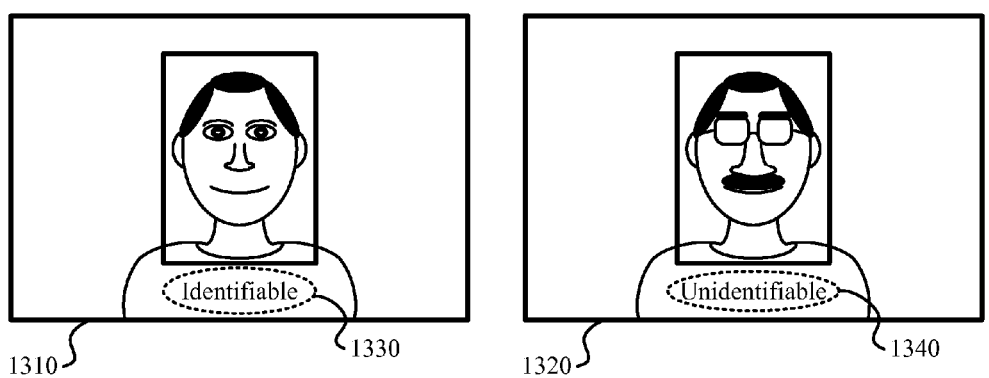
FIG. 13 illustrates an example of video data included in the evidence of registration that may be used to determine whether a registrant is identifiable.

FIG. 13 illustrates an example of video data included in the evidence of registration that may be used to determine whether a registrant is identifiable. Such a determination may be made by performing a process such as process 1100 described above in reference to FIG. 11 using a system such as system 1200 described above in reference to FIG. 12. FIG. 13 shows two example video frames 1310-1320. In the first frame 1310, the registrant's face is unobscured and clearly visible. Thus, in this example, the registrant has been flagged as identifiable, as indicated by the text marker 1330. Although the text marker 1330 is conceptual, some embodiments may display a similar marker with the evidence of registration or in the user's profile as an indication to potential counterparties of identifiability of the registered user.

In the second frame 1320, the registrant's face is partially obscured by a disguise. In such a case, automated analysis of the frame may not indicate conclusively whether the registrant is identifiable (i.e., depending on the sophistication of the analysis, such a disguise may not be recognized as a disguise). In some cases, the automated analysis may indicate that the identifiability of the registrant is questionable. In these cases, further analysis may be performed (e.g., by using a more sophisticated facial recognition system to evaluate the video, by having a human agent review the video, etc.). In this example, the end result is a determination that the registrant is unidentifiable as indicated by the conceptual text marker 1340.

Although the example of FIG. 13 uses video content, one of ordinary skill in the art will recognize that audio content may be similarly analyzed and flagged. In addition, although in the example of FIG. 13, the registrant is obscured using a physical disguise, in some cases a registrant may attempt to obscure her identity using an electronic disguise (e.g., by superimposing an image over the video data, through pixelization of some portion of the video data, etc.).

B. Process and System for Response Validation

Figure 14:
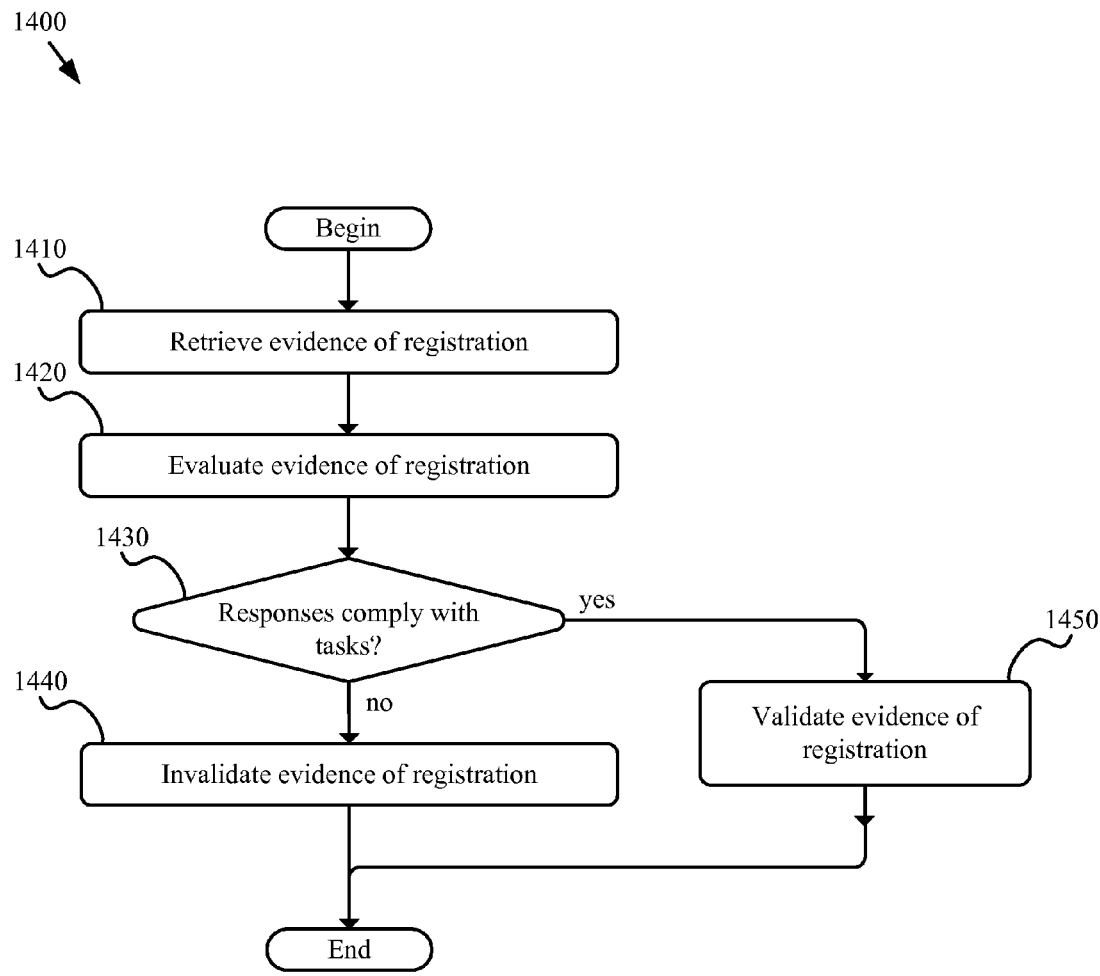
FIG. 14 conceptually illustrates an example of a process that some embodiments use to perform response validation.

As described above in reference to operation 120 of FIG. 1, after generating evidence of registration, some embodiments perform response validation of the evidence. FIG. 14 conceptually illustrates an example of a process 1400 that some embodiments use to perform response validation of the evidence of registration. Process 1400 will be described by reference to system 1200 described above in reference to FIG. 12, which illustrates various system resources that may be used to perform some or all of process 1400.

Process 1400 begins in some embodiments after an evidence of registration is successfully validated. Such validation may be performed as described above in Section II. Alternatively, the process may begin when a potential counterparty selects a registered user as a candidate for interaction. The process then retrieves (at 1410) a particular evidence of registration. In some embodiments, a module such as the media evaluation module 1210 may retrieve the evidence of registration from a location such as the evidence of registration storage 1240.

Process 1400 then evaluates (at 1420) the evidence of registration. As above, such evaluation may include analysis of audio and/or video data included in the evidence of registration. Some embodiments use a component such as a speech recognition module to identify the responses a registrant provides to various registration tasks (when an audio response is applicable). In addition, some embodiments use a component such as a facial recognition module to identify the responses a registrant provides to various registration tasks (either as an alternative to or in conjunction with the audio analysis described above). Furthermore, some embodiments evaluate the video data to identify physical responses to various registration tasks (when a physical response is applicable). Some embodiments evaluate the audio and video data in conjunction to determine whether the audio data matches the registrant's facial movements as captured in the video data.

The analysis of the audio and video data may be performed by the media evaluation module 1210 in some embodiments. In some embodiments, the analysis is performed in conjunction with modules such as the video analysis module 1220 (which includes a facial recognition module in some embodiments), the audio analysis module 1230 (which includes a speech recognition module in some embodiments), and/or other appropriate analysis modules.

In addition to evaluating (at 1420) the audio and video data, some embodiments retrieve and evaluate the registration tasks that were presented to the registrant. In some embodiments, these registration tasks are stored with the evidence of registration (e.g., as a text list of tasks). In other embodiments, the evidence of registration may include a reference to an external file that includes the registration tasks. For example, some embodiments may store the registration interviews in a storage such as storage 970 described above in reference to FIG. 9. The registration tasks may be retrieved by the media editing module 1210 in some embodiments.

After evaluating (at 1420) the evidence of registration, the process determines (at 1430), based on the evaluation, whether the registrant's responses comply with the provided tasks. This determination may be made by considering the various analyses done when evaluating the evidence. For instance, some embodiments may compare audio responses identified during evaluation with the associated registration tasks provided in the registration interview. In some embodiments, the registration tasks may include references to various compliance criteria. For instance, when the registrant is asked to repeat a phrase, the compliance criteria may include a desired level of matching between the supplied phrase and the registrant's response. As another example, when the registrant is asked to perform a physical act, the compliance criteria may include a specified level of matching between the desired response and the response identified through video analysis.

In this way, process 1400 may determine whether the registrant's responses complied with the supplied registration tasks. As another example, a similar comparison may be performed between the physical responses identified during evaluation with the associated registration tasks provided in the registration interview. The determination of whether the responses comply with the tasks may be made by a module such as media evaluation module 1210. Alternatively, one or more other users (i.e., a counterparty on a social networking site) may determine whether the responses comply with the tasks. An example user interface that some embodiments provide to allow a user (or human agent) to evaluate (at 1420) evidence of registration and determine (at 1430) whether the responses correspond to the supplied tasks is described below in reference to FIG. 18.

When process 1400 determines (at 1430) that the responses comply with the tasks, the process continues to operation 1450, which is described below. When the process determines that the responses do not comply with the tasks, the process refutes (at 1440) the evidence of registration. The refutation may include setting a flag or otherwise updating the evidence to indicate that the evidence has been evaluated and the responses found to not comply with the tasks. Some embodiments may include the reason for the determination (e.g., non-matching response to audio cue, failure to comply with physical task request, etc.). The evidence may be updated by a module such as media evaluation module 1210 and the updated evidence then stored in a location such as evidence of registration storage 1240. After refuting (at 1440) the evidence, the process ends.

As above, in some embodiments (e.g., when response validation is performed at the time of registration), the refutation may affect the registrant's access to the network application and/or the registrant's user status. For instance, some embodiments may not fully activate a user's account until the evidence of registration is validated. As another example, some embodiments may restrict access to certain features provided by the network application until the evidence of registration is validated. As still another example, some embodiments may deactivate a user's account when the evidence of registration used to create the account is invalidated.

When the process 1400 determines (at 1430) that the responses comply with the tasks, the process validates (at 1450) the evidence of registration and ends. The validation may include setting a flag or otherwise updating the evidence to indicate that the evidence has been evaluated and found to be valid. The evidence may be updated by a module such as media evaluation module 1210 and the updated evidence then stored in a location such as evidence of registration storage 1240.

One of ordinary skill in the art will recognize that the operations of process 1400 are conceptual and may not necessarily be performed in the order shown. Furthermore, different specific operations may be performed in different embodiments. For instance, some embodiments may update a metric that provides a relative indication of the validity of the evidence of registration rather than simply flagging the evidence as invalidated or validated. Also, the process may not be performed as one continuous series of operations. In addition, the process could be implemented using several sub-processes, or as part of a larger macro-process.

Furthermore, although various operations of process 1400 have been described with regard to automated analysis, one of ordinary skill in the art will recognize that such operations may also be performed by a human evaluator (e.g., a counterparty, the registrar's agent, etc.) either conjunctively or alternatively to perform the automated analysis. For instance, some embodiments may have one or more human evaluators view the evidence of registration to determine whether the registrant's responses comply with the tasks. The evaluator(s) may then manually invalidate or validate the evidence of registration based on this determination.

III. Verification

In addition to validating the evidence of registration as described above, some embodiments verify a registered user's identity through endorsement by counterparties and/or crowd-sourced verification. Furthermore, some embodiments generate a trustworthiness metric based on the results of validation, and verification. Sub-section III.A describes a process and user interface for managing endorsement by counterparties. Sub-section III.B then describes crowd-sourced verification of a user's identity. Next, sub-section III.C describes a method for generating a trustworthiness metric for a user.

A. Verification by Counterparties

Figure 15:
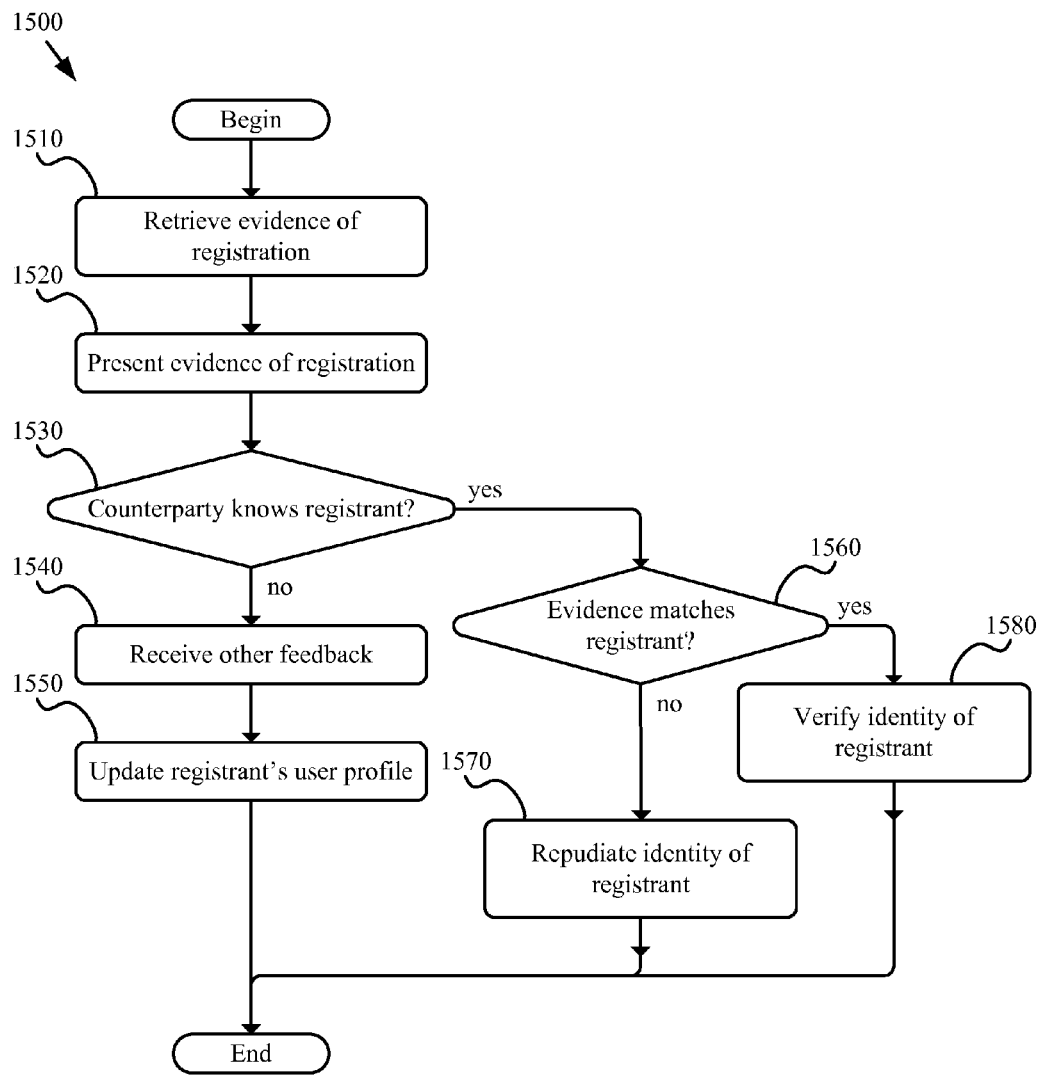
FIG. 15 conceptually illustrates an example of a process used by some embodiments to verify a user's identity.

As described above in reference to operation 130 of FIG. 1, some embodiments perform verification of a user's identity through evaluation by counterparties. In this context, a counterparty may be any other entity that is able to verify or discredit any information related to a registered user. FIG. 15 conceptually illustrates an example of a process 1500 that some embodiments use to verify a user's identity. Process 1500 will be described by reference to FIGS. 16-18 which illustrate example user interfaces 1600, 1700, and 1800 that some embodiments use during verification within a network-based application (and/or during other user interactions).

Figure 17:
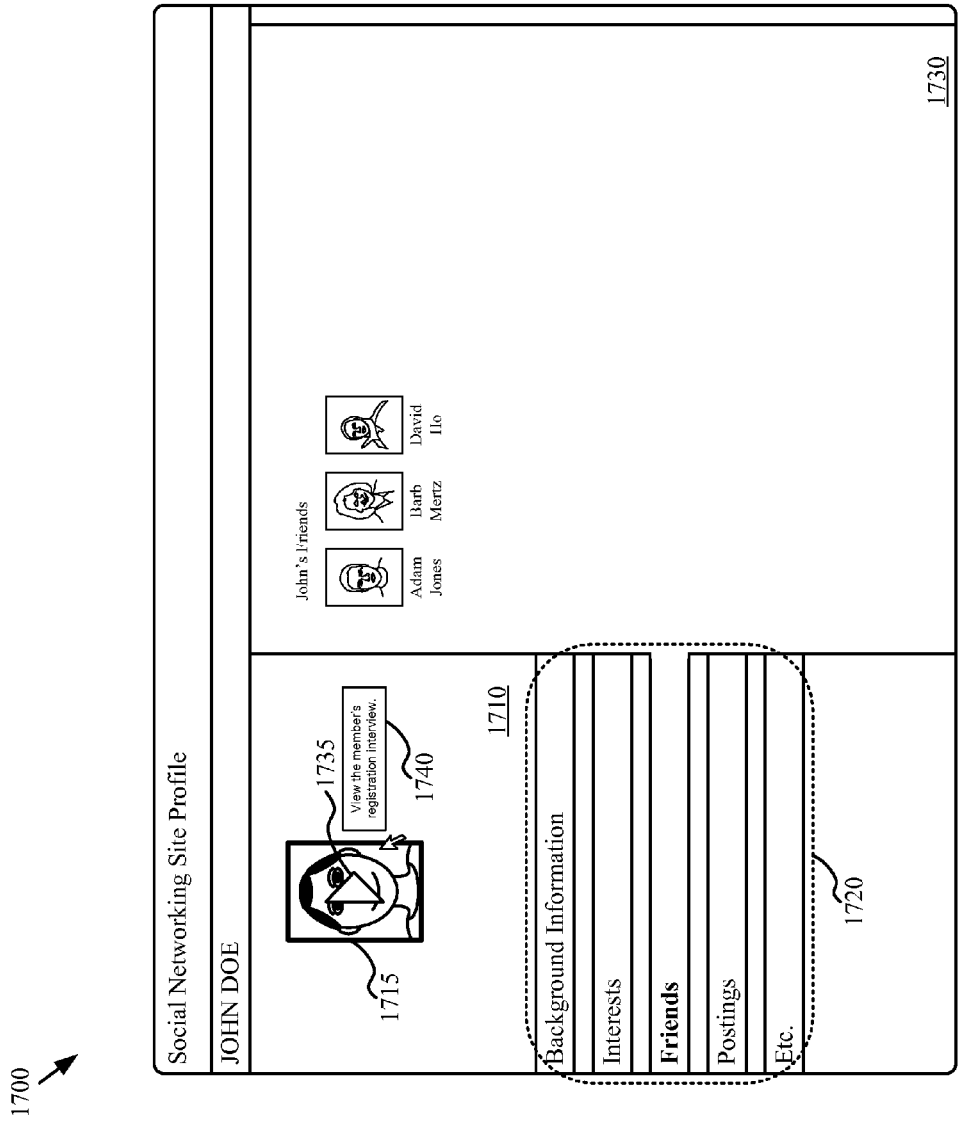
FIG. 17 illustrates a conceptual UI used by some embodiments to present evidence of registration within a social-networking application.
Figure 18:
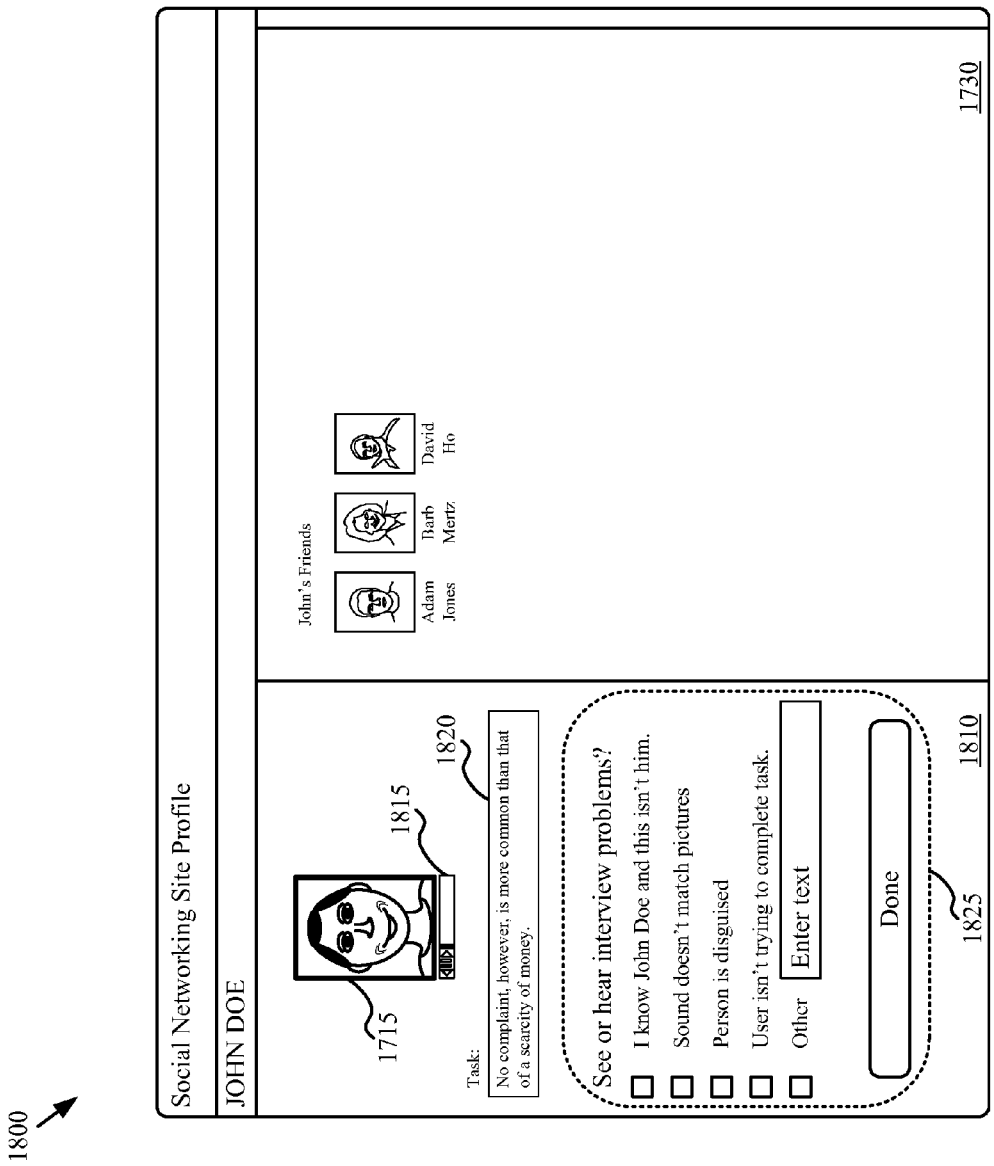
FIG. 18 illustrates a conceptual UI used by some embodiments to present evidence of registration for a registered user and/or to receive feedback from a counterparty regarding the user's compliance with various registration tasks.

FIGS. 16-18 illustrate conceptual user interfaces (UIs) used by some embodiments to present information related to a registered user and/or to receive feedback regarding the user. UI 1600 shown in FIG. 16 includes an interview pane 1610 for displaying and selecting evidence of registration, a user identity pane 1620 for displaying user profile information, an endorsement pane 1630 for receiving endorsements from counterparties, and an endorsement summary pane 1640 for displaying a summary of the user's endorsements. UI 1700 shown in FIG. 17 represents a user profile as presented by a social networking application, and includes an alternative interview pane 1710 with a thumbnail image 1715 representing a particular evidence of registration, various selectable bars 1720 for selecting various aspects of the user's profile for viewing and/or providing feedback. In this example, a friend pane 1730 for displaying profiles of the registrant's friends is displayed based on the selected bar. UI 1800 shown in FIG. 18 represents another alternative interview pane and feedback pane 1810 with a set of playback controls 1815 for controlling the playback of the recorded interview, a task display area 1820 for displaying a registration task associated with the interview, and various UI elements 1825 for collecting feedback regarding the user's performance during the interview.

The operation of the various UI elements 1610-1630, 1710-1720, and 1810-1825 will be described below in reference to process 1500. The operation of the endorsement summary pane 1640 will be described below in sub-section III.C. Process 1500 and/or UIs 1600, 1700, and/or 1800 may be implemented using a system such as system 200 described above in reference to FIG. 2. As above, the elements of system 200 may be implemented using various resources described above in reference to FIGS. 4-5.

Returning to FIG. 15, process 1500 begins in some embodiments when a registered user sends a request for endorsement to a counterparty (e.g., another registered user of a network-based application). In some of these embodiments, the counterparty may be authenticated (e.g., through an account login or some other appropriate procedure) and a secure connection between the counterparty and the verification system may be established before process 1500 begins. Alternatively, the process may begin when a potential counterparty elects to endorse a registered user without receiving any previous request, when a potential counterparty is selected as a reviewer by the verification system, etc. The process then retrieves (at 1510) the evidence of registration corresponding to the registered user to be endorsed.

Next, the process presents (at 1520) the evidence of registration to the counterparty. The evidence may be presented in different ways in different embodiments. For instance, some embodiments present the evidence in a similar way to that described above in reference to FIG. 10. As another example, some embodiments present only a portion of the evidence of registration (e.g., a single video frame that shows the registrant's face). Some of these embodiments allow the counterparty to review other portions (or all) of the evidence of registration if desired. FIGS. 16-18 illustrate example UIs used to present a portion of an evidence of registration using an embedded media player within a social networking application of some embodiments.

FIG. 16 shows one example way of presenting evidence of registration to a counterparty. In this example, UI 1600 includes an interview pane 1610 that displays the available evidences of registration 1612-1614 corresponding to one or more registration interviews performed by a particular registered user. In this example, each evidence of registration 1612 or 1614 includes a summary of the date and time the interview was conducted, and a thumbnail image 1616 representing a screen capture taken from the evidence of registration. Different embodiments present the evidences of registration in different ways. For instance, in some embodiments the evidence of registration may not include video data. In such embodiments, an icon or other representation of the available data (e.g., an audio clip) would replace video data.

In some embodiments, the counterparty may select an evidence of registration (e.g., by performing a cursor click operation over a thumbnail image 1616) in order to review the evidence (e.g., by viewing a set of images from the captured video, by playing an audio file, etc.). A counterparty may be able to review various information included in the evidence of registration. For instance, in some embodiments the counterparty may be able to select and view GPS information, tasks presented to the user, etc.

FIG. 17 illustrates a user interface 1700 of some embodiments that allows review of a user's profile including evidence of registration. In this example, a counterparty is able to see a summary of the user's evidence in the interview pane 1710. In addition, the counterparty may select from among various selectable bars 1720 and/or other UI components that allow the counterparty to review other aspects of the user's profile. In this example, a friend pane 1730 has been previously selected. Such a pane may allow counterparties to navigate to each friend's profile, thus facilitating review of any other counterparty who may have previously endorsed the registered user.

The evidence of registration is represented by a thumbnail image 1715 which may be a single frame of captured video from the associated evidence of registration. In some embodiments, various controls such as play control 1735 are displayed when a user positions a cursor over a thumbnail image. In this example, a popup message 1740 is also displayed when the cursor is placed over the thumbnail image 1715. In some embodiments the controls are always visible. The user may perform a cursor click operation when the cursor is located over an evidence of registration 1715 in order to initiate playback of the evidence of registration in some embodiments (e.g., as an audio and/or video stream, etc.).

FIG. 18 illustrates a user interface 1800 after a counterparty has initiated playback of an evidence of registration. In this example, the playback is performed using an embedded player that plays a video stream at the same location as the thumbnail 1715. However, different embodiments may playback the evidence of registration in different ways. For example, some embodiments provide a separate window, where such a window is served by a separate server that requires less cooperation and integration with the social networking application. As another example, some embodiments may playback the evidence of registration in different ways based on the type of data captured (e.g., video, audio, audio and video, etc.), the capabilities of the counterparty's user device, etc.

The UI 1800 provides various playback controls 1815 that may be used by a counterparty to control playback of the evidence of registration using typical media player controls (e.g., pause, stop, step, etc.). In this example, the UI also includes a task display area 1820 for displaying the task requested of the user in the evidence of registration. Such tasks are displayed in sync with the section of the evidence of registration that corresponds to the tasks. Different embodiments provide the tasks to counterparties in different ways. For example, some embodiments present the task to the counterparty in the same way as originally presented to the user (e.g., by playing an audio clip, by providing a video cue, etc.), some embodiments present the tasks as an audio stream played in sync with the evidence of registration, some embodiments present text corresponding to each task, etc.

Returning to FIG. 15, after presenting (at 1520) the evidence of registration to the counterparty, process 1500 determines (at 1530) whether the counterparty knows the registrant. Such a determination may be made by presenting the counterparty with various selectable options and/or data entry fields. One such example of such options is shown in FIG. 16. As described above, a counterparty may be provided with access to evidences of registration 1612 and 1614 available for a registered user. In addition, some embodiments present a summary of the user's identity (e.g., the summary shown in user identity pane 1620). A counterparty is thus able to determine whether the evidence of registration (or portion thereof) presented (at 1520) matches the identity shown in the user identity pane 1620.

Some embodiments allow the counterparty to provide an endorsement based on the counterparty's determination of whether or not the evidence of registration matches the registered user's identity. One example way of receiving such an endorsement is through the use of a UI item such as endorsement pane 1630. In this example, the counterparty is able to select various options and/or fill in various fields that specify the counterparty's knowledge of the registered user's identity. Different embodiments provide different options and fields. In some embodiments, the options and fields may depend on the status of the registered user and/or counterparty, the preferences of the registrar, or some other relevant criteria.

FIG. 18 illustrates an alternative UI 1800 that allows a counterparty to provide feedback regarding the user's compliance with the various registration tasks. Although the UI is described in the context of verifying a user's identity information, such a UI may also be presented to a counterparty in order to evaluate the user's task compliance during response validation as described above in reference to FIG. 14. As shown, the UI 1800 includes a task feedback UI elements 1825 that allow a counterparty to note any problems with the performance of the registration interview (e.g., task completion, mismatch between movement and sound, etc.).

Returning to FIG. 15, process 1500 thus determines (at 1530) whether the counterparty knows the registrant based on the counterparty's interaction with UIs 1600, 1700, and/or 1800, or through some other appropriate way. When the process determines that the counterparty knows the registrant, the process continues to operation 1560, described below. When the process determines that the counterparty does not know the registrant, the process next receives (at 1540) other feedback from the counterparty (if applicable). For instance, although a counterparty may not have met a registrant face-to-face, the counterparty may still have interacted with the user using one or more network-based applications, and is thus able to provide information that may reflect on the registrant's trustworthiness and/or be used to verify information other than the registrant's actual identity.

For instance, in some embodiments a counterparty may interact with a user through some online transaction. In such cases, the counterparty may not necessarily meet the user face-to-face, but the counterparty may nonetheless be able to verify other information about the registrant (e.g., the counterparty may be able to verify the registrant's home address or some other information used to complete the online transaction). As another example, the counterparty may provide feedback regarding the registrant's performance of the online transaction (e.g., by indicating whether the registrant paid for items on time, shipped items promptly, etc.). Although such information may not be applicable to verifying the user's identity, such feedback may be useful to various types of network-based applications in determining the level of trust a user has achieved.

As yet another example, in some embodiments a counterparty may provide feedback based solely on the counterparty's evaluation of the evidence of registration and/or any user profile information (i.e., a counterparty does not necessarily need to have personal knowledge of a registered user's identity in order to evaluate the user's evidence of registration). For instance, a counterparty may be given the opportunity to flag issues (or perceived issues) the counterparty has detected in the evidence of registration and/or associated information of the registered user. Such issues may include misrepresentations of appearance, misrepresentations of voice, misrepresentations of identity (e.g., when the age of a registered user as determined by viewing the user's evidence of registration does not appear to be the same as the age listed in the user's profile information). Some embodiments allow a user to flag these issues in a binary manner (e.g., "appearance ok", "appearance misrepresented", etc.), while others allow a user to flag the issues using a continuous scale (e.g., by rating the perceived accuracy of various attributes on a scale from 1 to 5).

After receiving (at 1540) other feedback, the process updates (at 1550) the user's profile information to reflect the received feedback and ends. Such an update may be performed by appending information to the evidence of registration in some embodiments. Various data structures and software modules used to implement such updates will be described below in Section V.

When process 1500 determines (at 1530) that the counterparty does know the registrant, the process then determines (at 1560) whether the evidence of registration matches the registrant. Such a determination could be made in various ways, for instance using data collected through a UI feature such as the endorsement pane 1630 or UI items 1825 described above.

When process 1500 determines (at 1560) that the evidence matches the registrant, the process continues to operation 1580, described below. Otherwise, the process refutes (at 1570) the identity of the registrant and ends. Such refutation may be performed by updating the user's profile information as described above in reference to operation 1550. When the process determines (at 1560) that the evidence matches the registrant, the process verifies (at 1580) the identity of the registrant and ends. Such verification may be performed by updating the user's profile information as described above in reference to operation 1550.

In some embodiments, the verification may be applied to only a portion of the user's identity information. For instance, in some cases a counterparty may know a user's name and/or age, but not the user's place of birth. In such cases, the counterparty may be able to selectively verify certain aspects of the user's identity without verifying other aspects. Some embodiments store information regarding the counterparty's identity. Other embodiments, in order to encourage the reporting of problems, permit the counterparty to provide negative feedback anonymously; that is, their involvement is not reported to other users.

One of ordinary skill in the art will recognize that the operations of process 1500 are conceptual and may not necessarily be performed in the order shown. Furthermore, different specific operations may be performed in different embodiments. For instance, rather than simply refute or verify a user's identity, some embodiments may calculate a trust metric or other value that represents a user's cumulative endorsement data (e.g., instead of verifying the identity, the trust metric value may be increased). In some embodiments, the calculation of such a trust metric may be weighted depending on carious characteristics of the counterparty (e.g., valid credit card information that corresponds to the user's provided information may be weighted more heavily than the endorsement of a counterparty, an endorsement from a counterparty with a verified identity may be weighted more heavily than an endorsement from a counterparty with an unverified identity, etc.). As another example, some embodiments may allow a registered user to at least partially self-verify (e.g., by providing credit card information, bank account details, a cell phone number, or other information that supports verification of the user's identity). Also, the process may not be performed as one continuous series of operations. In addition, the process could be implemented using several sub-processes, or as part of a larger macro-process.

Furthermore, although various operations of process 1500 have been described with regard to review by a human evaluator (e.g., a counterparty) some embodiments may perform some or all of the operations of process 1500 without any direct interaction with a human counterparty. For instance, some embodiments may compare the evidence of registration to some other source of identification (e.g., identity information provided by a secure verification site or other trusted entity). In such embodiments, the evidence of registration may be evaluated using facial recognition to compare the video of the evidence of registration to a picture included in identity information provided by a trusted source. As another example, some embodiments may allow a user to verify his identity by producing some identification (e.g., a driver's license or passport) at a physical endorsement location (e.g., a bank, an office, etc.) such that the user's identity may be verified through examination of the identification by an agent of the endorsement location. In some embodiments, such examination and endorsement may be performed by an automated agent (e.g., a user may travel to an endorsement location, log in to an account that accesses the user's evidence of registration, provide an ID to be electronically scanned in order to associate the ID with the evidence of registration and thus verify the user's identity).

In addition, although process 1500 was described by reference to the UIs 1600, 1700, and 1800 of FIGS. 16, 17, and 18, respectively, one of ordinary skill in the art will recognize that a user's identity (and/or task compliance) may be verified in various other ways without departing from the spirit of the invention. For instance, some embodiments may perform verification by sending an email to a counterparty and receiving a response through email.

B. Crowd-Sourced Evaluation

Figure 19:
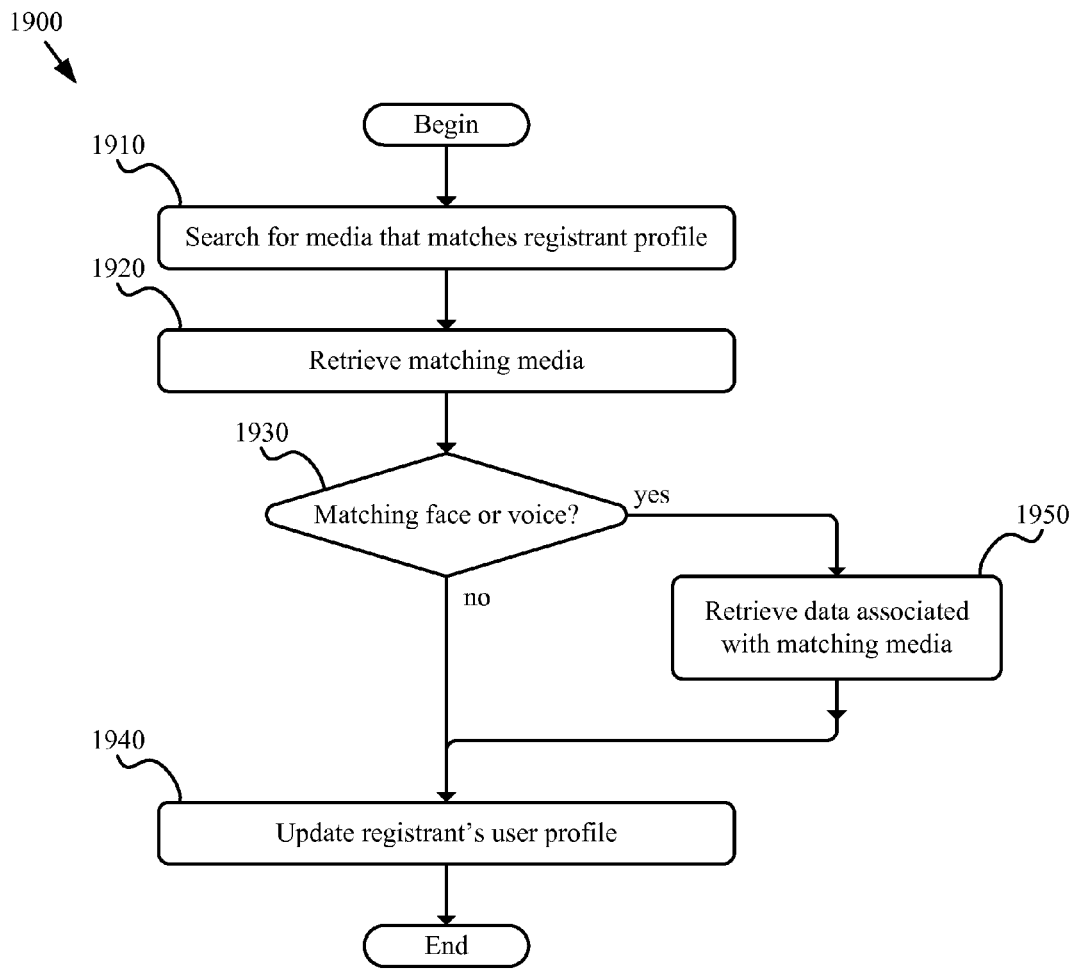
FIG. 19 conceptually illustrates an example of a process that some embodiments use to perform crowd-sourced evaluation.

As described above in reference to operation 140 of FIG. 1, after receiving any counterparty evaluations, some embodiments perform crowd-sourced evaluation of a registered user's identity. FIG. 19 conceptually illustrates an example of a process 1900 that some embodiments use to perform crowd-sourced evaluation. Process 1900 may be implemented using a system such as system 200 described above in reference to FIG. 2. In addition, the elements of system 200 may be implemented using various resources described above in reference to FIGS. 4-5.

Process 1900 begins in some embodiments after an evidence of registration is successfully validated and/or verified as described above. Alternatively, the process may be performed at regular intervals (e.g., nightly) in order to update any user profiles that may correspond to any crowd-sourced identification information. Next, the process searches (at 1910) for media that matches the registrant's profile. In some embodiments, a system such as the registrar's system 430 described above in reference to FIG. 4 may search various publicly or privately available data sources (e.g., other systems and data 470 of FIG. 4) available over a network (e.g., network 420 of FIG. 4).

Crowd-sourced labeling or "tagging" includes the annotation of objects, typically web pages, articles, or images, with keywords or phrases by self-assigned annotators. Since such tags are crowd-sourced, even a passerby caught by happenstance within the frame of a tourist's snapshot may be tagged. Thus, such tagged objects constitute a publicly-accessible database of labeled objects that may be used to support the identity asserted by a particular registered user. In many cases, an object may be tagged such that a name and/or other identifying information is associated with the face of a person represented in the object. In some embodiments, process 1900 is thus able to search (at 1910) for media that has been tagged with a name that matches (or is similar to) the name supplied by a particular registered user. For instance, if a registrant registers as "William Smith", the process may search for media tagged with "William Smith", "W. Smith", "Bill Smith", etc.

Process 1900 then retrieves (at 1920) the matching media. In addition to retrieving the matching media, some embodiments also retrieve the evidence of registration associated with the registered user being evaluated (if not already retrieved). The media and evidence of registration may be retrieved using a module such as media evaluation module 1210 from a storage such as evidence of registration storage 1240 and/or other storages.

Next, the process determines (at 1930) whether the media includes audio and/or video data that matches the face and/or voice of the registered user as provided in the evidence of registration. Some embodiments may perform this operation using automated facial recognition and/or speech recognition systems or modules. Such modules may be similar to the audio and video analysis modules 1220-1230 described above in reference to FIG. 12.

When the process determines (at 1930) that the media includes audio and/or video data that matches the face and/or voice of the registered user, the process continues to operation 1950, described below. Otherwise, the process updates (at 1940) the registrant's user profile based on the determination made at 1930. Some embodiments update the user profile by appending information to the evidence of registration indicating that the crowd-sourced media does not match the user's identity as provided in the evidence of registration. However, because many people may share the same name (or some other criteria used to search for media), some embodiments do not take any action when the process determines (at 1930) that the crowd-sourced media does not match the user's identity as provided in the evidence of registration. After updating (at 1940) the registrant's user profile, the process ends.

Because the label data is crowd-sourced, there may be various errors in the collected data. For example, annotators may mislabel a face by mistake (or intentionally). In addition, a particular registered user may be known by more than one name. For instance, some annotators may tag a user with her maiden name while others may tag the same user with her married name. As yet another example, some users may be known by nicknames and/or names other than their legal names, and thus be labeled differently by different annotators. Different embodiments may respond to such inconsistencies in different ways. For instance, some embodiments disregard any name that does not exactly match the name (or names) supplied by the registrant.

When process 1900 determines (at 1930) that the media includes audio and/or video data that matches the face and/or voice of the registered user, the process retrieves (at 1950) data associated with the matching media. Such data may include digital timestamp information included in the media file, the source of the media (e.g., an http address), the identity of the entity that uploaded and/or tagged the media, etc. Such information may be presented to counterparties when evaluating the registered user's evidence of registration. In addition, this information may be used when generating a trustworthiness metric (calculation of such a metric is described below in sub-section III.C).

The process then updates (at 1940) the registrant's user profile based on the determination made at 1930 and the data retrieved at 1950. For instance, some embodiments update the user profile by appending information to the evidence of registration indicating that the crowd-sourced media matches the user's identity as provided in the evidence of registration. In addition, some embodiments append some or all of the data retrieved at 1950. Furthermore, some embodiments may include links to the crowd-sourced media and/or provide screen captures taken from the media such that counterparties may examine the crowd-sourced media when evaluating the user's profile and/or evidence of registration. After updating (at 1940) the registrant's user profile, the process ends. Some embodiments iteratively perform operations 1930 and 1950 for each media item retrieved at 1920.

One of ordinary skill in the art will recognize that the operations of process 1900 are conceptual and may not necessarily be performed in the order shown. Furthermore, different specific operations may be performed in different embodiments. For instance, rather than search for media that has been tagged with the registrant's name and then determining whether the media matches the registrant's face or voice, some embodiments may search for media that matches the registrant's face or voice and then determine whether a tag associated with the media matches the name supplied by the registrant. Also, the process may not be performed as one continuous series of operations. In addition, the process could be implemented using several sub-processes, or as part of a larger macro-process.

C. Summarizing the Collected Data

Figure 20:
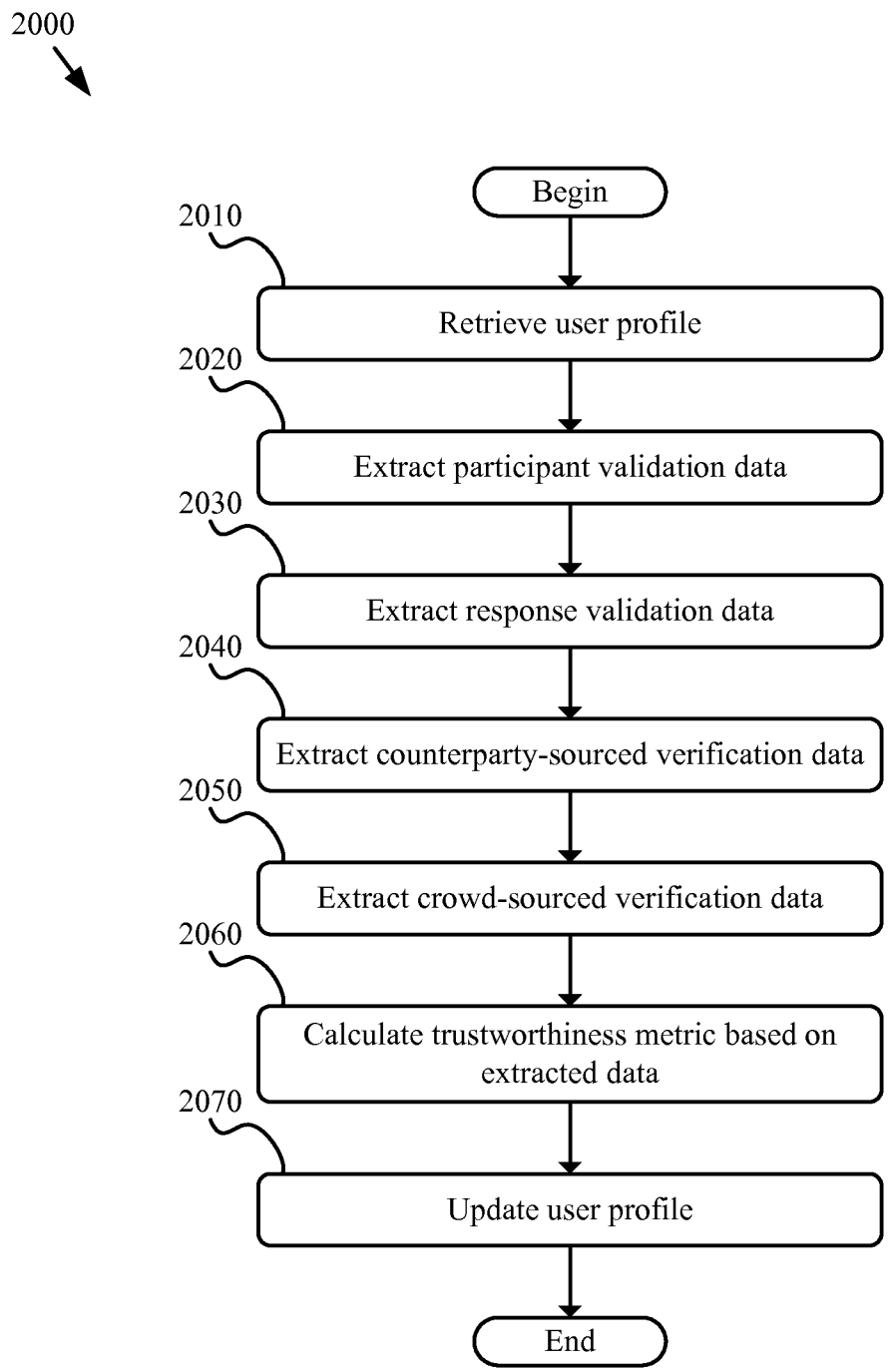
FIG. 20 conceptually illustrates an example of a process that some embodiments use to calculate a trustworthiness metric.

As described above in reference to operation 150 of FIG. 1, some embodiments summarize the evaluation of a registered user's identity by calculating a trustworthiness metric in order to present such a metric to potential counterparties of the user such that they may quickly receive an indication of a user's trustworthiness. FIG. 20 conceptually illustrates an example of a process 2000 that some embodiments use to calculate such a trustworthiness metric. Process 2000 may be implemented using a system such as system 200 described above in reference to FIG. 2. In addition, the elements of system 200 may be implemented using various resources described above in reference to FIGS. 4-5.

Process 2000 begins in some embodiments after an update to a user's profile information (e.g., when evidence of registration is generated, when an endorsement is received, when crowd-sourced media is evaluated, etc.). Alternatively, the process may be performed at regular intervals. The process then retrieves (at 2010) a user profile from storage. Next, the process extracts (at 2020) participant validation data from the profile. Such validation data may have been generated and stored as described above in reference to FIGS. 11-12.

Process 2000 then extracts (at 2030) response validation data. The response validation data may have been generated and stored as described above in reference to FIG. 14. Next, the process extracts (at 2040) counterparty-sourced verification data. Such verification data may have been generated as described above in reference to FIGS. 15-16. The process then extracts (at 2050) crowd-sourced verification data. This data may have been generated as described above in reference to FIG. 19.

After extracting the various stored data, process 2000 calculates (at 2060) a trustworthiness metric based on the extracted data. The trustworthiness metric for each user profile may reflect a point along a continuum of values (e.g., a linear function, a logarithmic function, an exponential function, etc.) that spans a range (e.g., 0-100). Different embodiments may calculate the trustworthiness metric in different ways and using different specific systems and/or components. Some embodiments may first generate an evaluation score for each type of extracted data. Similar to the trustworthiness metric, each evaluation score may span a range of values.

The evaluation scores may be calculated in different ways depending on the type of extracted data. For instance, some embodiments may determine each score based on factors such as the number of evaluators, the status of each evaluator (e.g., registered user, registrar's agent, etc.), the type of evaluation (e.g., automated, reviewed by registrar's agent, physical verification, etc.), the type of data evaluated (e.g., audio, video, etc.), and/or any other relevant factors (e.g., the date of the evaluation, the type of registrant, the type of network-based application, etc.).

In some embodiments, the trustworthiness metric may be completely generated from a single evaluation score (e.g., when a user has verified his identity in person, the trustworthiness metric may be set at its maximum value regardless of any other type of evaluation). Alternatively, some embodiments then generate the trustworthiness score by calculating a weighted average from two or more of the evaluation scores. Different embodiments may weight each score differently based on various factors. For instance, a social networking application may weight counterparty feedback heavily, while an online banking application may ignore counterparty feedback entirely (instead relying on physical verification, for instance).

After calculating (at 2060) the trustworthiness metric, the process updates (at 2070) the user profile. This update may include updating a file in a physical storage. After updating the user profile, the process ends.

One of ordinary skill in the art will recognize that the operations of process 2000 are conceptual and may not necessarily be performed in the order shown. For instance, different embodiments may extract the various types of evaluation data in a different order. Furthermore, different specific operations may be performed in different embodiments. For instance, some embodiments may at least partially base the trustworthiness metric on the access history of the registrant. Also, the process may not be performed as one continuous series of operations. In addition, the process could be implemented using several sub-processes, or as part of a larger macro-process.

In addition to calculating a trustworthiness metric, some embodiments present the metric (and/or other summary information regarding evaluation of the registrant) to various counterparties or other entities. FIG. 16, described above, includes an example UI 1600 that displays such a summary in the endorsement summary pane 1640. Different embodiments may include different information in such a summary. For instance, some embodiments may include a list of endorsers of the registrant. In addition, some embodiments may provide links to those endorsers' user profiles (if available). A user may then inspect the endorsers of a potential counterparty to judge the counterparty's trustworthiness in the context of the user's endorsers. Other embodiments may provide a summary that lists the number of positive and negative endorsers (and/or other types of evaluators).

Different embodiments may present the trustworthiness metric in different ways or not at all. For instance, some embodiments may use a discrete set of values (e.g., "unverified", "verified", etc.). Other embodiments may present a value that represents a level of trustworthiness (e.g., by displaying a score that ranges from 0-100). As another example, some embodiments may not present the trustworthiness metric to other users, but may utilize the metric to control, for example, the level of system access provided to the registrant. Such access control will be described in more detail in Section IV below.

IV. User Access Management and Usage Examples

In addition to providing various ways for other parties to evaluate a user's evidence of registration and/or other user profile information, some embodiments evaluate a user's access history in order to support or refute the user's identity. Some of these embodiments may also limit or otherwise control access to various services provided by a network-based application based on a registered user's access history (and/or other user evaluation described above or below). Sub-section IV.A describes information gathering and access control performed when a user accesses the system after registration. Sub-section IV.B then describes several usage scenarios and the system response to each.

A. User Access after Registration

Figure 21:
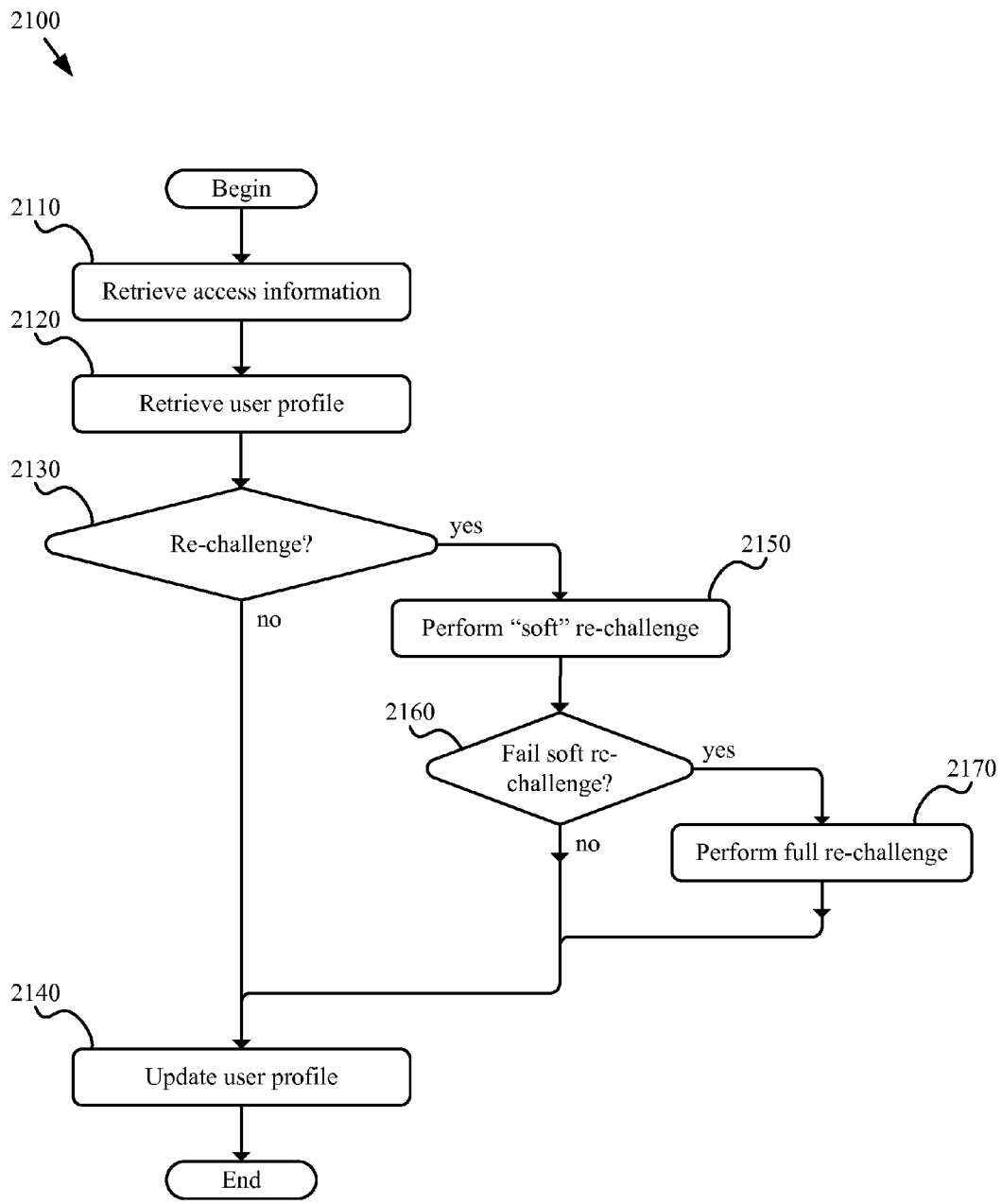
FIG. 21 conceptually illustrates an example of a process that some embodiments use to review user access history, collect user access information, and perform verification through re-challenge of the user.

As described above in reference to operation 160 of FIG. 1, some embodiments may be used to control a user's access to a network-based application. FIG. 21 conceptually illustrates an example of a process 2100 that some embodiments use to review user access history, collect user access information, and perform verification through re-challenge of the user (i.e., by performing a limited or full interview in a similar manner to the registration interview). Process 2100 may be implemented using a system such as system 200 described above in reference to FIG. 2. In addition, the elements of system 200 may be implemented using various resources described above in reference to FIGS. 4-5.

Process 2100 begins in some embodiments when a registered user accesses the system (e.g., when a user logs in to a network-based application). The process then retrieves (at 2110) the user's access information. The access information may include various elements, and may depend on various factors. For instance, when the user accesses the system using a mobile phone, information such as GPS location may be retrieved. Alternatively, when the user accesses the system using a PC, information such as IP address may be retrieved. In addition, some embodiments collect user device-independent information (e.g., time of day).

Next, the process extracts (at 2120) retrieves the user's profile information. The user profile information may include the user's past access history. Such a history may include a list of previous accesses, and various data associated with each access (e.g., GPS location, time of day, type of access device, etc.).

The process then determines (at 2130) whether to perform a re-challenge. Such a determination may be based on various factors. For instance, some embodiments may analyze the user's previous access history and note any inconsistencies in the previous history and/or the current access attempt. As an example, some embodiments re-challenge a user when the user accesses the system from a GPS location that is more than an allowed range from previous accesses. As another example, some embodiments re-challenge a user when the user accesses the system using a different device than during previous accesses. As yet another example, some embodiments perform re-challenges at regular intervals (e.g., every month, every tenth access attempt, etc.) or randomly. As still another example, some embodiments perform re-challenges based on previous evaluation of a user's evidence of registration or other profile data (e.g., by analyzing counterparty verification data, crowd-sourced verification data, etc.).

When process 2100 determines (at 2130) that a re-challenge should be performed, the process continues to operation 2150 described below. Otherwise, the process updates (at 2140) the user profile information. Such an update may include appending the current access information to the user profile. In addition to the access information described above (e.g., GPS location, time of day, etc.), some embodiments may store information regarding the user's interactions with the network-based application after being granted access. For instance, some embodiments store information regarding profiles visited by the user. As another example, some embodiments store media generated by the user during system access (e.g., when a user performs a voice search, the audio data may be captured such that the data can be compared to data included in the evidence of registration). After updating (at 2140) the user profile, the process ends.

When process 2100 determines (at 2130) that a re-challenge should be performed, the process performs (at 2150) a "soft" re-challenge. Such a soft re-challenge may be performed in a similar manner to generating the evidence of registration as described above in Section I. However, a soft re-challenge may generally include fewer tasks than a full registration interview. In addition, the soft re-challenge may be performed using a different user device with different capabilities than the user device used to generate the evidence of registration. For instance, a user may generate the evidence of registration using a PC with a webcam, but be re-challenged while accessing the system using a mobile phone. In such a case, the re-challenge may consist entirely of audio data, while the original registration may have been performed using a combination of audio and video data.

The process 2100 then determines (at 2160) whether the user has failed the re-challenge. Such a determination may be made, for example, by comparing the audio (and/or video) captured during the re-challenge with the audio (and/or video) captured during the registration interview. Such a determination may be made using system components similar to those described above in reference to FIG. 12. When the process determines (at 2160) that the user has failed the soft re-challenge, the process performs (at 2170) a full re-challenge. Such a full re-challenge may include performance of a full registration interview including the generation of an evidence of registration. The full re-challenge may be evaluated in a similar manner to the soft re-challenge.

After determining (at 2160) that the user has failed the soft re-challenge, or after performing (at 2170) the full re-challenge, the process updates (at 2140) the user profile information. Such an update may include adding the results of the re-challenge, storing any media generated during the soft or full re-challenge, and/or other data regarding the user's interactions with the system. After updating (at 2140) the user profile information, the process ends. Some embodiments utilize the stored information when calculating the trustworthiness metric described above in sub-section III.C.

One of ordinary skill in the art will recognize that the operations of process 2100 are conceptual and may not necessarily be performed in the order shown. For instance, some embodiments may perform a full re-challenge without performing a soft re-challenge first. Furthermore, different specific operations may be performed in different embodiments. For example, some embodiments may not perform a full re-challenge after a failed soft re-challenge, but may flag the user profile such that a full re-challenge is initiated at the next user access through a device that allows a full re-challenge. Also, the process may not be performed as one continuous series of operations. In addition, the process could be implemented using several sub-processes, or as part of a larger macro-process.

In addition, some embodiments use the results of a soft and/or full re-challenge to gate user access to the system. For instance, some embodiments deny access to the user account when the re-challenge data does not match the previously-generated evidence of registration. As another example, some embodiments may tabulate the results of various re-challenges performed over time and limit or otherwise, control a user's access when the ration of failed re-challenges exceeds a threshold. Furthermore, although the example of FIG. 21 is based on a single user profile, different embodiments may perform analysis using multiple profiles. For instance, some embodiments may determine that a single user device is used to access various different user accounts in a short time. Such a determination may then trigger a re-challenge on any user account that is subsequently accessed on that user device.

B. Usage Scenarios

Users of network-based applications may attempt to obscure their identity (or otherwise attempt to deceive counterparties (and/or other entities) using various schemes. Several examples of these schemes, and the results of using validation of evidence of registration to detect the schemes are described below.

As one example, a registrant may attempt to hide his true identity (e.g., by wearing a disguise). As described above, such attempts may be detected using, for example, automated and/or manual facial recognition during participant validation. Such attempts at fraud are thus detected during validation, resulting in the registrant not being allowed to access the network-based application and/or having the attempt at obscuring his identity, flagged to other users.

As another example, a user may attempt to create an account that misrepresents, for example, the user's name, age, and/or sex. Such a user may attempt to misrepresent this information using an accomplice who submits the initial interview in the stead of the person who will use the account. Such a scheme will be defeated by a re-challenge (i.e., at re-challenge the accomplice is most likely not available, resulting in a mismatch between the person represented in the evidence of registration versus the person represented in the re-challenge). Alternatively, if no accomplice is involved, the evidence of registration may be used to expose such fraudulent identity representations (e.g., a counterparty may evaluate the evidence of registration and determine that the user's image does not match the user's claimed age or sex, etc.).

As yet another example, a user may attempt to fraudulently submit another person's previously-generate evidence of registration. However, because the registration tasks are uniquely generated for each user, the previously-generated evidence of registration will not match the registration tasks presented to the user. Thus, the submitted evidence of registration will fail response validation.

As still another example, an individual may create many false identities in order to endorse one or more false identity using the other false identities. This scheme may increase the likelihood that an unsuspecting (potential) counterparty will consider the fraudulent user to be legitimate. The perceived legitimacy of such a network increases with the number of linked accounts. The validation system prevents this scenario as a counterparty may review the evidence of registration from each account and thus determines the various evidences of registration were submitted by the same person.

As another example, a group of colluding individuals may each create a false identity and endorse the other group members in order to increase the likelihood that an unsuspecting (potential) counterparty will consider any member of the group to be legitimate. The seeming legitimacy of such a network increases with the number of linked accounts. The validation system deters this scenario as it requires the members of the group to personally submit evidence of registration. As the number of linked individuals increases in such a system, it becomes increasingly unlikely that one of the group members will not be discovered as a fraud, thus undermining the perceived legitimacy of other group members.

V. Software Architecture and Implementation

In some embodiments, the processes described above are implemented as software running on a particular machine, such as a computer or a handheld device, or stored in a computer readable medium. Sub-section V.A below describes various conceptual data structures used by some embodiments to implement such software. Next, sub-section V.B describes a conceptual software architecture used by some embodiments to perform the operations described above. Sub-section V.C then describes an exemplary system application of some embodiments.

A. Data Structures

Figure 22:
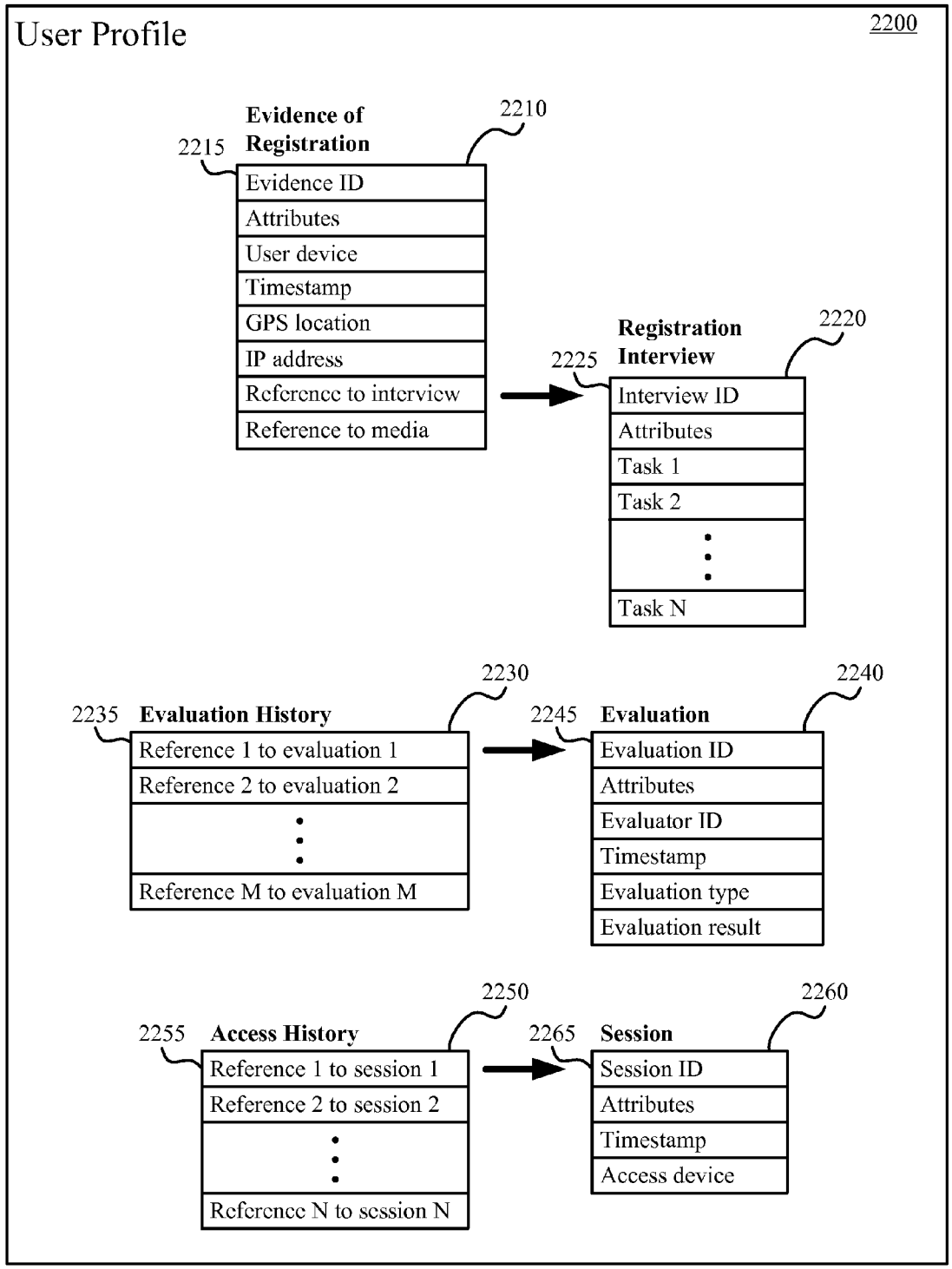
FIG. 22 illustrates an example data structure of a user profile used by some embodiments to implement various features of the verification system described above.

FIG. 22 illustrates an example data structure of a user profile 2200 used by some embodiments to implement various features of the verification system described above. As shown, the project file includes one or more evidence of registration data elements 2210. The evidence of registration data element 2210 may include various sub-elements 2215, depending on various factors. FIG. 10 described above, presented several examples of data that may be included in the evidence of registration in some embodiments. In this example, the evidence of registration data element 2210 includes a reference to media (e.g., the video clip captured during a registration interview). The media clip element is not shown, as it is stored externally to the user profile in this example. Various elements of the user profile may refer to data that is stored outside the user profile. However, in some embodiments, all elements referenced by the user profile may be included in the user profile itself.

Each evidence of registration data element includes a reference to registration interview data element 2220. Each registration interview data element includes various sub-elements 2225 (e.g., the list of registration tasks presented during the interview, an interview identification, etc.). Such a registration interview data element may be generated as described above in reference to FIGS. 8-9.

In addition, the user profile 2200 may include an evaluation history data element 2230. The evaluation history data element 2230 includes various references 2235 to individual evaluation elements 2240. Each evaluation element may correspond to a particular evaluation of the user profile information (e.g., an endorsement, a validation, etc.). Each evaluation data element 2240 may include various sub-elements 2245 (e.g., evaluator type, evaluation date, evaluation result, etc.). The evaluation data elements 2240 may be generated, and/or the evaluation history data element 2235 may be updated whenever an evaluation is received for the user. Elements such as the evaluation history data element 2235 and/or the evaluation data elements 2240 may be used when generating a trustworthiness metric as described above in reference to FIG. 20.

The user profile 2200 also includes an access history data element 2250 in this example. The access history data element 2250 includes various references 2255 to individual access session data elements 2260. Each session data element may correspond to a particular user access session. Each session data element 2260 includes various sub-elements 2265 (e.g., date of access, user device used during access, etc.). Such access data elements 2250 and 2260 may be used when determining whether to perform a re-challenge as described above in reference to FIG. 21.

One of ordinary skill in the art will recognize that user profile 2200 is a conceptual representation only. Different embodiments may implement the data structures in various different ways. For instance, some embodiments may include various additional elements in the user profile (e.g., a user identity data element, a trustworthiness metric data element, etc.). In addition, some embodiments may include different numbers of individual elements, different references and/or data in each element, and/or different structures. For instance, instead of including individual session data elements 2260, some embodiments may simply store an information string as an element of the access history data element 2250, where the string includes any information normally included in the session data element 2260.

B. Software Block Diagram

Figure 23:
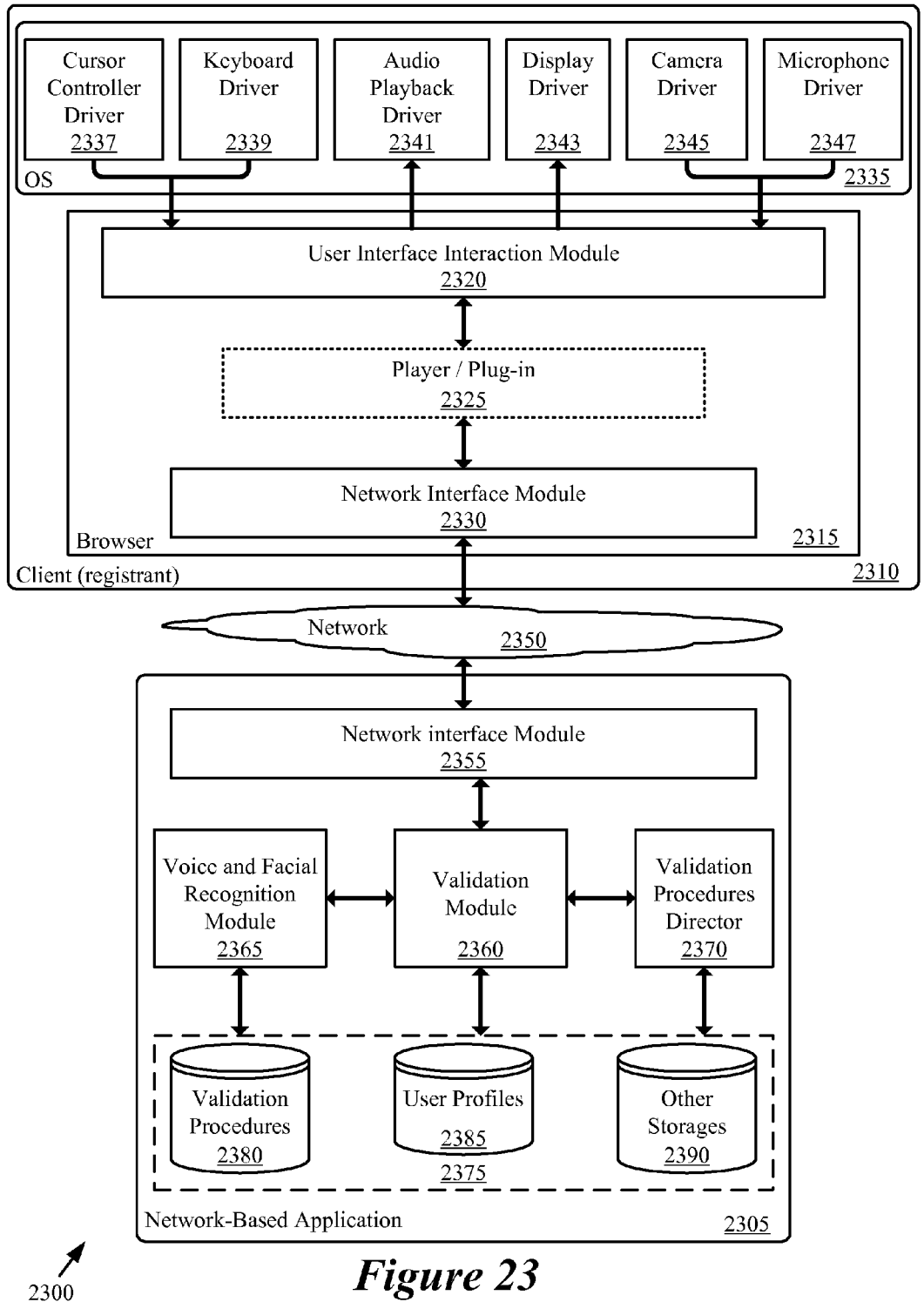
FIG. 23 conceptually illustrates the software architecture of an application including a network-based application of some embodiments for providing tools and features such as those described in the preceding sections.

FIG. 23 conceptually illustrates the software architecture of an application 2300 including a network-based application 2305 of some embodiments for providing tools and features such as those described in the preceding sections. In addition, FIG. 23 shows the software architecture 2310 used by a client of some embodiments to interact with the network-based application 2305 by communicating over a network 2350. In some embodiments, the application 2305 is a stand-alone application or is integrated into another application (for instance, application 2305 might be a sub-component of another application), while in other embodiments the application might be implemented within an operating system. Furthermore, in some embodiments (as in the example of FIG. 23), the application is provided as part of a server-based (e.g., Internet-based) solution. In some such embodiments, the application is provided via a thin client. That is, the application runs on a server while a user interacts with the application via a separate client machine remote from the server (e.g., via a browser on the client machine). In other such embodiments, the application is provided via a thick client. That is, the application is distributed from the server to the client machine and runs on the client machine.

The client 2310 includes a browser 2315 and an operating system 2335. The browser has a user interface interaction module 2320 for sending data to and receiving data from a user (a registrant in this example), a player or plug-in 2325 for presenting registration interview tasks, capturing a user's responses to the tasks, displaying previously-captured evidence of registration, etc., and a network interface module 2330 for communicating with other applications over a network (e.g., network 2350).

The operating system 2335 of some embodiments includes a cursor controller driver 2337 that allows the client 2310 to receive data from a cursor control device, a keyboard driver 2339 that allows the client 2310 to receive data from a keyboard, an audio playback driver 2341 for processing audio data that will be supplied to an audio device (e.g., a soundcard and speakers), a display driver 2343 for processing video data that will be supplied to a display device (e.g., a monitor), a camera driver 2345 that allows the client 2310 to receive data from a camera, and a microphone driver 2347 that allows the client 2310 to receive data from a microphone.

Network-based application 2305 includes a network interface module 2355 for communicating with other applications over a network, a validation module 2360 for performing validation, a voice and facial recognition module 2365 for performing automated analysis of captured video and audio data, a validation procedures director 2370 for directing validation operations, and a set of storages 2375 for storing data used by the application 2305. The set of storages 2375 includes storages for validation procedure data 2380, user profile data 2385, and other data 2390.

A user interacts with application 2305 via the client 2310 using input devices (not shown) such as a cursor controller (e.g., a mouse, touchpad, trackpad, etc.), keyboard, camera, microphone, etc. The input from these devices is processed by the cursor controller driver 2337, the keyboard driver 2339, the camera driver 2345, and/or the microphone driver 2347 and passed to the user interface interaction module 2320. In addition, some embodiments may allow a user to interact with items in a user interface using other input devices (e.g., a microphone) that are processed by other drivers and/or software modules (e.g., microphone driver 2347 and a voice-recognition module).

A user may also interact with the client 2310 using output devices (not shown) such as a monitor, audio speakers, headphones, etc. The output for these devices is passed from the user interface interaction module 2320 to the audio playback driver 2341 and/or the display driver 2343. Furthermore, some embodiments may operate without any user interaction (e.g., when performing automated crowd-sourced evaluation).

The present application describes a system that provides network-based applications with numerous ways to perform different sets of operations and functionalities. In some embodiments, these operations and functionalities are performed based on different commands that are received from users through different input devices (e.g., keyboard, trackpad, touchpad, mouse, etc). For example, the present application describes a user interface that may be manipulated through the use of a cursor to control (e.g., select, move) objects in the user interface. However, in some embodiments, objects in the user interface can also be controlled or manipulated through other controls, such as touch control.

In some embodiments, touch control is implemented through an input device that can detect the presence and location of touch on a display of the device. An example of such a device is a touch screen device. In some embodiments, with touch control, a user can directly manipulate objects by interacting with the graphical user interface that is displayed on the display of the touch screen device. For instance, a user can select a particular object in the graphical user interface by simply touching that particular object on the display of the touch screen device. As such, when touch control is utilized, a cursor may not even be provided for enabling selection of an object of a graphical user interface in some embodiments. However, when a cursor is provided in a graphical user interface, touch control can be used to control the cursor in some embodiments.

Regardless of the specific control mechanism, the user interface interaction module 2320 translates the data from the drivers 2337, 2339, 2345, and 2347 into the user's desired effect on the client 2310. For example, when a user accesses a network-based application using the browser 2315, the user interface interaction module 2320 may translate these operations into instructions that are processed by other application modules in order to display (e.g., using display driver 2343) the appropriate modules within the browser (e.g., player or plug-in 2325).

The player/plug-in 2325 of some embodiments processes instructions and data received from the user interface interaction module 2320 and/or data retrieved from the network interface module 2330. In addition to receiving data, player/plug-in 2325 may also send data through the user interface interaction module 2320 or the network interface module 2330. For example, the player/plug-in may receive registration tasks from the network interface module 2330 and present the tasks to a user through the user interface interaction module 2320 and/or one or more drivers (e.g., audio payback driver 2341). The player/plug-in may then receive data (e.g., video and/or audio data) from the appropriate drivers (e.g., camera driver 2345 and microphone driver 2347) before passing the received data to the network interface module 2330.

The network interface module 2330 receives instructions and data from the play/plug-in 2325 (and/or other modules) and sends the received data and instructions to the network-based application 2305 over the network 2350. In addition, the network interface module 2330 receives data and instructions from the network-based application 2305 (and/or other network applications) and sends the received data and instructions to the player/plug-in 2325 (and/or other modules).

The network 2350 provides a communication pathway between the network interface module 2330 at the client 2310 and the network interface module 2355 at the network-based application. Such a network may include wired communication pathways, wireless communication pathways, various devices or components, etc. The network interface module 2355 receives instructions and data sent from the client 2310 (and/or other network applications) over the network 2350 and sends the received data and instructions to other modules of the network-based application 2305. In addition, the network interface module 2355 receives data and instructions from other modules of the network-based application 2305 and sends the received data and instructions to the client 2310 (and/or other network applications) over the network 2350.

The validation module 2360 of some embodiments processes validation instructions received from the network interface module 2355. The validation module may also access and/or generate data (e.g., registration interview data elements 2220, evaluation data elements 2240, etc.) stored within the set of storages 2375. The validation module 2360 may perform, for example, some or all of the operations of processes 1100, 1400, 1500, and/or 1900 in some embodiments. In addition, the validation module may operate in conjunction with other modules (e.g., performing processes 1100, 1400, 1500, and/or 1900 in conjunction with the voice and facial recognition module 2365, etc.).

The voice and facial recognition module 2365 of some embodiments processes instructions and/or data received from the validation module 2360. The voice and facial recognition module may also access and/or generate data (e.g., evidence of registration data elements 2210, evaluation data elements 2240, etc.) stored within the set of storages 2375. In addition, the voice and facial recognition module may interact with other modules as necessary. The voice and facial recognition module may perform, for example, some or all of the operations of processes 1100, 1400, 1500, and/or 1900 in some embodiments.

The validation procedures director 2370 processes instructions and/or data received from the validation module 2360 in some embodiments. The validation procedures director may also access and/or generate data (e.g., evidence of registration data elements 2210, registration interview elements 2220, etc.) stored within the set of storages 2375. In addition, the validation procedures director may interact with other modules as necessary. For example, the validation procedures director may determine, in conjunction with the validation module 2360, when a user has accessed the network-based application and whether the user has previously generated any evidence of registration. As another example, the validation procedures director 2370 may review validation procedures stored in storage 2380 and user profile data stored in storage 2385 to determine whether a user's trust score or access history will trigger a re-challenge of the user. The voice and validation procedures director may perform, for example, some or all of the operations of processes 600, 800, 1500, and/or 2100 in some embodiments.

Some embodiments include a verification module (not shown) that allows verification of user profile information by counterparties, through crowd-sourced evaluation, and/or other appropriate ways of performing verification. The verification module of some embodiments processes instructions received from a client application through the network 2350 and network interface module 2355. The verification module may also access and/or generate data stored within the set of storages 2375. The verification module may perform, for example, some or all of the operations of processes 1500, 1900, 2000, and/or 2100 in some embodiments. In addition, the verification module may operate in conjunction with other modules (e.g., performing processes 1500, 1900, and/or 2100 in conjunction with the voice and facial recognition module 2365, etc.).

Although the application 2300 and its features have been described using several specific embodiments, other embodiments might implement the system or its features using different resources and/or by placing the various modules in different specific locations. For instance, while many of the features have been described as being performed by one module (e.g., the user interface interaction module 2320 or voice and facial recognition module 2365), one of ordinary skill would recognize that a particular operation might be performed using multiple modules. In addition, although various specific communication pathways have been described (e.g., voice and facial recognition module 2365 receiving instructions from the validation module 2360), one of ordinary skill in the art will recognize that various other pathways could be used (e.g., the voice and facial recognition module receiving instructions directly from the network interface module 2355). Furthermore, the application 2300 may include various other modules than those shown.

C. Exemplary System Application

Figure 24:
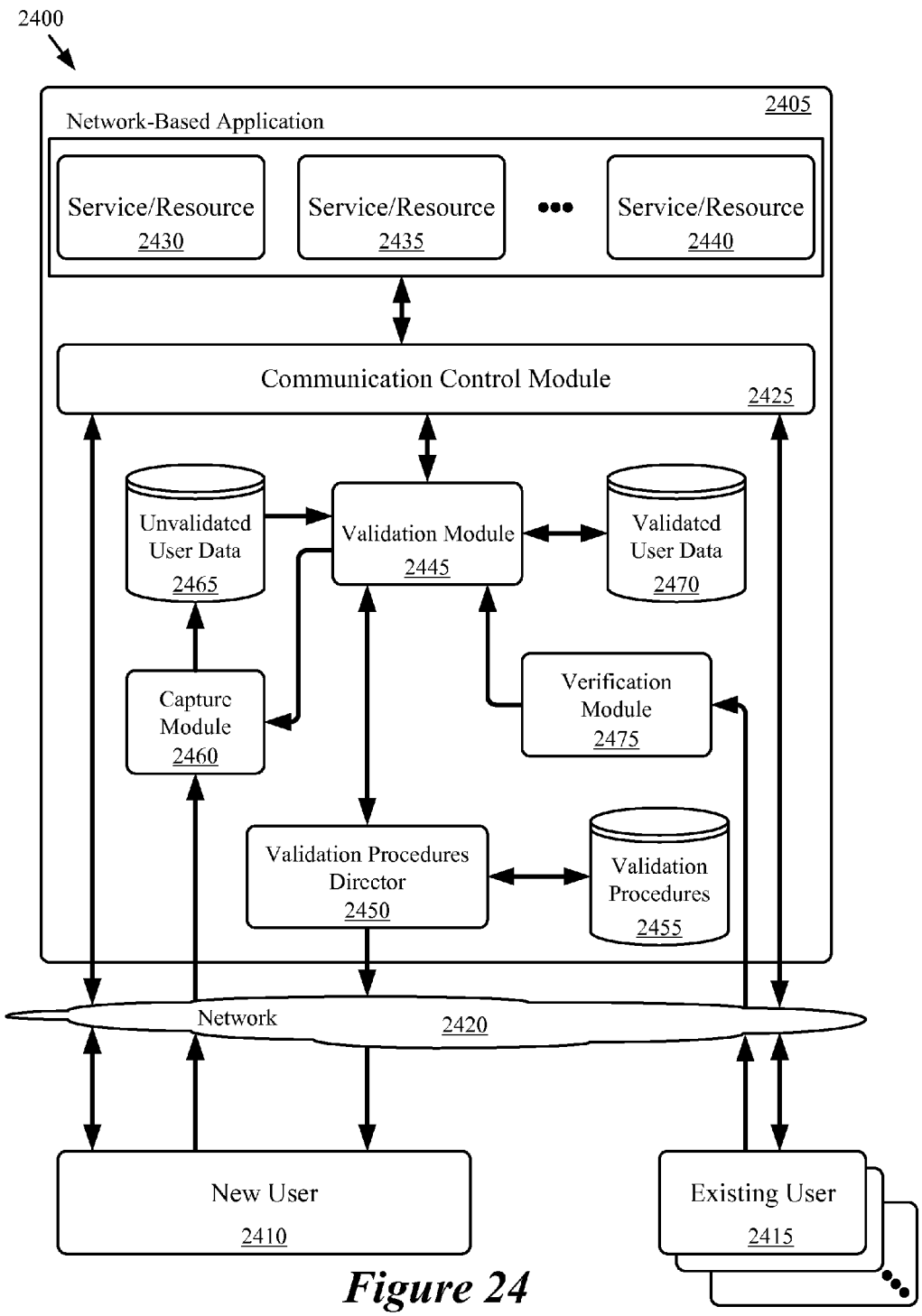
FIG. 24 conceptually illustrates an exemplary system of some embodiments for providing tools and features such as those described in the preceding sections.

FIG. 24 conceptually illustrates an exemplary system 2400 of some embodiments for providing tools and features such as those described in the preceding sections. Specifically, this figure shows various users of a network-based application 2405 and their interactions with the network-based application. In this example, the system includes the network-based application 2405, a new user 2410, and one or more existing users 2415. The new user 2410 and existing users 2415 may access the network-based application over network 2420 using a user device (not shown) that runs a client application (e.g., client application 2310 described above in reference to FIG. 23).

The network-based application includes a communication control module 2425 for receiving data from and sending data to users 2410-2415, services and/or resources 2430-2440 provided by (and/or accessed through) the network-based application 2405, a validation module 2445 for controlling user validation, a validation procedures director 2450 for providing validation procedures to the validation module and/or to a new user 2410, a validation procedures storage 2455 for storing validation procedures, a capture module 2460 for receiving captured data (e.g., audio and/or video data) from a new user 2410 and passing the data to an unvalidated user data storage 2465, a validated user data storage 2470 for storing user data (e.g., profile data, evidence of registration, etc.), and a verification module 2475 for receiving feedback from existing users 2415.

The operation of the system 2400 will now be described by reference to an example user registration and subsequent evaluation of the user's evidence of registration and/or other profile data. When a new user 2410 first attempts to access the services 2430-2440 provided by the network-based application, the communication control module 2425 determines that the user has not previously registered. In such a case, the communication control module directs the validation module 2445 to perform registration. Such registration was described in detail in Section I above. The validation module, in turn, communicates with the validation procedures director 2450 to determine the appropriate registration procedures.

The validation procedures director 2450 accesses the validation procedures storage 2455 to retrieve the appropriate validation procedure information, for example, parameters of a registration interview (e.g., number of tasks, types of tasks, etc.), type of registration to perform (e.g., video, audio, etc.) and/or previously-compiled registration interviews or tasks. The validation procedures director 2450 then passes the retrieved information to the validation module 2445 and/or through the network 2420 to the new user 2410. In some cases, the information may include a list of registration tasks (and expected responses) send to the validation module 2445, and the corresponding set of prompts (e.g., video and/or audio clips) send to the new user 2410 over the network 2420.

In this example, the validation module 2445 then directs the capture module 2460 to retrieve audio, video, text, and/or other data from the new user 2410 and send the data to the unvalidated user data storage 2465. Some embodiments may perform pre-filtering by examining the incoming data at the capture module 2460 to determine whether, for example, the user's face is centered in the frame, whether the ambient lighting is sufficient to capture a clear image, etc. In some embodiments, the captured data sent to the unvalidated user data storage 2465 is an evidence of registration as described above in reference to FIG. 10, for example. When determining that a user has submitted evidence of registration, some embodiments provide access to the services/resources 2430-2440 of the network-based application 2405 through the communication control module 2425. Other embodiments first perform validation of the evidence of registration as described below.

The validation module 2445 may then validate the evidence of registration by retrieving the evidence from the unvalidated user data storage 2465 and evaluating the data based on criteria received from the validation procedures director 2450. Such criteria may include parameters for controlling voice and/or facial recognition, evaluation data for performing recognition algorithms to evaluate compliance with physical tasks, etc. The validation may include various automated and/or manual reviews of the submitted evidence of registration. Such validation was described in more detail in reference to Section II above. Once the evidence of registration has been validated by the validation module, the evidence is stored in the validated user data storage 2470. Some embodiments also update user profile data stored in validated user data storage 2470 to indicate that the user's evidence of registration has been validated.

After a user's evidence of registration has been validated, some embodiments allow the user to access the services/resources 2430-2440 provided by the network-based application 2405. In some of these embodiments, when the new user 2410 accesses the network-based application, the communication control module 2425 in conjunction with the validation module 2445 determines that the evidence of registration for the user has been validated, and the communication control module then allows instructions and/or data to be passed between the new user 2410 and the services/resources 2430-2440 provided by the network-based application 2405. Once a user has submitted evidence of registration and/or after the evidence has been validated, some embodiments verify the user profile information based on evaluation by various existing users 2415 as described below.

In addition to the new user or registrant 2410, the network-based application allows various other existing users 2415 to access the services/resources 2430-2440 provided by the network-based application 2405. Furthermore, some embodiments allow the existing users or counterparties 2415 to provide feedback regarding the new user's profile and/or registration data in order to generate a trust score. In this manner, existing users that know the new user in person may verify the identity of the new user. Alternatively or conjunctively, the existing users may also evaluate various other aspects of the user's profile and/or identity information (e.g., by determining whether the user's face is identifiable in the evidence of registration, by reporting positive and/or negative interactions with the new user, etc.). Such verification and scoring was described in more detail in Section III above.

In some embodiments, the verification module 2475 collects feedback from existing users 2415 and passes the collected data to the validation module 2445 for evaluation and/or storage. As more existing users evaluate the new user's profile information, the new user's trust score may generally increase with positive evaluations or decrease with negative evaluations. Different embodiments may perform different actions based on such a trust score.

For instance, in some embodiments only users with a trust score above a particular threshold may be allowed to access various of the services 2430-2440 provided through the network-based application.

In some cases, when a user's trust score drops below a particular threshold, the validation module 2445 determines that the user should be re-challenged. Such re-challenges were described in detail in Section IV above. In some cases, the determination of whether a user should be re-challenged is made when the trust score drops below the particular threshold and then the user data is updated such that the new user 2410 will be prompted to perform a re-challenge the next time the user accesses the network-based application 2405.

One of ordinary skill in the art will recognize that the conceptual descriptions provided above in reference to FIGS. 22-24 may be implemented differently in different embodiments without departing from the spirit of the invention. For instance, the various storage modules 2380-2390 described above in reference to FIG. 23 may be implemented as a single storage element, where the various storage modules all exist at the same physical location, and are differentiated in some appropriate way. As another example, various storage modules 2380-2390 may be located externally to the application 2300 and accessed through a communication pathway (e.g., a bus). Section VI below describes a process of some embodiments for defining and storing the software modules described above. Section VII then describes a computer system used by some embodiments to implement the various software modules and structures described above.

VI. Process for Defining a Media Editing Application

Figure 25:
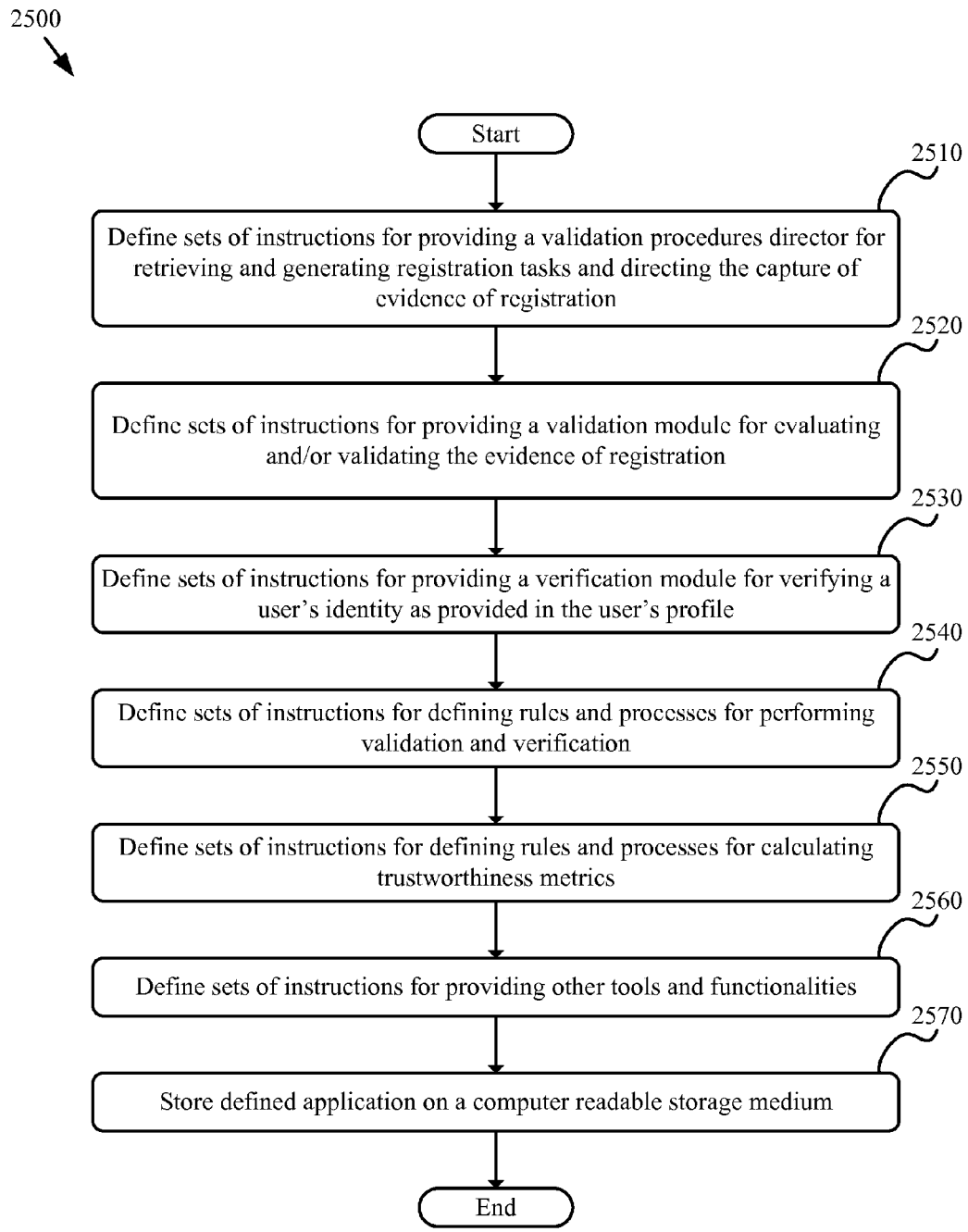
FIG. 25 conceptually illustrates a process some embodiments use to define and store a network-based application of some embodiments.

FIG. 25 conceptually illustrates a process 2500 some embodiments use to define and store a network-based application of some embodiments, such as application 2305. Specifically, process 2500 illustrates the operations used to define sets of instructions for providing several of the elements shown in, for example, UI 1600 and for performing various validation, verification and/or other operations described above.

As shown, process 2500 begins by defining (at 2510) sets of instructions for providing a validation procedures director for retrieving and generating registration tasks and capturing evidence of registration (e.g., validation procedures director 2370 described above in reference to FIG. 23). In some cases such sets of instructions are defined in terms of object-oriented programming code. For example, some embodiments may include sets of instructions for defining classes and instantiating various objects at runtime based on the defined classes. The process then defines (at 2520) sets of instructions for providing a validation module for evaluating and/or validating the evidence of registration (e.g., validation module 2360 described above in reference to FIG. 23).

The process 2500 then defines (at 2530) sets of instructions for providing a verification module for verifying a user's identity information (e.g., verification module 2475 described above in reference to FIG. 24). Next, the process defines (at 2540) sets of instructions for defining rules and procedures for performing validation and verification (e.g., as described above in Sections II and III).

The process then defines (at 2550) sets of instructions for calculating trustworthiness metrics (e.g., the operations described above in reference to FIG. 20). The process then defines (at 2560) sets of instructions for providing various other tools and functionalities. Examples of such tools and functionalities include facial recognition functions, speech recognition functions, etc. In addition, various other functionalities may be defined. Such functionalities may include database management functions, format conversion functions, etc. The process defines these additional tools in order to create an application that has many additional features to the features described above.

The process then stores (at 2570) the defined application (i.e., the various sets of instructions) on a computer readable storage medium. In some embodiments, the medium is one or more of a solid-state device, a hard disk, a CD-ROM, or other non-volatile computer readable storage medium.

One of ordinary skill in the art will recognize that the various sets of instructions defined by process 2500 are not exhaustive of the sets of instructions that could be defined and stored on a computer readable storage medium for a network-based application incorporating some embodiments of the invention. In addition, the process 2500 is a conceptual process, and the actual implementations may vary. For example, different embodiments may define the various sets of instructions in a different order, may define several sets of instructions in one operation, may decompose the definition of a single set of instructions into multiple operations, etc. In addition, the process 2500 may be implemented as several sub-processes or combined with other operations within a macro-process.

VII. Computer System

Many of the above-described processes and modules are implemented as software processes that are specified as a set of instructions recorded on a computer readable storage medium (also referred to as "computer readable medium" or "machine readable medium"). When these instructions are executed by one or more computational element(s), such as processors or other computational elements like Application-Specific ICs ("ASIC") and Field Programmable Gate Arrays ("FPGA"), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and/or electronic signals passing wirelessly or over wired connection.

In this specification, the term "software" includes firmware residing in read-only memory or applications stored in magnetic storage which can be read into memory for processing by one or more processors. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described herein is within the scope of the invention. In some embodiments, the software programs when installed to operate on one or more computer systems define one or more specific machine implementations that execute and perform the operations of the software programs.

Figure 26:
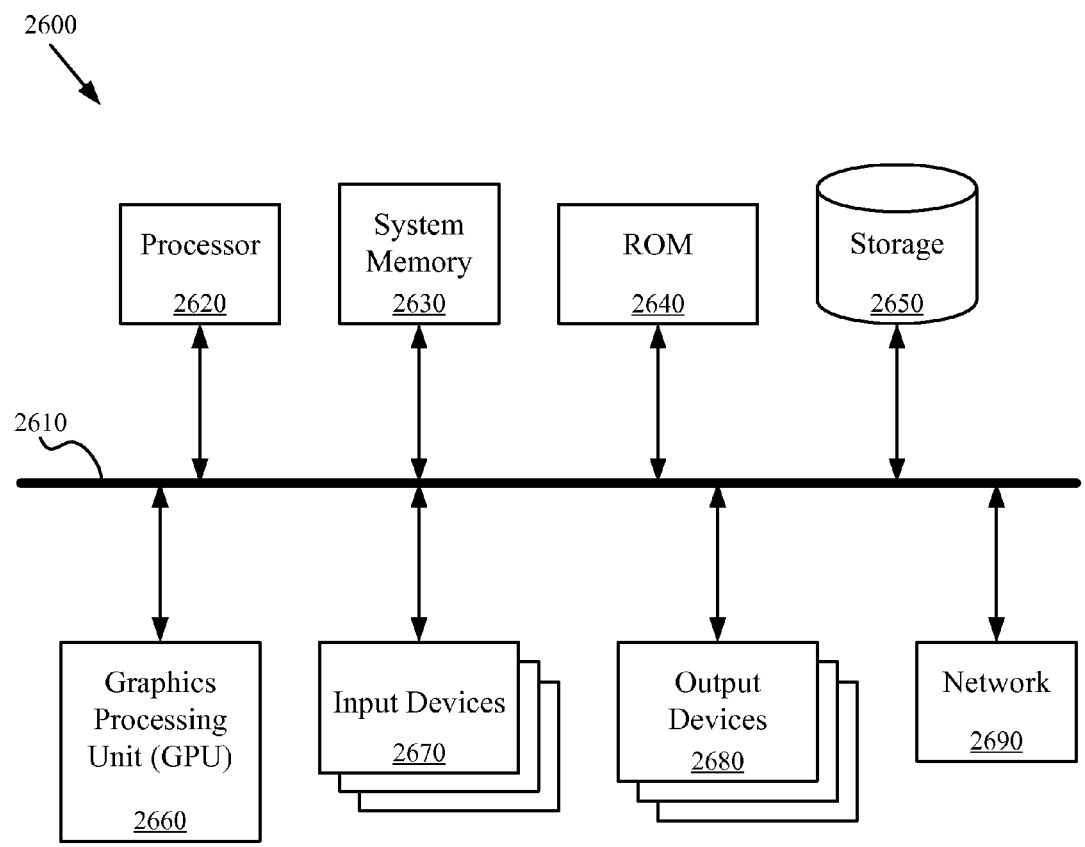
FIG. 26 conceptually illustrates a computer system with which some embodiments of the invention are implemented.

FIG. 26 conceptually illustrates a computer system 2600 with which some embodiments of the invention are implemented. For example, the system described above in reference to FIG. 23 may be at least partially implemented using sets of instructions that are run on the computer system 2600. As another example, the processes described in reference to FIGS. 1, 3, 6, 8, 11, 14, 15, 19, 20, and 21 may be at least partially implemented using sets of instructions that are run on the computer system 2600.

Such a computer system includes various types of computer readable mediums and interfaces for various other types of computer readable mediums. Computer system 2600 includes a bus 2610, a processor 2620, a system memory 2630, a read-only memory (ROM) 2640, a permanent storage device 2650, a graphics processing unit ("GPU") 2660, input devices 2670, output devices 2680, and a network connection 2690. The components of the computer system 2600 are electronic devices that automatically perform operations based on digital and/or analog input signals. The various examples of user interfaces shown in FIGS. 10 and 16-18 may be at least partially implemented using sets of instructions that are run on the computer system 2600 and displayed using the output devices 2680.

One of ordinary skill in the art will recognize that the computer system 2600 may be embodied in other specific forms without deviating from the spirit of the invention. For instance, the computer system may be implemented using various specific devices either alone or in combination. For example, a local PC may include the input devices 2670 and output devices 2680, while a remote PC may include the other devices 2610-2660, with the local PC connected to the remote PC through a network that the local PC accesses through its network connection 2690 (where the remote PC is also connected to the network through a network connection).

The bus 2610 collectively represents all system, peripheral, and chipset buses that communicatively connect the numerous internal devices of the computer system 2600. In some cases, the bus 2610 may include wireless and/or optical communication pathways in addition to or in place of wired connections. For example, the input devices 2670 and/or output devices 2680 may be coupled to the system 2600 using a wireless local area network (W-LAN) connection, Bluetooth®, or some other wireless connection protocol or system.

The bus 2610 communicatively connects, for example, the processor 2620 with the system memory 2630, the ROM 2640, and the permanent storage device 2650. From these various memory units, the processor 2620 retrieves instructions to execute and data to process in order to execute the processes of some embodiments. In some embodiments the processor includes an FPGA, an ASIC, or various other electronic components for execution instructions.

The ROM 2640 stores static data and instructions that are needed by the processor 2620 and other modules of the computer system. The permanent storage device 2650, on the other hand, is a read-and-write memory device. This device is a non-volatile memory unit that stores instructions and data even when the computer system 2600 is off. Some embodiments of the invention use a mass-storage device (such as a magnetic or optical disk and its corresponding disk drive) as the permanent storage device 2650.

Other embodiments use a removable storage device (such as a floppy disk, flash drive, or CD-ROM) as the permanent storage device. Like the permanent storage device 2650, the system memory 2630 is a read-and-write memory device. However, unlike storage device 2650, the system memory 2630 is a volatile read-and-write memory, such as a random access memory (RAM). The system memory stores some of the instructions and data that the processor needs at runtime. In some embodiments, the sets of instructions and/or data used to implement the invention's processes are stored in the system memory 2630, the permanent storage device 2650, and/or the read-only memory 2640. For example, the various memory units include instructions for processing multimedia items in accordance with some embodiments.

In addition, the bus 2610 connects to the GPU 2660. The GPU of some embodiments performs various graphics processing functions. These functions may include display functions, rendering, compositing, and/or other functions related to the processing or display of graphical data.

The bus 2610 also connects to the input devices 2670 and output devices 2680. The input devices 2670 enable the user to communicate information and select commands to the computer system. The input devices include alphanumeric keyboards and pointing devices (also called "cursor control devices"). The input devices also include audio input devices (e.g., microphones, MIDI musical instruments, etc.) and video input devices (e.g., video cameras, still cameras, optical scanning devices, etc.). The output devices 2680 include printers, electronic display devices that display still or moving images, and electronic audio devices that play audio generated by the computer system. For instance, these display devices may display a UI. The display devices include devices such as cathode ray tubes ("CRT"), liquid crystal displays ("LCD"), plasma display panels ("PDP"), surface-conduction electron-emitter displays (alternatively referred to as a "surface electron display" or "SED"), etc. The audio devices include a PC's sound card and speakers, a speaker on a cellular phone, a Bluetooth® earpiece, etc. Some or all of these output devices may be wirelessly or optically connected to the computer system.

Finally, as shown in FIG. 26, bus 2610 also couples computer 2600 to a network 2690 through a network adapter (not shown). In this manner, the computer can be a part of a network of computers (such as a local area network ("LAN"), a wide area network ("WAN"), an Intranet, or a network of networks, such as the Internet. For example, the computer 2600 may be coupled to a web server (network 2690) so that a web browser executing on the computer 2600 can interact with the web server as a user interacts with a UI that operates in the web browser.

As mentioned above, some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by a device such as an electronics device, a microprocessor, a processor, a multi-processor (e.g., an IC with several processing units on it) and includes sets of instructions for performing various operations. The computer program excludes any wireless signals, wired download signals, and/or any other ephemeral signals.

Examples of hardware devices configured to store and execute sets of instructions include, but are not limited to, ASICs, FPGAs, programmable logic devices ("PLDs"), ROM, and RAM devices. Examples of computer programs or computer code include machine code, such as produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of this specification, the terms display or displaying mean displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and/or any other ephemeral signals.

It should be recognized by one of ordinary skill in the art that any or all of the components of computer system 2600 may be used in conjunction with the invention. Moreover, one of ordinary skill in the art will appreciate that any other system configuration may also be used in conjunction with the invention or components of the invention.

While the invention has been described with reference to numerous specific details, one of ordinary skill in the art will recognize that the invention can be embodied in other specific forms without departing from the spirit of the invention. For example, several embodiments were described above by reference to particular media editing applications with particular features and components (e.g., the audition display area, the audition display area management module). However, one of ordinary skill in the art will realize that other embodiments might be implemented with other types of media editing applications with other types of features and components (e.g., different types of audition display areas).

Moreover, while the examples shown illustrate many individual modules as separate blocks (e.g., the validation module 2360, the voice and facial recognition module 2365, etc.), one of ordinary skill in the art would recognize that some embodiments may combine these modules into a single functional block or element. One of ordinary skill in the art would also recognize that some embodiments may divide a particular module into multiple modules. One of ordinary skill in the art would understand that the invention is not to be limited by the foregoing illustrative details, but rather is to be defined by the appended claims.

The invention claimed is:

1. A method of performing an image capture session to generate verifiable evidence that a user is participating in a real-time event, the method comprising:
    initiating an image capture session to capture a plurality of images of the user;
    during the image capture session, generating a sequence of tasks to be performed by the user, said generating comprising randomly selecting a set of user-specific tasks from a plurality of tasks stored in a database;
    presenting the sequence of tasks to be performed to the user; and
    storing the plurality of images of the user performing the sequence of tasks and a description of the sequence of tasks as evidence that the user is participating in a real-time event.

2. The method of claim 1, wherein the image capture session is for generating evidence of registration for a network-based application.

3. The method of claim 2, wherein the sequence of tasks performed by the user serves as irrefutable evidence that the user is a person participating in a real time image capture session so that the user cannot later repudiate the evidence of registration.

4. The method of claim 1, wherein the sequence of tasks comprises at least one physical task.

5. The method of claim 1, wherein the sequence of tasks comprises a set of standard tasks to be provided to every user and the set of randomly-selected tasks to be selected for each user.

6. The method of claim 1 further comprising initiating an audio capture session to capture audio data of the user during the image capture session.

7. The method of claim 6 further comprising storing the audio data captured during the image capture session as an additional evidence that the user is participating in a real-time event.

8. The method of claim 7 further comprising verifying the evidence by analyzing the captured plurality of images and audio data to determine whether the captured plurality of images and audio data satisfy a set of evaluation criteria associated with the sequence of tasks.

9. The method of claim 8, wherein the set of evaluation criteria comprises a set of expected oral responses for at least one task from the sequence of tasks.

10. The method of claim 7, wherein each captured image is associated with a digital timestamp indicating when the image was captured.

11. The method of claim 10 further comprising verifying the evidence by examining the digital timestamps to determine whether the plurality of images were captured continuously.

12. The method of claim 2 further comprising:
during the image capture session, receiving a set of identity elements that comprise identifying information for the user; and
verifying the evidence of registration by:
retrieving a set of images over a network, wherein each image in the set is associated with information that matches at least one of the identity elements; and
comparing each image in the retrieved set of images to at least one image from the captured plurality of images to determine whether an individual represented in the retrieved image matches the user represented in the captured plurality of images.

13. The method of claim 12 further comprising increasing a trust metric associated with the user when determining that any individual represented in the retrieved image matches the user represented in the captured plurality of images.

14. The method of claim 13 further comprising decreasing the trust metric when determining that no individual represented in the retrieved image matches the user represented in the captured plurality of images.

15. A method for validating a user registration for a network-based application, the method comprising:
providing a validation procedures director for:
i) initiating an image capture operation to capture a plurality of images of a user as a registrant; and
ii) specifying a set of registration tasks to be performed by the user during an interview session, the set of registration tasks selected in order to validate that the image capture session is capturing an image of a person participating in a real-time event; and
providing a validation module for validating the user registration by:
i) examining the plurality of images using automated facial recognition to determine whether the plurality of images includes recognizable images of the user; and
ii) analyzing the plurality of images to determine whether the plurality of images indicates the performance of the set of registration tasks.

16. The method of claim 1, wherein the set of registration tasks presented to the registrant serves as irrefutable evidence that the registrant is a person participating in a real time image capture session so that the registrant cannot later repudiate the evidence.

17. The method of claim 15 further comprising storing the plurality of images.

18. The method of claim 17, wherein the validation procedures director is further for (i) performing an audio capture session during the image capture session and (ii) validating the captured audio.

19. The method of claim 17 further comprising increasing a trust metric associated with the user when determining that an individual represented in images retrieved over a network matches the user represented in the captured plurality of images, wherein the retrieved images are retrieved based on an identity of the user.

20. The method of claim 19, wherein the trust metric is at least partially based on a variety of crowd-sourced information that is collected for the registrant.

* * * * *